United States Patent
Karunaratne

(10) Patent No.: US 9,561,447 B2
(45) Date of Patent: *Feb. 7, 2017

(54) IMAGE GENERATING AND PLAYING-PIECE-INTERACTING ASSEMBLY

(71) Applicant: TechnologyOne, Inc., Fremont, CA (US)

(72) Inventor: Arjuna Ragunath Karunaratne, Fremont, CA (US)

(73) Assignee: TECHNOLOGYONE, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,302

(22) Filed: Aug. 15, 2016

(65) Prior Publication Data

US 2016/0346706 A1    Dec. 1, 2016

Related U.S. Application Data

(63) Continuation of application No. 14/943,632, filed on Nov. 17, 2015, which is a continuation of application
(Continued)

(51) Int. Cl.
*A63H 33/42* (2006.01)
*A63H 33/04* (2006.01)
(Continued)

(52) U.S. Cl.
CPC .......... *A63H 33/042* (2013.01); *A63H 17/002* (2013.01); *A63H 27/001* (2013.01);
(Continued)

(58) Field of Classification Search
USPC ......................................................... 446/90
See application file for complete search history.

(56) References Cited

U.S. PATENT DOCUMENTS

| 3,567,893 A | 3/1971 | Ernst |
| 3,576,936 A | 5/1971 | Fischer |

(Continued)

FOREIGN PATENT DOCUMENTS

| EP | 2163811 A1 | 3/2010 |
| JP | 2007125406 A | 5/2007 |

(Continued)

OTHER PUBLICATIONS

PCT/US13/24969—International Search Report and Written Opinion dated May 15, 2013, 10 pages.
(Continued)

*Primary Examiner* — Tramar Harper
(74) *Attorney, Agent, or Firm* — James F. Hann; Haynes Beffel & Wolfeld LLP

(57) ABSTRACT

A baseplate assembly, used with releasably coupleable playing pieces, includes a baseplate operably coupled to an image generating device. The baseplate includes a display region, having playing pieces coupling elements, and means for transmitting images generated by the image generating device to the display region. An image generating and playing-piece-interacting assembly includes a receptor operably coupled to an image generating device, having a display screen for generated images, including integrated visual and optically encoded message images, a playing piece at a location relative to the display screen having an optical display message sensor, and a messaging transponder. The optical display message sensor receives the generated images and generates a first signal at least partially based upon the optically encoded message image. The messaging transponder receives the first signal and generates and sends the receptor a second signal at least partially based thereon.

20 Claims, 36 Drawing Sheets

Related U.S. Application Data

No. 13/760,880, filed on Feb. 6, 2013, now Pat. No. 9,403,100, which is a continuation-in-part of application No. 13/681,143, filed on Nov. 19, 2012, now abandoned.

(60) Provisional application No. 61/633,824, filed on Feb. 17, 2012.

(51) Int. Cl.
| | |
|---|---|
| A63H 33/08 | (2006.01) |
| A63H 17/00 | (2006.01) |
| A63H 27/00 | (2006.01) |
| A63H 30/04 | (2006.01) |
| A63H 33/26 | (2006.01) |
| G06F 3/03 | (2006.01) |
| G06F 3/041 | (2006.01) |
| G09G 5/377 | (2006.01) |

(52) U.S. Cl.
CPC ............ *A63H 30/04* (2013.01); *A63H 33/08* (2013.01); *A63H 33/086* (2013.01); *A63H 33/26* (2013.01); *G06F 3/0321* (2013.01); *G06F 3/041* (2013.01); *G09G 5/377* (2013.01); *G09G 2354/00* (2013.01)

(56) References Cited

U.S. PATENT DOCUMENTS

| | | | |
|---|---|---|---|
| 3,608,233 A | 9/1971 | Masura | |
| 3,696,548 A | 10/1972 | Teller | |
| 4,275,525 A | 6/1981 | Geisler et al. | |
| 4,405,921 A | 9/1983 | Mukaiyama | |
| 4,677,428 A | 6/1987 | Bartholow | |
| 4,814,552 A | 3/1989 | Stefik et al. | |
| 4,891,030 A | 1/1990 | Gertzfeld | |
| 4,977,315 A | 12/1990 | Purcell | |
| 5,042,972 A | 8/1991 | Bach et al. | |
| 5,186,652 A | 2/1993 | Hai-Yung | |
| 5,411,428 A | 5/1995 | Orii et al. | |
| 5,596,181 A | 1/1997 | Bach et al. | |
| 5,733,167 A | 3/1998 | Kr.ø.igaard | |
| 5,738,558 A | 4/1998 | Zimmer et al. | |
| 5,853,327 A * | 12/1998 | Gilboa ............... A63F 3/00643 273/237 |
| 5,876,262 A | 3/1999 | Kelly et al. | |
| 5,908,328 A | 6/1999 | Chen | |
| 6,157,872 A | 12/2000 | Michael | |
| 6,206,745 B1 | 3/2001 | Gabai et al. | |
| 6,340,323 B1 | 1/2002 | Glynn | |
| 6,377,249 B1 | 4/2002 | Mumford | |
| 6,443,796 B1 * | 9/2002 | Shackelford ......... A63H 33/042 273/237 |
| 6,546,315 B1 | 4/2003 | Michael | |
| 6,547,624 B1 | 4/2003 | Bojesen et al. | |
| 6,585,553 B1 | 7/2003 | Fetridge et al. | |
| 6,690,156 B1 | 2/2004 | Weiner et al. | |
| 6,752,680 B1 | 6/2004 | Hansen | |
| 6,761,634 B1 * | 7/2004 | Peterson ............. A63F 3/00643 273/236 |
| 6,805,605 B2 | 10/2004 | Reining et al. | |
| 6,835,131 B1 * | 12/2004 | White ................. A63F 3/00643 273/237 |
| 6,893,316 B2 | 5/2005 | Maxwell et al. | |
| 7,316,567 B2 | 1/2008 | Hsieh et al. | |
| 7,708,615 B2 | 5/2010 | Munch | |
| 8,079,890 B2 | 12/2011 | Seligman | |
| 8,221,182 B2 | 7/2012 | Seymour et al. | |
| 8,477,931 B2 | 7/2013 | Thompson et al. | |
| 8,517,789 B2 | 8/2013 | Barber | |
| 8,690,631 B2 | 4/2014 | Nag | |
| 8,753,163 B2 | 6/2014 | Gaute | |
| 8,753,164 B2 | 6/2014 | Hansen et al. | |
| 8,764,507 B2 | 7/2014 | Lin | |
| 8,780,088 B2 | 7/2014 | Boer et al. | |
| 8,851,953 B2 | 10/2014 | Oschuetz et al. | |
| 9,168,464 B2 | 10/2015 | Karunaratne | |
| 2002/0196250 A1 * | 12/2002 | Anderson ............... G06T 19/00 345/420 |
| 2003/0097203 A1 | 5/2003 | Michael | |
| 2003/0139113 A1 | 7/2003 | Wood et al. | |
| 2003/0148700 A1 | 8/2003 | Arlinsky et al. | |
| 2004/0092207 A1 | 5/2004 | Hansen | |
| 2004/0248650 A1 * | 12/2004 | Colbert ............... A63F 3/00643 463/37 |
| 2005/0007516 A1 * | 1/2005 | Hong ................ G02F 1/133603 349/64 |
| 2005/0026537 A1 | 2/2005 | Hsieh et al. | |
| 2005/0178034 A1 * | 8/2005 | Schubert ................. G09F 9/33 40/605 |
| 2005/0215172 A1 | 9/2005 | Chen | |
| 2006/0252340 A1 | 11/2006 | Bach et al. | |
| 2007/0062852 A1 | 3/2007 | Zachut et al. | |
| 2007/0221220 A1 * | 9/2007 | Bright ............... A61M 16/0057 128/204.18 |
| 2008/0004110 A1 * | 1/2008 | Cortenraad ......... A63F 3/00643 463/34 |
| 2008/0058045 A1 * | 3/2008 | Cortenraad ......... A63F 3/00643 463/9 |
| 2008/0113578 A1 | 5/2008 | McAlaine et al. | |
| 2008/0161086 A1 | 7/2008 | Decre et al. | |
| 2008/0220690 A1 | 9/2008 | Munch | |
| 2009/0215357 A1 | 8/2009 | Seligman | |
| 2009/0305602 A1 | 12/2009 | Gaute | |
| 2010/0004062 A1 | 1/2010 | Maharbiz et al. | |
| 2010/0039408 A1 | 2/2010 | Cho et al. | |
| 2010/0283728 A1 | 11/2010 | Hollemans et al. | |
| 2010/0311300 A1 | 12/2010 | Hansen et al. | |
| 2010/0331083 A1 | 12/2010 | Maharbiz et al. | |
| 2011/0021107 A1 | 1/2011 | Nag | |
| 2011/0021109 A1 | 1/2011 | Le et al. | |
| 2011/0076909 A1 | 3/2011 | Hageman et al. | |
| 2011/0129804 A1 | 6/2011 | Choi et al. | |
| 2011/0143629 A1 | 6/2011 | Seymour et al. | |
| 2011/0151743 A1 | 6/2011 | Munch et al. | |
| 2011/0217898 A1 | 9/2011 | Barber | |
| 2011/0272884 A1 | 11/2011 | Kraegeloh et al. | |
| 2012/0055000 A1 | 3/2012 | Poulsen | |
| 2012/0122059 A1 | 5/2012 | Schweikardt et al. | |
| 2012/0184457 A1 | 7/2012 | Miska et al. | |
| 2012/0194457 A1 * | 8/2012 | Cannon ................... G06F 3/011 345/173 |
| 2012/0252307 A1 | 10/2012 | Lin | |
| 2012/0268390 A1 * | 10/2012 | Yang ................... A63H 33/086 345/173 |
| 2012/0329359 A1 | 12/2012 | Capriola | |
| 2013/0109268 A1 | 5/2013 | Lin | |
| 2013/0183882 A1 | 7/2013 | Oschuetz et al. | |
| 2013/0217496 A1 * | 8/2013 | Olkin ................. A63F 3/00075 463/32 |
| 2013/0303047 A1 | 11/2013 | Albert et al. | |
| 2013/0316610 A1 | 11/2013 | Maddocks et al. | |
| 2013/0344769 A1 | 12/2013 | Thompson et al. | |
| 2014/0127965 A1 | 5/2014 | Adam | |
| 2014/0273711 A1 | 9/2014 | Capriola | |
| 2014/0302740 A1 | 10/2014 | Nag | |

FOREIGN PATENT DOCUMENTS

| | | | |
|---|---|---|---|
| WO | 01/15059 A2 | 3/2001 | |
| WO | WO 0115059 A2 * | 3/2001 | ............. A63H 18/10 |
| WO | 2010150232 A1 | 12/2010 | |
| WO | 2011126830 A2 | 10/2011 | |

OTHER PUBLICATIONS

Fitzmaurice G.W. et al., "Bricks: Laying the Foundations for Graspable User Interfaces," Proc. of the SIGCHI Conf. on Human Factors in Computing Systems (CHI '95) Denver, 1995, pp. 442-449.

(56) References Cited

OTHER PUBLICATIONS

Black and white drawing, Lego Mindstorms®, 1p, from http://mindstorms.lego.com/en-us/history/default.aspx.
Color drawing, Lego Mindstorms®, 1p, from http://mindstorms.lego.com/en-us/history/default.aspx.
Small Works—BrickCase for iPod Touch 4th Generation, 2 pp, from http://smallworks.com/collections/brickcase-for-pod-touch-4th-generation.
Smallworks—IPad Mini BrickCase, 2 pp, from http://smallworks.com/collections/ipad-mini.
Press Release Page, Belkin, 2 pp, from http://www.belkin.com/us/pressreleases/8798420108348/.
EP Application No. 13748639.5—European Supplementary Search Report dated May 15, 2015, 5 pages.
CN 201380002943.1—Office Action dated Jun. 2, 2015, 11 pages.
CA 2847378—Second Office Action dated Oct. 16, 2015, 4 pages.
CA 2847378—Office Action dated Mar. 25, 2015, 4 pages.
CN 201380002943.1—Second Office Action dated Feb. 2, 2016, 7 pages.
CA 2847378—Response to Office Action dated Mar. 25, 2015 filed Jun. 25, 2015, 20 pages.
CN 201380002943.1—Response to first Office Action dated Jun. 2, 2015 filed Oct. 10, 2015, 137 pages.
US 13760880—Office Action dated Dec. 24, 2015, 15 pgs.
CN 201380002943.1—Response to Second Office Action dated Feb. 2, 2016 filed Mar. 28, 2016, 25 pages.
CA 2847378—Response to Second Office Action dated Oct. 16, 2015 filed Apr. 1, 2016, 21 pages.
U.S. Appl. No. 13/760,880—Notice of Allowance dated Mar. 25, 2016, 13 pages.
CN 201380002943.1—Third Office Action dated Jul. 4, 2016, 6 pages.
CA 2847378—Third Office Action dated Aug. 12, 2015, 3 pages.
CN 201380002943.1—Response to Third Office Action dated Jul. 4, 2016 filed Sep. 13, 2016, 25 pages.

\* cited by examiner

IMAGE GENERATING AND PLAYING-PIECE-INTERACTING ASSEMBLY

CROSS-REFERENCE TO OTHER APPLICATIONS

This application is a continuation of U.S. patent application Ser. No. 14/943,632, filed 17 Nov. 2015, entitled Baseplate Assembly for Use with Toy Pieces, which is a continuation of U.S. patent application Ser. No. 13/760,880, filed 6 Feb. 2013, entitled Baseplate Assembly for Use with Toy Pieces, now U.S. Pat. No. 9,403,100, issued 2 Aug. 2016, which is a continuation-in-part of U.S. patent application Ser. No. 13/681,143, filed 19 Nov. 2012, entitled Toy Brick with Sensing, Actuation and Control, which claims the benefit of U.S. Provisional Patent Application No. 61/633,824, filed 17 Feb. 2012.

BACKGROUND OF THE INVENTION

Toy pieces in the form of toy bricks such as LEGO® brand toy bricks have been available for many decades. Toy bricks typically have releasable couplings between bricks, which allow them to be connected to form a larger structure. In their simplest form they build unanimated objects such as castles or houses. In some cases, the toy created using toy bricks can be supported on a baseplate having coupling elements to provide stability or proper positioning, or both, for the toy.

An advancement of toy bricks was the addition of bricks with a rotating joint or axel coupled to a wheel. Such a toy brick can be attached to an inanimate structure in order to make that structure roll along a surface when pushed.

A further advancement of toy bricks was the addition of "pull back motors." These motors are mechanical energy storage elements, which store energy in a watch spring or flywheel. Typically these are toy bricks which have the "pull back motor" mechanism contained within the brick. There is a shaft from the mechanism, which when turned in one direction winds up the motor and then when released will turn in the opposite direction. A toy brick car, for example, equipped with such a motor will wind up when pulled back and then go forwards when released. An example of this is the LEGO Pullback Motor.

The next stage of advancement of a toy brick is an electric motor contained within one brick, having a protruding shaft and another toy brick with a battery compartment. These battery and motor bricks can be coupled to each other directly or through wires in order to create a simple mechanism that is electrically actuated. Typically a switch is present on the brick containing the batteries that can turn the motor on or off or revere its direction. Variations on the actuator can be lights, instead of a motor. An example of this is the LEGO eLab.

Toy bricks containing motors and toy bricks containing batteries can be further enhanced by the insertion of a remote control receiver in between them, such that the passage of power can be modified remotely. Typically a hand held remote control transmitter transmits a signal to a receiver brick, which can change the speed or direction of the motor. By way of example, a toy brick vehicle constructed in such a manner can be steered remotely and also have its speed controlled remotely. An example of this is the LEGO Power Functions.

The most complex state of prior art is the programmable robotics kit sold by the LEGO Group under the trademark Mindstorms®. The kit typically includes a handheld programmable computer, to which sensors and actuators can be plugged in, along with toy bricks and specialized components for making a variety of projects. Actuators can be motors, or solenoids, speakers, or lights. Sensors can be switches, microphones, light sensors or ultrasonic rangefinders. By way of example, a program can be downloaded into the handheld computer, so as to control a motor in a manner so as to avoid collisions with objects in the direction of motion. Another example would be to make a noise when motion is detected. Another programmable Mindstorms programmable robot is the Micro Scout. It is a motorized wheeled robot in which several preprogrammed sequences can be executed when a light is shined on the robot.

US patent publication US2011/0217898 A1 describes a toy brick with a tilt sensor and lights of the same color turning on and off or flashing alternately in response to a shaking motion. U.S. Pat. No. 7,708,615 discloses a toy brick system having separate sensor bricks, logic bricks and function bricks. The following toy bricks also emit sound when a switch is closed. LEGO doorbell Brick #5771, LEGO Space Sound Brick #55206C05.

Various devices generate images on display screens. One type of image generating device is a computer, such as pad computer, which can be designed to permit interaction with the computer through the display screen. This is commonly through touchscreen technology which permits actions to be initiated by, for example, selecting appropriate icons on the display screen, as well as lines to be drawn on the display screen. In addition to touchscreen technologies, interaction with the computer through the display screen can also be through the use of devices commonly referred to as light pens. See, for example, U.S. Pat. No. 4,677,428. In Light pen based interaction, images are generated on a Cathode Ray Tube (CRT) by excitation of the phosphor on the screen by an electron beam. This excitation causes the emission of light. Since a single point electron beam scans the image in a raster pattern, the light at any one point on the screen fades with time, as the beam progresses to a different part of the screen. During the next scan of the screen the image is refreshed. The intensity at any one point on the screen will flicker at the rate of refresh of the screen, and is typically a sawtooth type waveform with a fast rise and a slower decay if plotted in time. The light from any given point on the screen will increase sharply as the electron beam passes by any location as long as the image is not completely black at that point on the screen. The display knows the position of the electron beam at any given time, and this position can be captured at the instant when a sharp jump in a light level is seen by the light pen. By this method the light pen can be used as a pointing device, typically with additional buttons similar to mouse buttons, which are sometimes arranged so as to be mechanically activated when the pen is pressed against a surface.

BRIEF SUMMARY OF THE INVENTION

A first example of a baseplate assembly, for use with playing pieces configured to allow the playing pieces to be releasably coupled to one another, includes a baseplate and an image generating device operably coupled to the baseplate. The baseplate includes a display region, having coupling elements, by which playing pieces can be releasably mounted to the display region. Display region also includes areas adjacent to the coupling elements. The baseplate assembly also includes means for transmitting images generated by the image generating device at least to the display region of the baseplate.

Some embodiments of the first example of the baseplate assembly can include one or more the following. The image generating device can include a display screen on which images are generated. The images transmitting means can include a generally transparent portion of the baseplate whereby images generated on the display screen can pass through the baseplate to be viewed at the display region of the baseplate. The baseplate can be removably mounted to the image generating device. The image generating device can include a computer. The baseplate assembly can include a playing piece releasably mounted to a first location on the display region using a coupling element; with the image generating device being a computer, the playing piece and the baseplate can include computer program instructions stored on a non-transit storage medium that, when executed on a processor, cause the processor to perform actions comprising flow or branching dependent upon the messages received from the playing pieces. The baseplate can be constructed so that the images generated by image generating device pass through the baseplate and are visible through the coupling elements and through the areas adjacent to the coupling elements. The assembly can further include a playing piece releasably mounted to a first location on the display region using a coupling element, and a coil for generating a magnetic field for at least one of the following: (1) transferring energy from the baseplate to the playing piece, and (2) transferring a signal to and receiving a signal from the playing piece. The assembly can further include a playing piece releasably mounted to a first location on the display region using a coupling element, the playing piece comprising at least one of a radio frequency identification (RFID) device and a near field communication (NFC) transponder activatable upon receipt of an optical signal by the playing piece. The playing piece can further include a touch sensitive membrane operably coupled to the image generating device, and the baseplate can include a plurality of access regions overlying the touch sensitive membrane to permit a user to provide a touch input to the membrane at at least a selected one of the access regions. The baseplate can include a grid of first and second sets of spaced apart electrodes, the first set of electrodes extending in a direction transverse to the second set of electrodes, with the first and second sets of electrodes operably coupled to the image generating device.

A second example of a baseplate assembly includes a baseplate body, the playing piece and the triangulating means. The baseplate body includes a playing pieces support surface with the playing piece at a position on the playing pieces support surface. The triangulating means being associated with the playing piece and the baseplate body for generating signals indicating the presence of the playing piece at the position on the playing pieces support surface. In some embodiments of the second example, the baseplate body can include coupling elements by which the playing piece can be releasably mounted to the playing pieces support surface.

An example of a baseplate is for use with (1) an image generator having a display screen on which images can be generated, and (2) playing pieces configured to allow the playing pieces to be releasably coupled to one another. The baseplate includes a body and mounting structure. The body includes a display region with comprising coupling elements, by which playing pieces can be releasably mounted to the display region, and regions adjacent to the coupling elements. The body also includes an inner region, the inner and display regions being on opposite sides of the baseplate. The mounting structure by can be used to removably mount the body to an image generator so that the inner region of the body is positioned adjacent to the display screen of the image generator. At least a portion of the body between the inner region and the display region can be generally transparent so that images generated at the display screen of the image generator can pass through the body to the display region and be visible at the coupling elements and at the regions adjacent to the coupling elements.

An example of an image generating and playing-piece-interacting assembly, for use with playing pieces, includes an image generating device, a receptor operably coupled to the image generating device, and a first playing piece. The image generating device has a display screen on which generated images can be displayed. The generated images include integrated visual and optically encoded message images. The first playing piece can be at a first location relative to the display screen. The first playing piece includes an optical display message sensor and a messaging transponder. The optical display message sensor is configured to receive the integrated visual and optically encoded message image and to generate a first signal at least partially based upon the optically encoded message image. The messaging transponder is coupled to the optical display message sensor for receipt of at least the first signal from the optical display message sensor. The messaging transponder is also coupled to the receptor for generating and sending to the receptor a second signal at least partially based upon the first signal.

Some embodiments of an image generating and playing-piece-interacting assembly can include one or more the following. The receptor can be at least one of a sound receptor, an electromagnetic radiation receptor, and a magnetic field receptor, and the second signal can include a corresponding one of a sound second signal, an electromagnetic radiation field second signal, and a magnetic field second signal. The assembly can include a baseplate mountable on the display screen, the baseplate including a display region, the display region including coupling elements by which playing pieces can be releasably mounted to the display region. The optically encoded message image can be visually imperceptible to a user. The optically encoded message image can contain information encoded as being addressed to a specific playing piece. The second signal can include one or more of the following (1) graphic representation for the first playing piece, (2) other information for the first playing piece, and (3) an address into at least one of a local database, a remote database, a look-up table; which contains information for the first playing piece. The optically encoded message image can change according to the physical position of the optically encoded message image on the display screen. The optically encoded message image can contain information regarding at least one of (1) coordinates for the physical position, and (2) information regarding the visual image portion of the generated image at the physical position, (3) gaming data for the playing piece, (4) data for an actuator on the playing piece. The optically encoded message image can be generated at a number of physical positions on the display screen, and a second playing piece can be at a second location relative to the display screen. The assembly can also include first and second operably coupled image generating devices, a second playing piece at a second location relative to the display screen of the second image generating device, and an optically encoded message image to the second playing piece can be at least partially based upon the second signal from the playing piece. A second playing piece can be at a second location relative to the display screen, the optically encoded message image to the second playing piece can be at least partially based upon the second signal from the first playing piece. The each of first playing piece and the second playing piece each can include a playing-piece-to-playing-piece communication device to permit transfer of messages therebetween. The first playing piece can include a sensor coupled to the messaging transponder to provide sensor data to the messaging transponder, so that the second signal can be generated at least in part based on the sensor data. The first playing piece can include at least one of (1) an actuator operably coupled to receive a message from the optical display message sensor, and (2) an actuator operably coupled to receive a message from the messaging transponder, the message comprising data for actuation of the actuator.

Other features, aspects and advantages of the present invention can be seen on review the drawings, the detailed description, and the claims which follow.

BRIEF DESCRIPTION OF THE DRAWINGS

FIG. 1 shows an example of a toy brick including a solar cell and an actuator shaft.

FIG. 2 is a block diagram of internal components of a toy brick.

FIG. 3 is an example of a toy brick including an induction charging device.

FIG. 4 is an example of a toy brick including a microphone or a light detector.

FIG. 5 is an example of a toy brick including an RF receiver or a GPS sensor.

FIG. 6 is an example of a toy brick including a 3-D tilt, or gyroscope, or gravity sensor.

FIG. 7 is an example of a toy brick including a camera.

FIG. 8 is an example of a toy brick including one or both of a shaft angle sensor and a shaft extension sensor.

FIG. 9 is an example of a gripper force toy brick including a gripping force sensor including a strain gauge rosette.

FIG. 10 illustrates, in a simplified manner, components within the gripper force brick of FIG. 9.

FIG. 11 is example of a toy brick including electrical switches at an outside surface.

FIG. 12 is a simplified view showing how the electrical switches of the toy brick of FIG. 11 are connected to the computing control element of the toy block.

FIG. 13 is an example of a toy brick including a temperature transducer.

FIG. 14 is a simplified view illustrating how the temperature transducer of FIG. 13 is coupled to the computing control element of the toy brick through an amplifier.

FIG. 15 is a block diagram of an example of a microcontroller for use with a toy brick.

FIG. 16 is a flow diagram illustrating power management signal detection and actuation.

FIG. 17 is an example of a toy brick including a light source.

FIG. 18 is an example of a toy brick including a speaker.

FIG. 19 is an example of a toy brick including a flat display.

FIG. 20 is an example of a toy brick including at least one of an organic LED and an organic LCD.

FIG. 21 is an example of a toy brick including a projected image from a projected image display.

FIG. 22 is an example of a toy brick including an image from a fiber optic display.

FIG. 23 is an example of a toy airplane built with toy bricks, which can emit sound or turn a propeller when moved as detected by a motion sensor.

FIG. 24 is an example of a toy car with a toy brick including a motion sensor, a recorder, and a speaker for emission of car sounds.

FIG. 25 is an example of a toy train built with toy bricks, including a camera brick as in FIG. 7 for display of an image from the camera on a mobile or fixed computing device.

FIGS. 26, 27 and 28 illustrate examples of toy bricks shaped as flying insects or aircraft and displaying images reminiscent of different insects or aircraft.

FIG. 29 illustrates a mobile computing device used to update the image on the flying insect or aircraft toy bricks of FIGS. 26-28.

FIG. 30 is a simplified block diagram illustrating an example of a toy brick solar panel recharging system.

FIG. 31 is a simplified block diagram illustrating an example of a toy brick inductively coupled recharging system including an inductive charging device.

FIG. 32 is a flow diagram illustrating an example of a crash test recording algorithm.

FIG. 33 is a flow diagram illustrating an example of an addressable device communication algorithm.

FIG. 34 is a flow diagram illustrating a color change brick algorithm.

FIG. 35 is an algorithm for manipulation of toy brick avatars.

FIG. 42 shows the structure of FIG. 41 with a second portion of the baseplate positioned within the interior of the first portion and providing an open region permit direct visual access to a portion of the display screen.

FIG. 43 shows the structure of FIG. 41 with an alternative second portion of the baseplate occupying the entire interior of the first portion of the baseplate thereby completely covering the display screen.

DETAILED DESCRIPTION OF THE INVENTION

Figure 1:
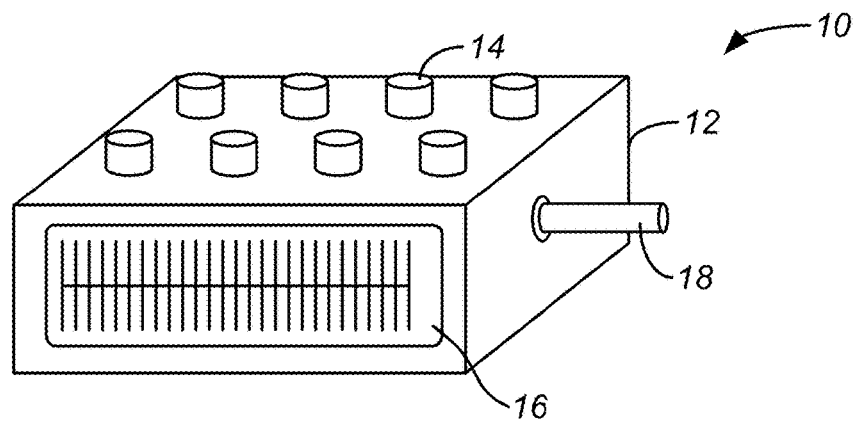
FIGS. 1-35, described below, are taken from U.S. patent application Ser. No. 13/681,143.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

The prior art discussed above consists of inanimate toy bricks suitable for small children, or more complex powered and wired or coupled toy brick elements, which must be assembled intelligently, in order to perform a function. The toy bricks which require intelligent coupling in order to perform a function are suitable for much older children. Examples of the toy brick described herein allow some animation functions to be experienced by younger children, without requiring them to understand electrical concepts. The toy bricks, as well as other playing pieces, are also well-suited for use with baseplate assemblies discussed below starting with FIG. 36.

In addition, the prior art discussed above typically requires wiring between blocks to provide power to and control functions between the blocks. Such wires or connection between blocks distract from the object to be created by the blocks. Examples of the toy brick will also allow some functions to be achieved without the use of wires. While the toy brick building system disclosed in U.S. Pat. No. 7,708,615 does not require wires, it discloses the use of function bricks, sensor bricks and logic bricks which require intelligent assembly and thus may not be suitable for younger children.

An intent of the various examples of the toy brick is to provide the end user with a rich experience from a toy brick, without burdening the user with needing to gain knowledge of how that experience is delivered. Typically a user would perform an action in order to initiate the experience, sensors and a controller within the toy brick would detect the interaction of the user with the brick, the toy brick will then automatically perform an action, in response to the stimulus.

As shown in FIG. 1, a first example of a toy brick is a single toy brick 10 including a housing 12 typically of size 3 inches or less on each side, the housing carrying coupling elements 14 used to releasably couple housing 12 of one toy brick 10 to the housing of another toy brick. The coupling element typically include pegs or other extending elements acting as first coupling elements which mate with corresponding openings, not shown, formed on housing 12 of other toy bricks 10. For ease of illustration only one set of peg-type coupling elements 14 are shown. Coupling elements 14 are typically conventional and may be compatible with coupling elements used with LEGO® brand toy bricks. The toy brick 10 example of FIG. 1 also includes a solar cell 16 mounted to one side of housing 12 and a shaft 18 extending from another side of housing 12. Solar cell 16 forms part of the power source for a toy brick 10 while shaft 18 is a type of actuator. These features will be discussed in more detail below. A toy brick 10 will also include sensing and control functions integrated within the toy brick.

Such a toy brick 10 would perform a function in response to a stimulus. The function to be performed is dependent on the sensors present, the programming of the controller, and the actuators present on toy brick 10, which are discussed in detail below.

Figure 2:
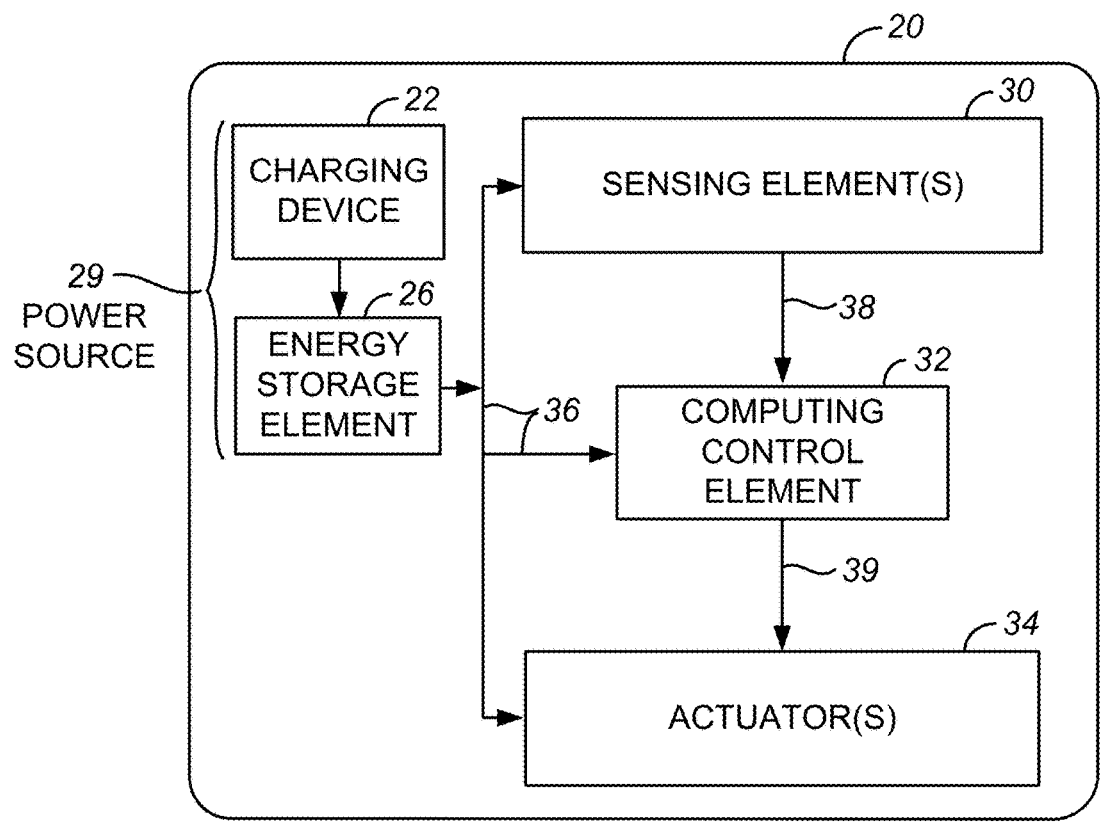
Figure 3:
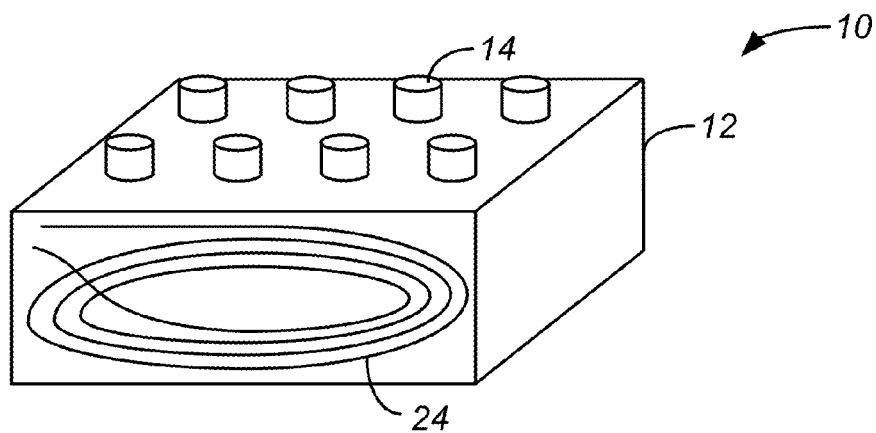

FIG. 2 is a block diagram 20 of the main functional components of an example of toy brick 10. In this example, the charging device 22, which typically is in the form of solar cell 16 or an inductive charging device 24 shown in FIG. 3, is mounted to or is an integral part of housing 12. Solar cell 16 can be used to create electricity from light. Inductive charging device 24 uses electromagnetic induction to create electrical current to charge energy storage element 26. An external charging station, not shown, creates an alternate magnetic field and is positioned near the coils of inductive charging device 24 to send electromagnetic energy to inductive charging device 24 thereby inducing an electrical current within the coils of inductive charging device 24. Charging device 22 is connected to a rechargeable electrical energy storage element 26 by a line 28. Energy storage element 26 is typically in the form of a battery. However, energy storage element 26 can also be of other types, such as a capacitive energy storage element. Charging device 22 and energy storage element 26 constitute a power source 29. Energy storage element 26 is connected by power lines 36 to at least one sensing element 30, a computing control element 32, and usually to at least one actuator 34. Sensing element 30 communicates with computing control element 32 through a line 38 while computing control element 32 is coupled to actuator 34 by a line 39. In some cases, any power required by actuator 34 may be provided through, for example, computing control element 32.

The provision of a rechargeable power source 29 within the toy brick 10 will allow the toy brick 10 to be incorporated into structures without the need for wires. Further, recharging capability will allow any model or other structure built with the toy brick 10 to exist without requiring disassembly for replacing or recharging the batteries. The ability to transfer electrical power without electrical contact will also allow the brick to be hermetically sealed, so as to be child friendly.

A function of some examples of the toy brick is to detect an input via the sensing element 30, then determine via computation or other logic as described below if the input conditions satisfy the predetermined requirements to actuate one or more actuators 34, and if so actuate one or more actuators 34, typically in sequence or simultaneously as per a predetermined pattern.

Figure 4:
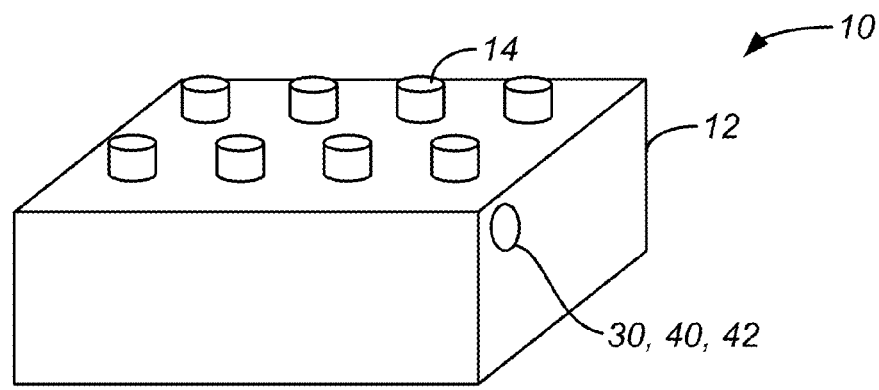
Figure 5:
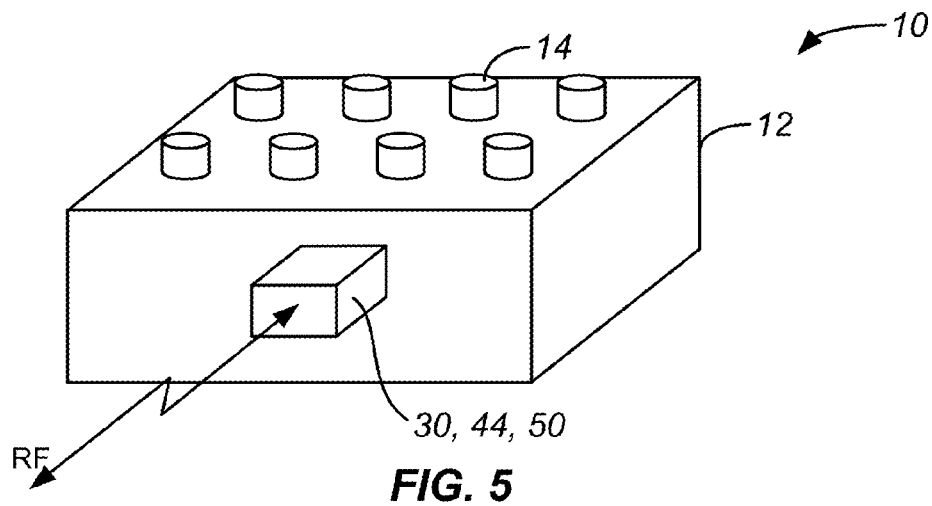
Figure 6:
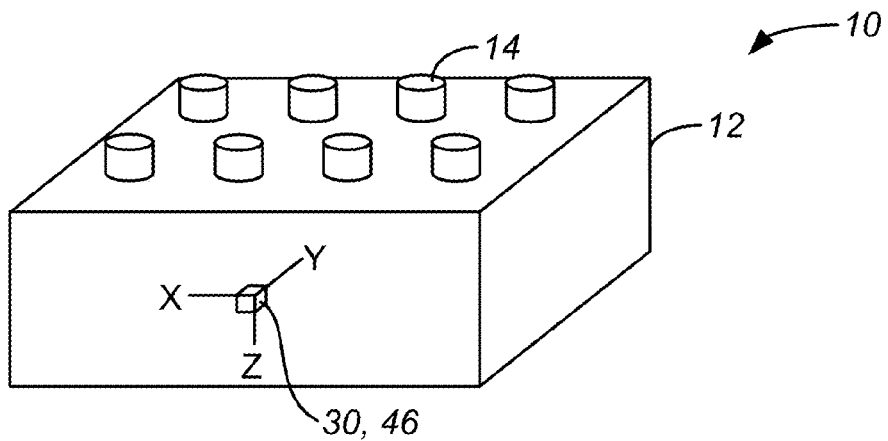
Figure 7:
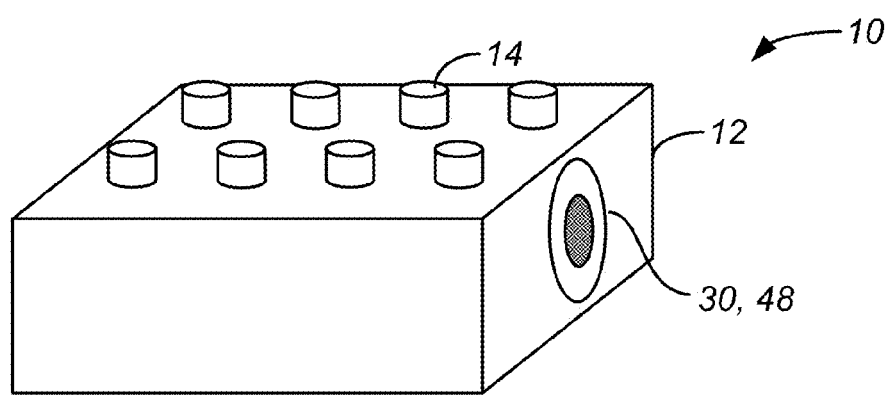
Figure 8:
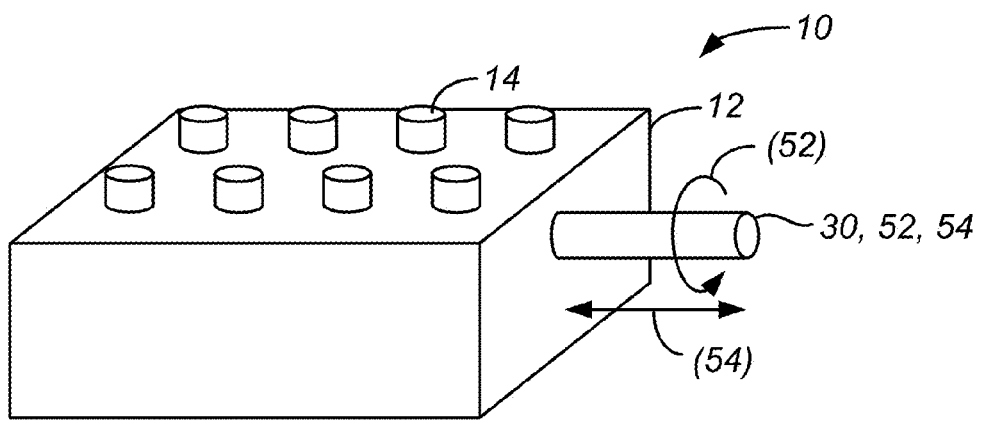

Sensing elements 30 can be one or more of the following: (1) a microphone 40 for reception of a sound encoded trigger, such as, but not limited to a clapping sound or voice recognition as shown in FIG. 4; (2) an infrared or visible light detector 42 for receiving a light encoded trigger as shown in FIG. 4, such as but not limited to a signal from an infrared remote, or the passage of a flashlight beam across a light sensor; (3) an RF transceiver 44 for detecting a radio frequency encoded trigger as shown in FIG. 5, such as but not limited to a Bluetooth signal from an iPad; (4) a 3 dimensional tilt sensor, or gyroscopic sensor, or gravity sensor 46, as shown in FIG. 6 for detecting a motion triggered event such as but not limited to, a shaking of the toy brick 10 or orientation of the toy brick, or a time course of certain motions of the toy brick; (5) a camera 48 for capturing still or moving images, as shown in FIG. 7; (6) a position triangulation sensor 50 such as but not limited to a global positioning sensor as shown in FIG. 5; (7) a shaft angle sensor 52, as shown in FIG. 8; and (8) a shaft extension sensor 54 also shown in FIG. 8.

Figure 9:
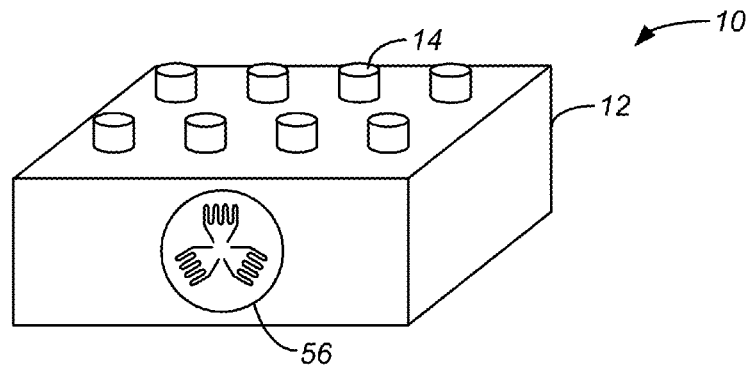
Figure 10:
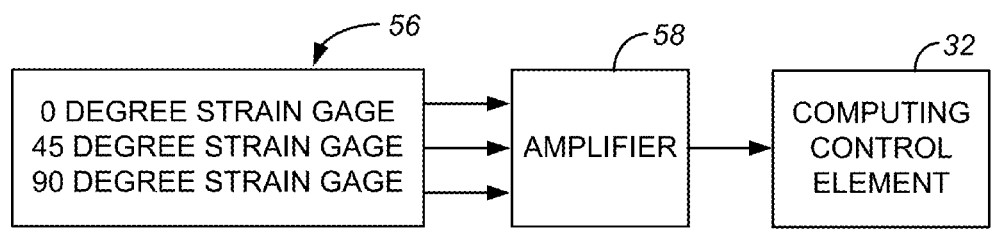
Figure 11:
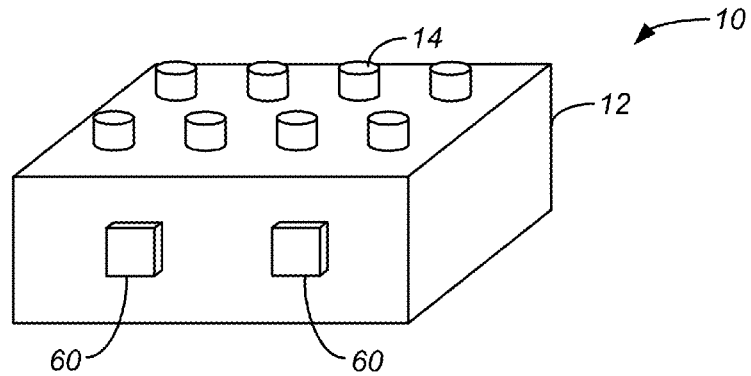
Figure 12:
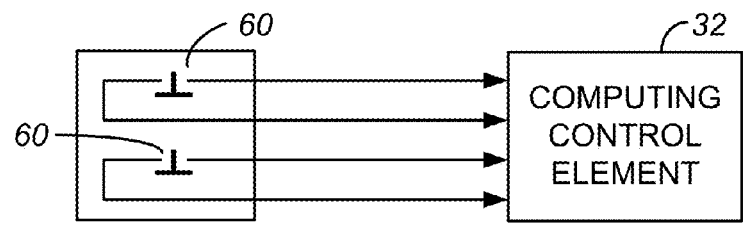

A gripping force sensor 56, typically in the form of a strain gauge rosette as shown in FIG. 9, can be used to sense forces exerted on toy brick 10. FIG. 10 illustrates, in a simplified manner, components within a toy brick 10, sometimes referred to as a gripper force brick 10, including an amplifier 58 coupled to computing control element 32. For example, two push button electrical switches 60. Although switches 60 are shown both on one side of toy brick 10, a greater or lesser number can be used and can be on more than one side. FIG. 12 illustrates, in a simplified form, switches 60 coupled to computing control element 32 within toy brick 10

In some examples, not illustrated, toy brick 10 may be constructed so that it takes more force to decouple a component, such as power source 29, actuator 34 or sensing element 30, from housing 12 than it does to decouple the housing 12 of one toy brick 10 from the housing 12 of another toy brick 10.

Figure 13:
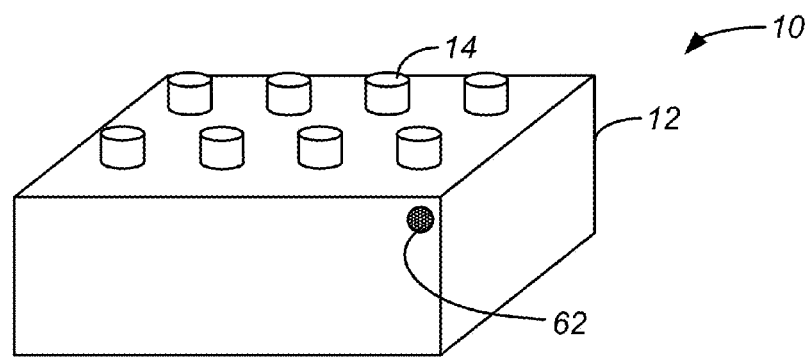
Figure 14:
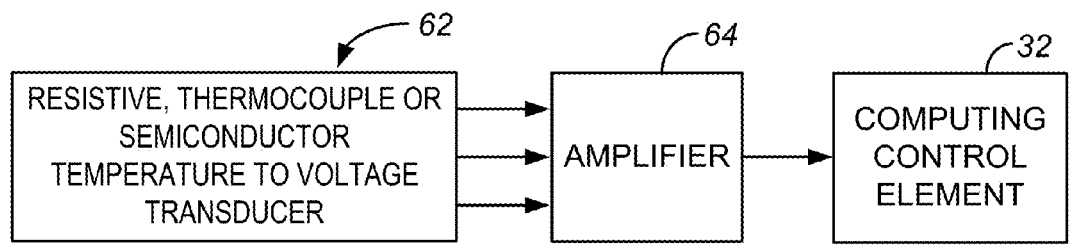
Figure 15:
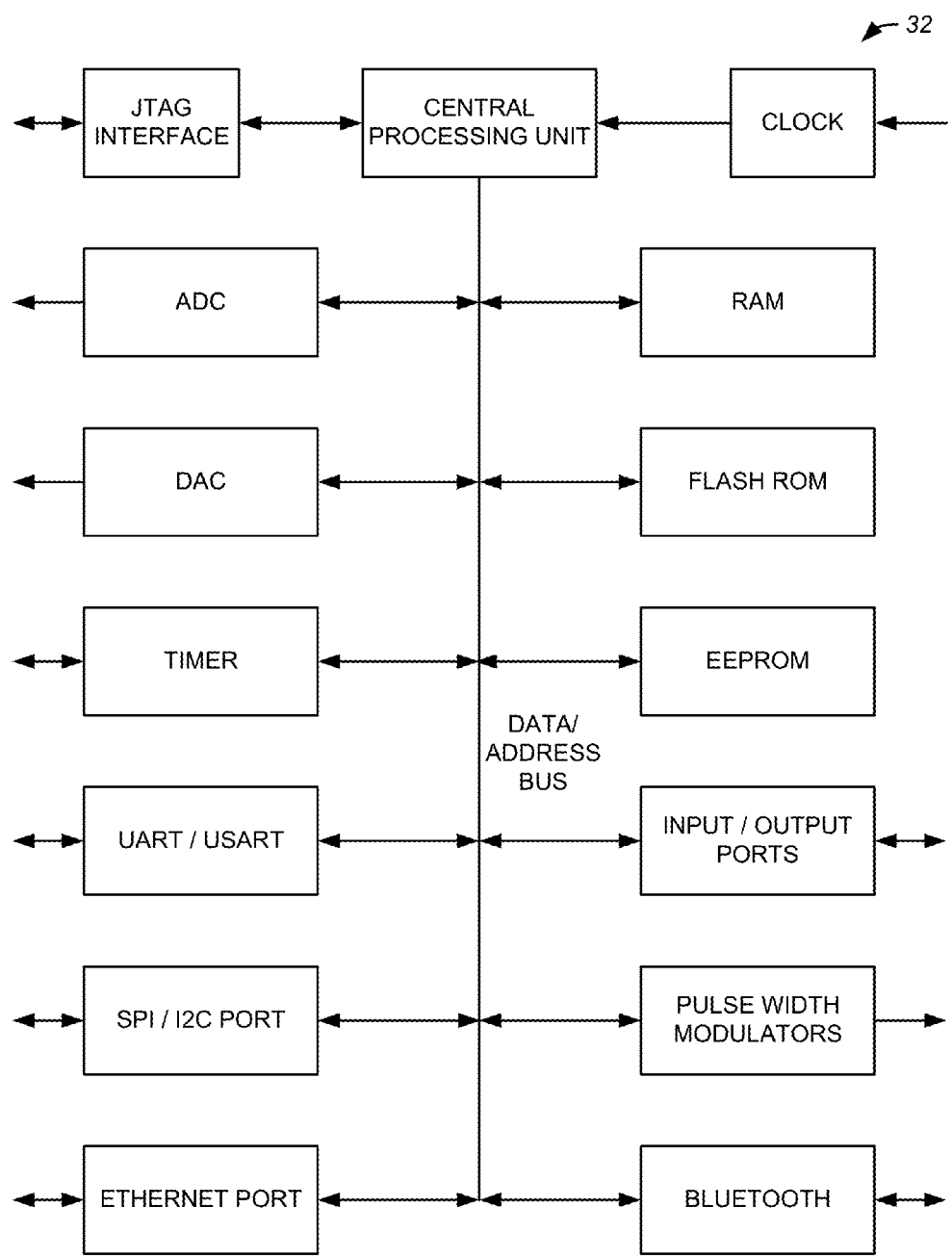

FIG. 13 shows a temperature transducer type of toy brick 10 which includes a temperature transducer 62 typically secured along the inside surface of one of the walls of the toy brick. Temperature transducer 62 may be of different types including resistive, thermocouple, and semiconductor temperature transducers. FIG. 14 shows temperature transducer 62 coupled to computing control element 32 through an amplifier 64. Computing control element 32 can be implemented by, but is not limited to, a microprocessor, or analog or digital circuit, or fuzzy logic controller. FIG. 15 is a schematic diagram illustrating one example of a computing control element 32 in the form of a microprocessor. The programming of computing control element 32 can be preset at the factory, or may be programmable or reprogrammable in the field.

Computing control element 32, in the example of FIG. 15, is a single chip microcontroller. A microcontroller is a microprocessor with several different peripherals such as memory, communication devices, input and output devices built into a one-piece silicon die.

Peripherals can include but are not limited to: USB (Universal Serial Bus), USART (universal synchronous/asynchronous receiver transmitter), I2C (I-squared-C) computer bus, ADC (Analog to Digital Converter), DAC (Digital to Analog Converter), Timers, Pulse Width Modulators, Flash Memory, RAM Memory, EEPROM (Electrically Erasable Programmable Read Only Memory), Bluetooth interface, Ethernet interface, liquid crystal driver interface. An example of such microcontrollers would be the Texas Instruments TMS320LF28XX family or MSP430 family of microcontrollers.

Typically a microcontroller is designed to perform a specific task, and only requires a subset of all possible peripherals to be present in order to perform that task. Usually only the input and output of the peripheral devices are externally accessible via metal pins. The internal data and memory access bus structure is not typically connected to the externally accessible pins of the chip.

The microcontroller receives signals as electrical voltages or currents, presented to one or more of its externally accessible pins. These signals are typically sampled on a one time basis, continuously, or at a regular time intervals by circuitry within the microcontroller, such as an analog to digital converter. The time course and amplitude of such a signal may be kept in the internal memory and analyzed by algorithms. By way of example, a speech recognition algorithm may analyze digitized speech from a microphone, or a motion detection algorithm may analyze signals from accelerometers or tilt switches.

The algorithms which analyze the digitized electrical signals, can be written in a language such as Basic, C or Assembly. The Algorithms may implement logical functions such as: "IF INPUT signal is GREATER THAN a VALUE THEN turn ON an OUTPUT". The signals may in addition be transformed by transforms such as but not limited to the Fourier transform, or form feedback based algorithms in the S or Z domain such as Kalman Filters. Other algorithms such as neural network based fuzzy logic are also implementable. Indeed almost any algorithm that can be run on a personal computer can be implemented on a microcontroller based design.

Signals received may also be from a communication device, such as a Bluetooth link to an external device such as an iPad® or other tablet computer. Such signals may contain a full message of actions to perform, requiring the microcontroller to perform those actions rather than attempt to make a decision as to if actuation is warranted.

Computing control element 32, in the form of microcontroller 32, receives electrical signals, performs analysis of said signals and then performs an action. Signals for actuation are sent as electrical signals from the pins of microcontroller 32. By way of example, actuation such as making a noise may require microcontroller 32 to create a time course of electrical signal amplitudes, which may be accomplished by means of a DAC (Digital to Analog Converter) which varies the amplitude of the voltage on a pin of microcontroller 32. In another embodiment, actuation of a display, for example, may require microcontroller 32 to send out RGB (Red/Green/Blue) intensities to various display pixels in order to create an image.

Microcontroller 32 may in addition manage battery charging and also conservation of power by powering down peripherals, and even entering a low power mode (sleep mode) and only exit from the low power mode (wake up) at either certain intervals to check if signals are present, or may wake up due to a signal being presented to one or more peripherals which are capable of waking the microcontroller from a sleep state.

Computing control element 32 analyzes the signals from the one or more sensing elements 30, as described below by way of example in FIG. 16, and makes a determination as to if actuation is warranted, and then sends signals to one or more actuators 34 as prescribed by the logic or programming of the computing control element 32. The computing control element 32 will also typically have memory that is readable and writeable, and may be nonvolatile. The programming of computing control element 32 may, in some examples, be altered in the field by erasing and rewriting the program memory via wireless download, for example. Data form signals monitored may also be stored in the memory for later retrieval. For example, a toy brick 10 that is involved in a crash test may have its motion during the crash stored inside the memory of the computing control element 32 of the toy brick for later retrieval and display, or a video or picture may be stored on the toy brick for later retrieval and display.

Figure 16:
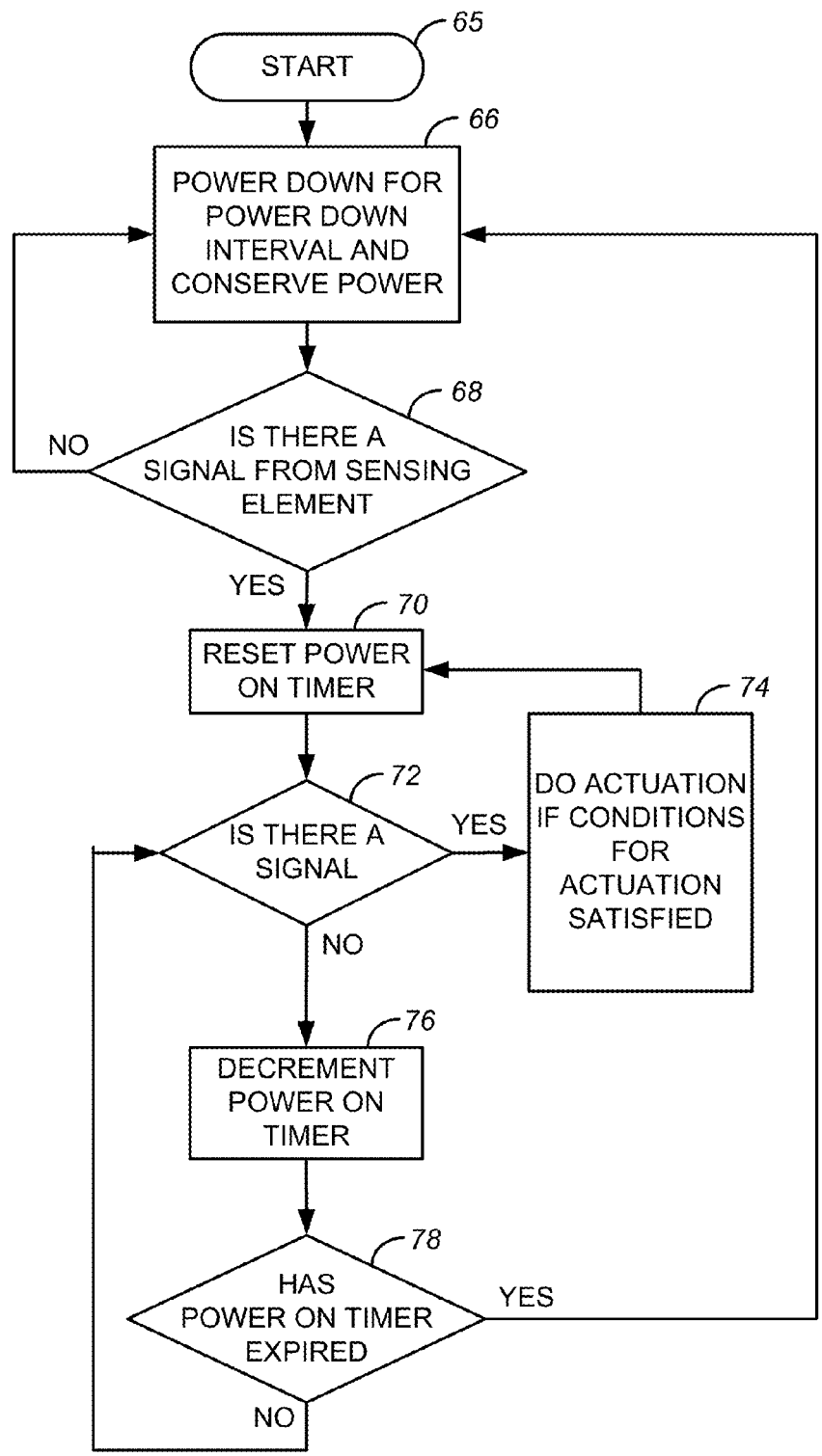

An example of a process for power management, signal detection and actuation is shown in FIG. 16. Initially, after start step 65, computing control element 32 is in a powered down mode as indicated at step 66. At step 68, if there is no signal from a sensing element 30, the program returns to step 66. If there is a signal from a sensing element 30, the program resets power on the timer at step 70 to a fixed predetermined number, such as 60 seconds. After step 70, there is an inquiry at step 72 whether or not there is a signal. If there is a signal, such as from an accelerometer, an appropriate actuation, such as emission of a sound, is conducted if conditions for the actuation are satisfied at step 74, followed by return to step 70. If there is no signal, control passes to step 76 and the power on the timer is reduced. Control then passes to step 78 where the inquiry of whether power on the timer has expired is made. If yes, control is returned to step 66. If no, control is returned to step 72.

Figure 17:
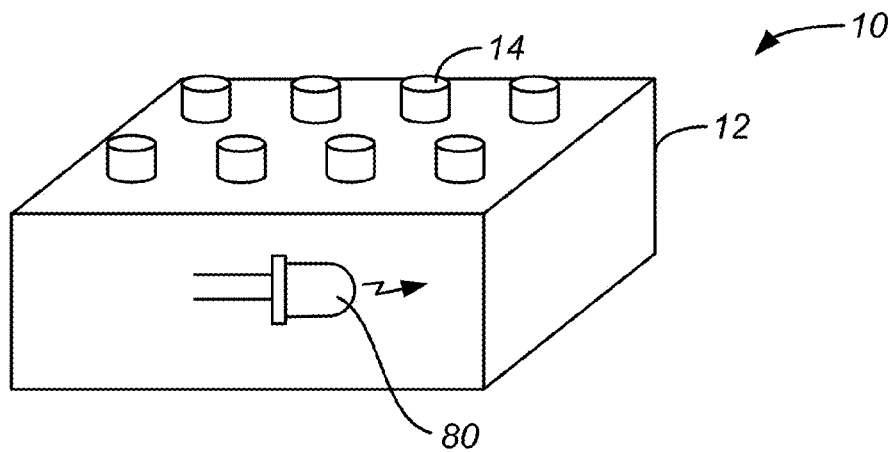
Figure 18:
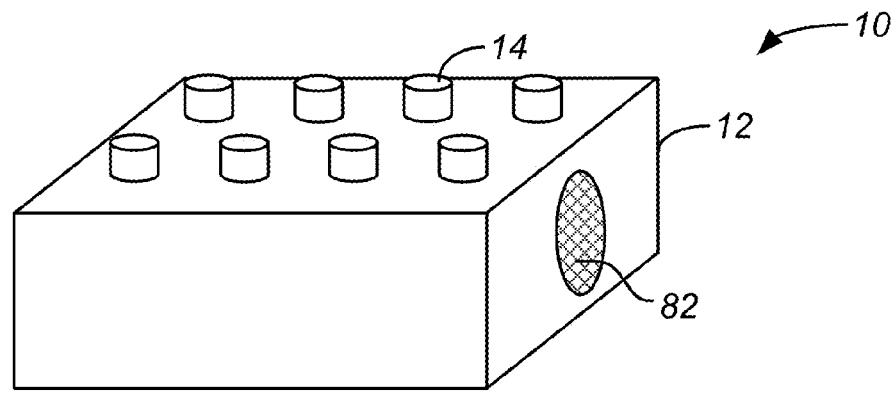
Figure 19:
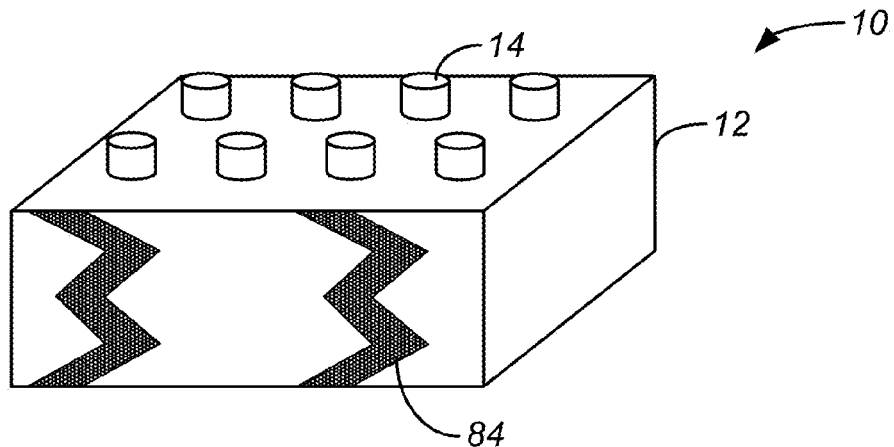
Figure 20:
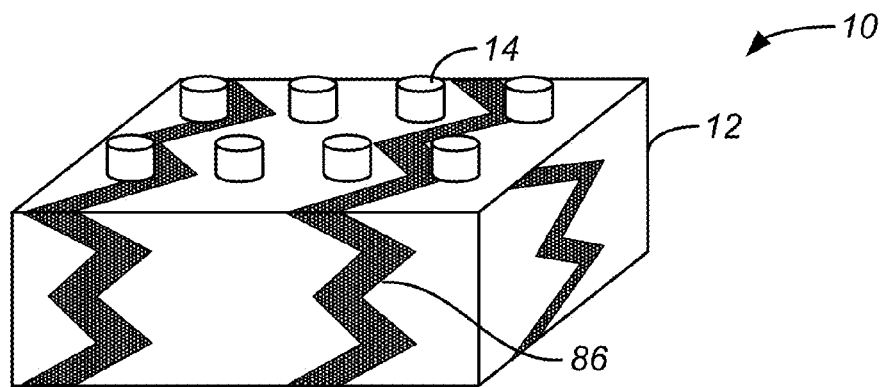
Figure 21:
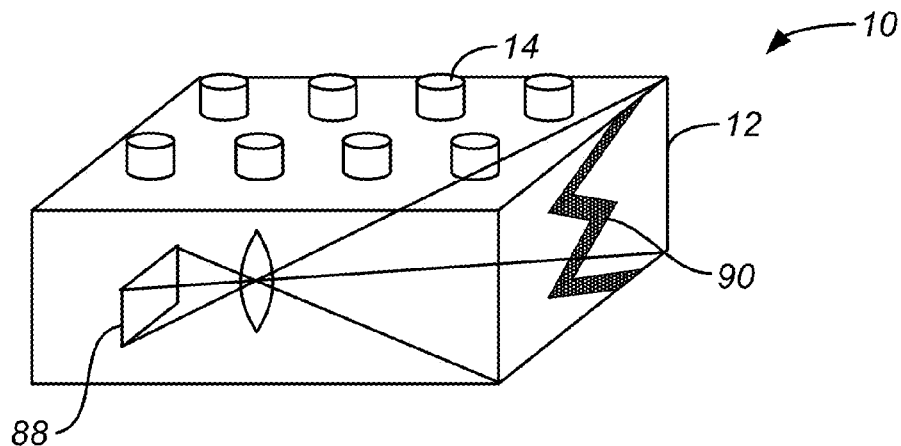
Figure 23:
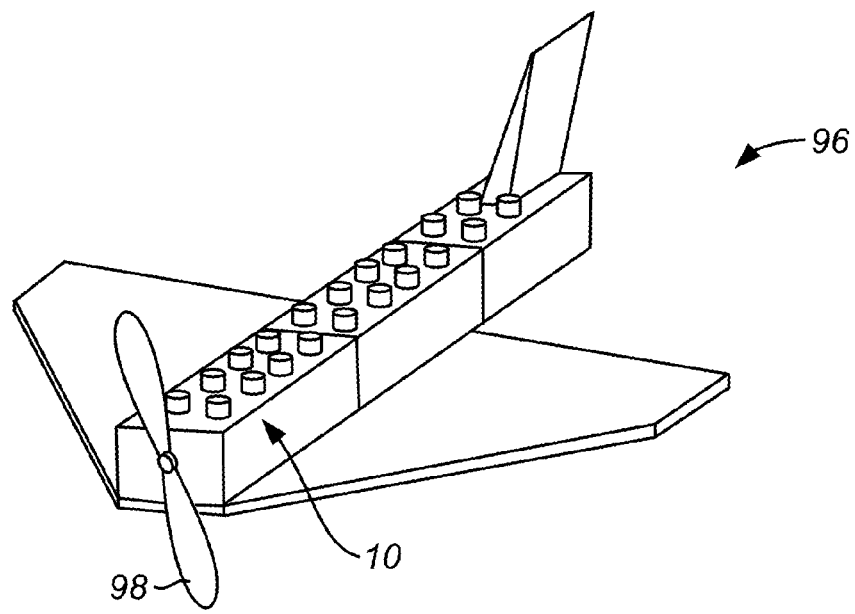

Actuators which generate the output of a toy brick 10 can be, but are not limited to, one or more light sources 80, as shown in FIG. 17 and sound emission devices, such as speaker 82 as shown in FIG. 18. In addition, output can be generated by graphical displays including flat displays 84 as shown in FIG. 19, organic LED or organic LCD wraparound displays 86 as shown in FIG. 20, projected image displays 88 and the associated projected image 90 as shown in FIG. 21, and fiber-optic displays 92 and the associate projected image 94. In addition, output can be generated by a variety of other devices such as motors, radio transmitters, radio transceivers and solenoids. Actuators 34 can also include various types of transmitters. Actuation can be simple on/off or more complex actions such as but not limited to transmission of a radio signal, or even a time course of actions. Examples of Various Embodiments of Toy Bricks:

By way of example, in one embodiment, a single brick 10, similar to that shown in FIG. 1, may, when left undisturbed simply go to a "sleep" state, such as when power on the timer has expired at step 78 in FIG. 16, while charging its battery or other energy storage element via ambient light, from a solar cell 16 on one of its surfaces. Then when brick 10 is lifted, it may, for example, emit the sound of an airplane taking off, when dived make the sound of an airplane diving, and when shaken emit the sound of guns. Such a brick 10 would be suited to the building of a toy brick fighter aircraft as shown in FIG. 23. The toy brick fighter aircraft as shown in FIG. 23 is constructed with a single toy brick 10 including the components illustrated in FIG. 2. The other toy bricks used in the construction of the toy brick fighter aircraft are conventional toy bricks without the components of FIG. 2. However, as discussed below, additional toy bricks 10 could be used in the construction of the toy airplane.

In yet another embodiment, a single brick with integral solar power battery and Bluetooth receiver, again see FIG. 1, may spin a small motor with a shaft protruding from one side, when a Bluetooth radio signal is received from, for example, a tablet computer, such as an iPad®, or a smart phone, such as an iPhone®. Such a brick may be used in a windmill, for example. Another use of such a brick may be to build several small toy brick airplanes 96, as shown in FIG. 23, which can be remotely made to turn their propellers 98 when a Bluetooth signal is sent from a mobile or fixed computing or communication device.

Figure 24:
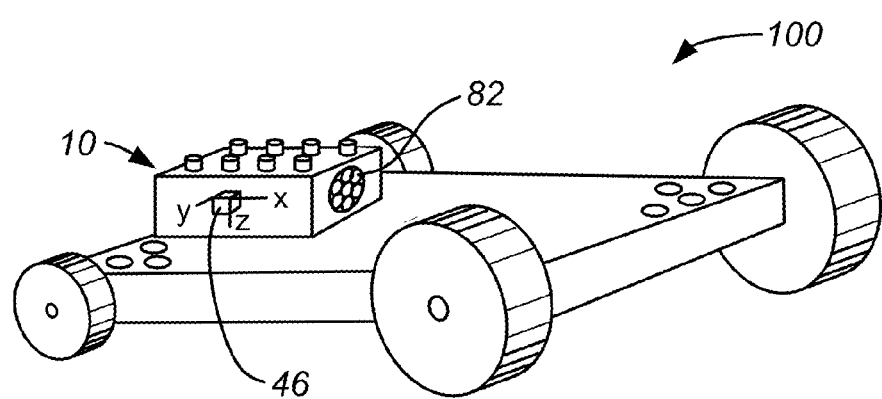

In yet another embodiment, shown used as a component of a racecar 100 in FIG. 24, a brick 10 may incorporate several features, such as speaker 82 of the brick 10 of FIG. 18, and 3-D movement sensor 46 of the brick 10 of FIG. 6, and make an engine revving sound when moved back and forth and the sound of a car "peeling tires" when pushed fast in one direction.

In yet another embodiment, a clear brick 10, similar to that of FIG. 17, with a self-contained power source may have red, green, and blue light sources 80 within it and have its color set by remote from an iPad per the computer algorithm described below with reference to FIG. 34 or, in another embodiment, change color when held at different orientations by means of actuation being controlled by a tilt or gravity sensor.

Figure 25:
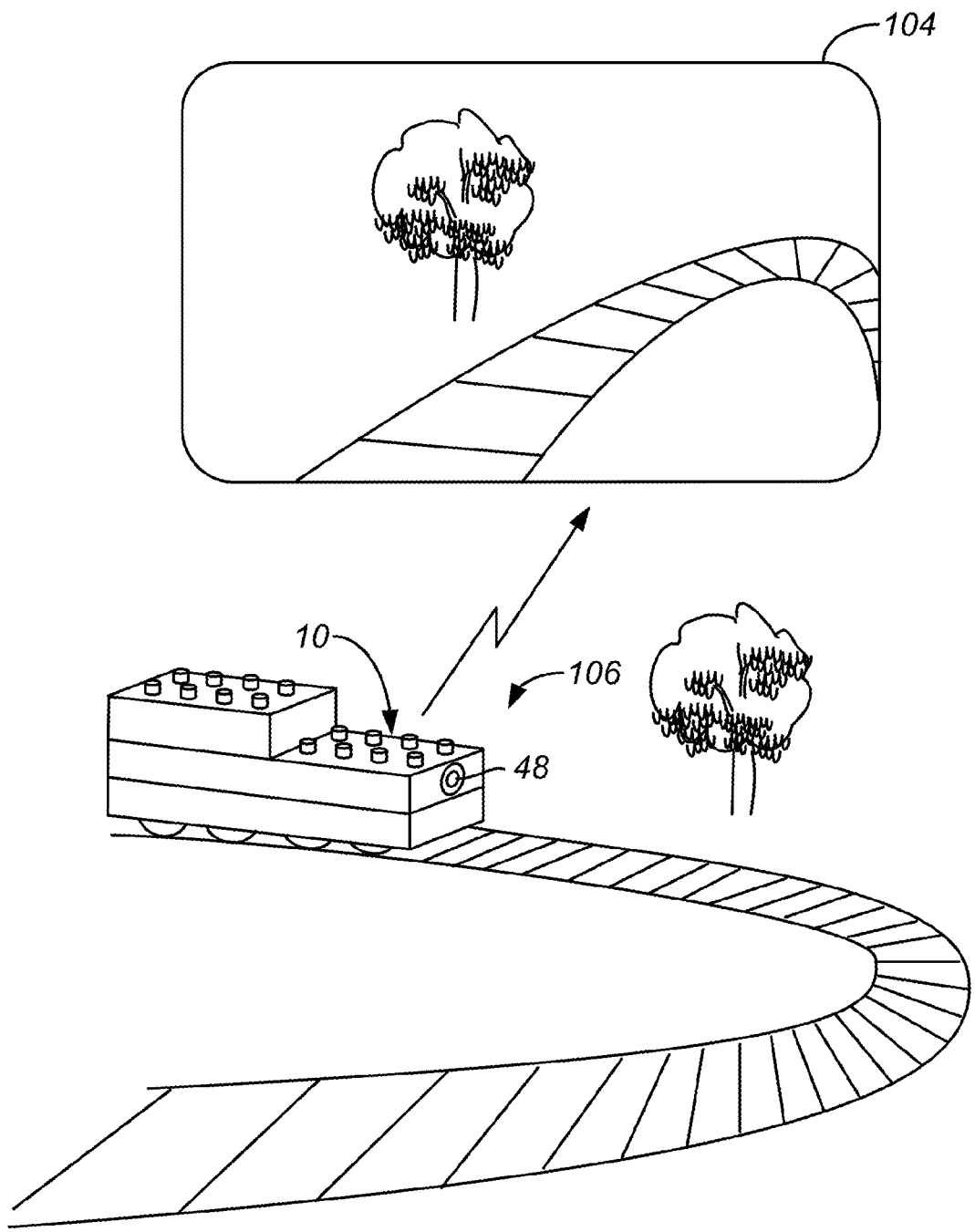

In yet another embodiment as Shown in FIG. 25, a toy brick 10 with a camera 48 similar to that shown in FIG. 7, may transmit a video signal via Bluetooth or Wi-Fi to a mobile or fixed device including a display screen. Such a brick when incorporated into a model such as, but not limited to, a toy brick train 102, will enable a view 104 as seen from the toy to be experienced by the user on, for example, a tablet computer screen.

In yet another embodiment, not illustrated, a toy brick 10 with a camera 48 and integral face or object recognition algorithm may greet a child with a sound such as "Hello John" when approached. The face to be recognized and the sound to be emitted by the brick may be user downloadable into the toy brick 10 via radio link. The face may even be self-learned by the video captured by the camera itself. Alternatively when the face is recognized the toy brick may transmit a signal to a fixed or mobile computing device.

In yet another embodiment, a sequence of sensing and a sequence of actuation may be programmed, typically by an adult, into the toy brick 10, with perhaps the aid of a user interface running on a fixed or mobile computing device, with radio link or other connection to the toy brick. Once programmed, a child may interact with the brick in a much simpler manner.

In yet another embodiment, several different shaped bricks may be manipulated by a child or other user. The bricks will transmit their shape and position to a fixed or mobile computing device which will show the manipulation of the bricks, with correct shape and size in a virtual building environment on a display screen. Transmission of position may be done by GPS signal, or by a more localized triangulation method, such as through the use of a baseplate, on which the toy bricks 10 are supported, with triangulation capability. The following are three examples of methods of position triangulation.

Measurement of time delay of signals from a signal source of known position: One or more signal sources of known position may send a pulse ("ping") or encoded message via sound, light or radio wave, at a certain time. The message may contain the time that this signal was sent. The message will be received at a later time by the object that is to be triangulated, in this case typically a toy brick 10. By receiving messages from 3 or more such sources of known positions, and by computing the distance to those sources by measuring the delay between the time that the signal was sent and the time that the signal was received, it is possible to triangulate by standard trigonometric methods the position of the object to be triangulated. A simplified embodiment of a toy brick baseplate can be constructed to be capable of triangulating an object, such as toy brick 10, placed upon it. Such a triangulating baseplate may contain four or more signal emitters at the corners, in the plane of the baseplate and also above the plane of the baseplate. These emitters will emit encoded signals, preferably simultaneously. Then by measurement of the time delay between reception of the signals, it would be possible to locate the three-dimensional position of a toy brick in the vicinity of the baseplate.

Measurement of the position of known landmarks, by image analysis: The object to be triangulated may contain a camera and may compute its position by measurement of angles to various landmarks present in the image. By way of example, a toy brick 10 may contain a camera 48 and analyze the position of, for example, specific colored or marked bricks or flashing lights, placed in and above the plane of a base plate.

Measurement of the position of an object by analysis of its position relative to a known landscape: An object may be photographed in two or more, preferably orthogonal, views against a known landscape and its position computed. By way of example, a toy brick baseplate assembly may be constructed to contain two or more cameras capable of photographing the object in plan and elevation, against the baseplate and/or an orthogonal vertical wall with features present upon the baseplate/wall, such as uniquely marked bricks or flashing lights, whose positions are known.

The bricks may be cemented into position in the virtual environment by a gesture of the brick (such as but not limited to a clicking motion) or by pushing a button on the brick as described in the computer algorithm described below with reference to FIG. 35. What is referred to as a clicking motion may be carried out by hovering over a correct position followed by a sharp downward thrust reminiscent of a mouse click. Such manipulation will allow the same brick to be used repeatedly to create a structure in the virtual environment, while no physical structure is created. Further, the manipulated brick may have its avatar on the virtual screen changed so as to be a different shape than the physically manipulated brick; in this case, the physically manipulated brick may be of arbitrary shape.

In yet another embodiment, a toy brick with an accelerometer may be placed in a brick constructed car, such as that shown in FIG. 24, and the acceleration, velocity and position of the car, transmitted and plotted on a mobile or fixed computing device. This will allow standard physics experiments such as acceleration down an inclined plane to be generated with ease. In addition, g forces during a crash test can be plotted and examined. It should be noted that the data may be stored on the brick itself for later retrieval, rather than transmitted in real time.

In yet another embodiment, bricks may be grouped by electronic addressing scheme, as described below with reference to in FIG. 33, such that they may respond individually or as a group to a stimulus. By way of example, four identical toy bricks capable of changing color when shaken, two may be programmed to become red and two may be programmed to turn green. In yet another example of addressing and grouping, bricks with the actuator being a motor may be grouped by electronic addressing scheme. Such bricks may be incorporated in two grouped squadrons of toy brick airplanes, and one or the other squadron selectively commanded to spin their propellers upon command from a fixed or mobile computing device via wireless command. It can be seen by a person skilled in the art that electronic addressing will allow an entire landscape of toy bricks 10 to be commanded via radio or other signal individually, grouped or in a time sequenced manner.

Figure 22:
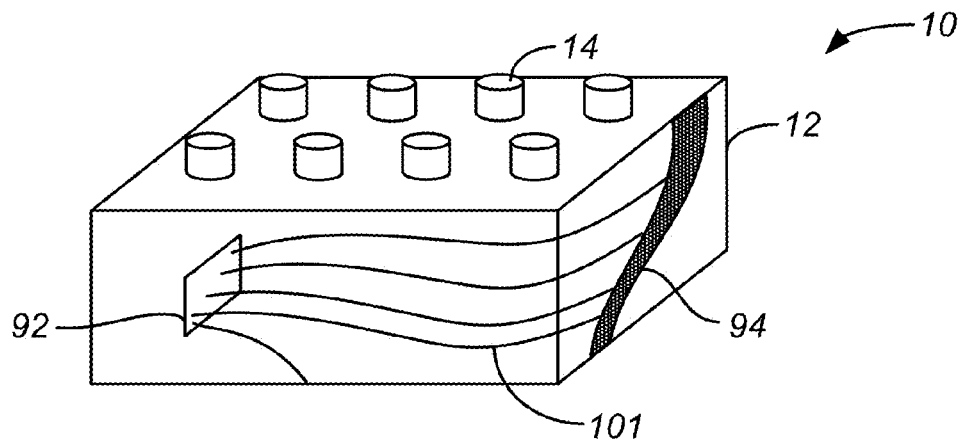
Figure 26:
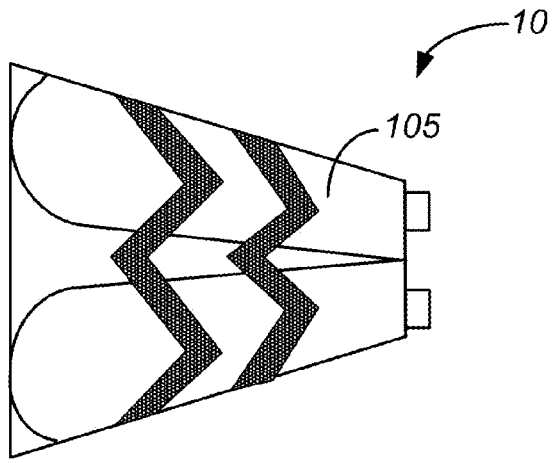
Figure 27:
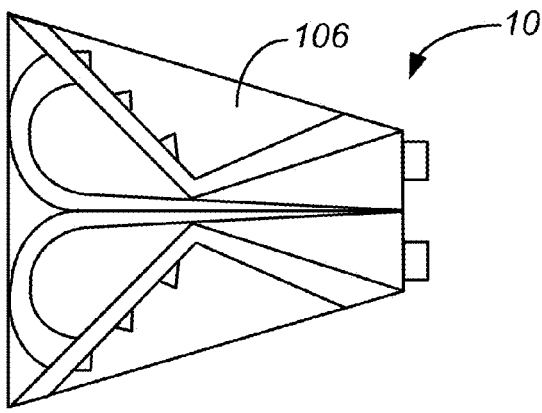
Figure 28:
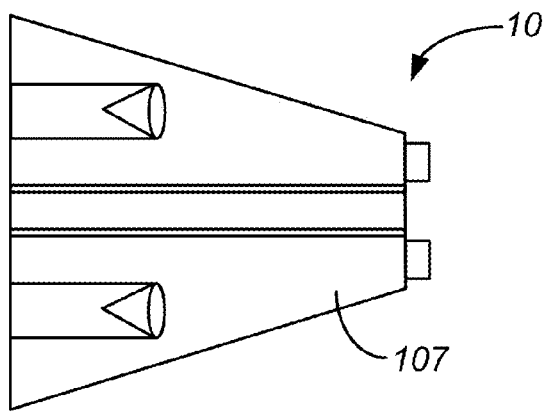
Figure 29:
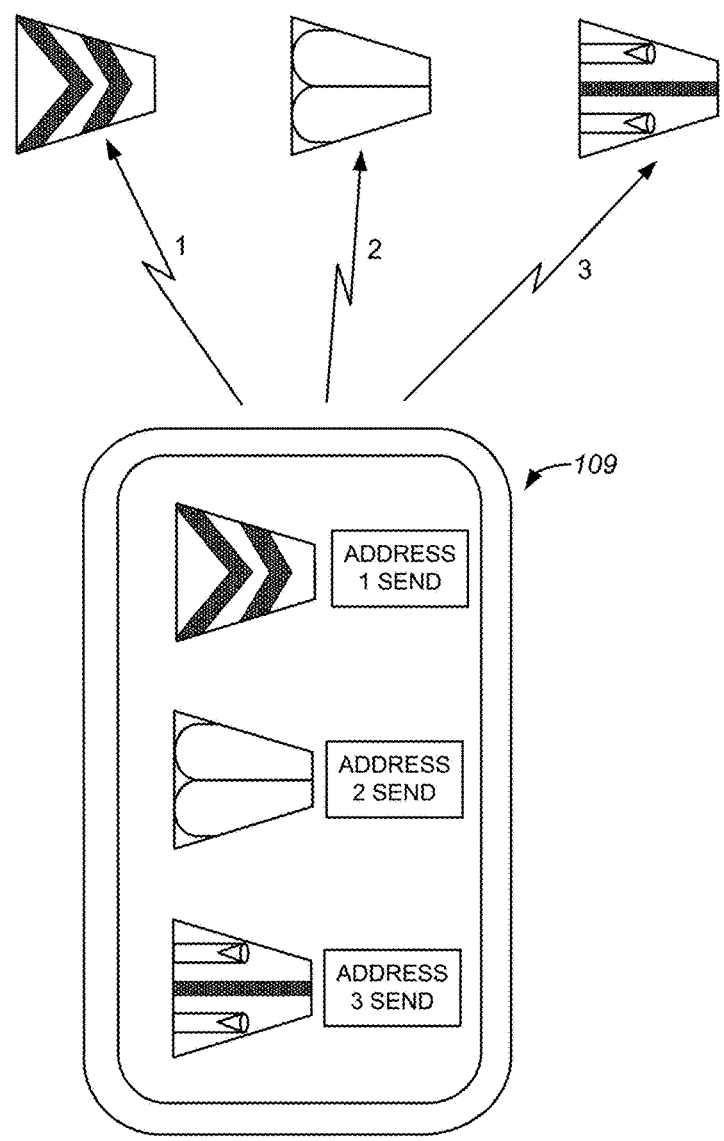

In another embodiment, such as shown in FIG. 19, one or more LCD or other type of color or monochrome displays may be embedded within the brick and multiple images from multiple displays, or multiple images from a single display may be transmitted to one or more surfaces of the toy brick via optical elements such as but not limited to prisms, lenses, as shown in FIG. 21, or by means of light guides such as optical fibers 101 as shown in FIG. 22. By way of example, a toy brick 10 shaped as a flying insect as shown in FIGS. 26-28 may be set to display, for example, the image of a bee 105 as in FIG. 26, or display the image of a locust 106 as in FIG. 27, or an altogether different image 107 as in FIG. 28. The toy brick 10 may be opaque with only some areas having a display, or fiber optic. Brick 10 may have its image updated via integral wireless connection to a fixed or mobile computing device 109 as shown in FIG. 29. The display device can also be of a thin film wrap around type, such as an organic LCD or organic LED displays 86 as shown in FIG. 20. Such a display device can form the "skin" of the toy brick rather than a traditional flat screen device.

Figure 30:
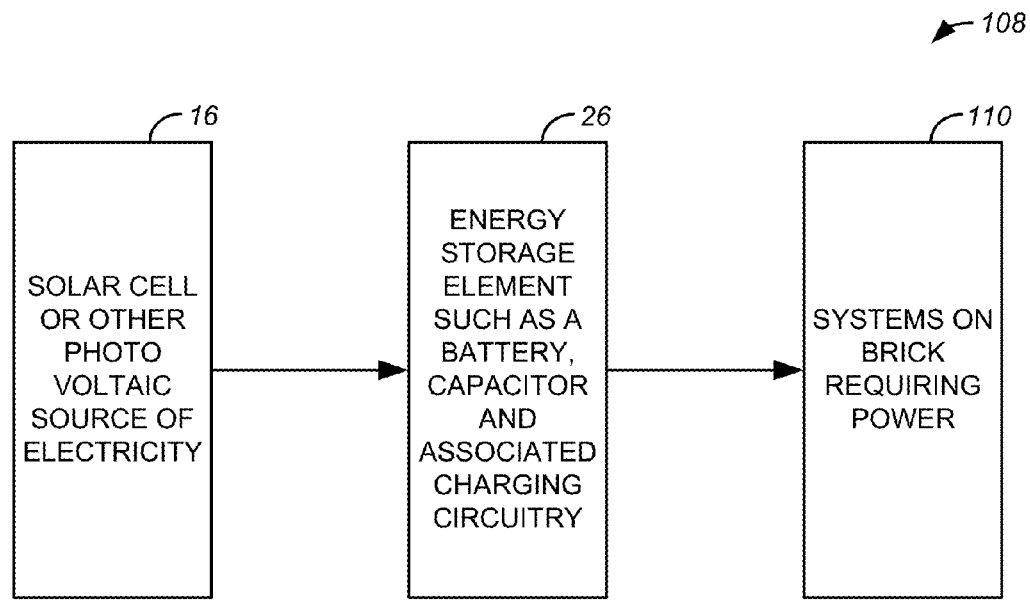

FIG. 30 is a block diagram illustrating an example of a toy brick solar panel recharging system 108. System 108 includes a solar cell 16, or other photovoltaic source of electricity, which provide energy to energy storage element 26, typically in the form of a battery or capacitor plus associated charging circuitry. Energy storage element 26 is then used to provide power to various systems 110, such as sensing element 30, computing control element 32 and actuators 34 of FIG. 2.

Figure 31:
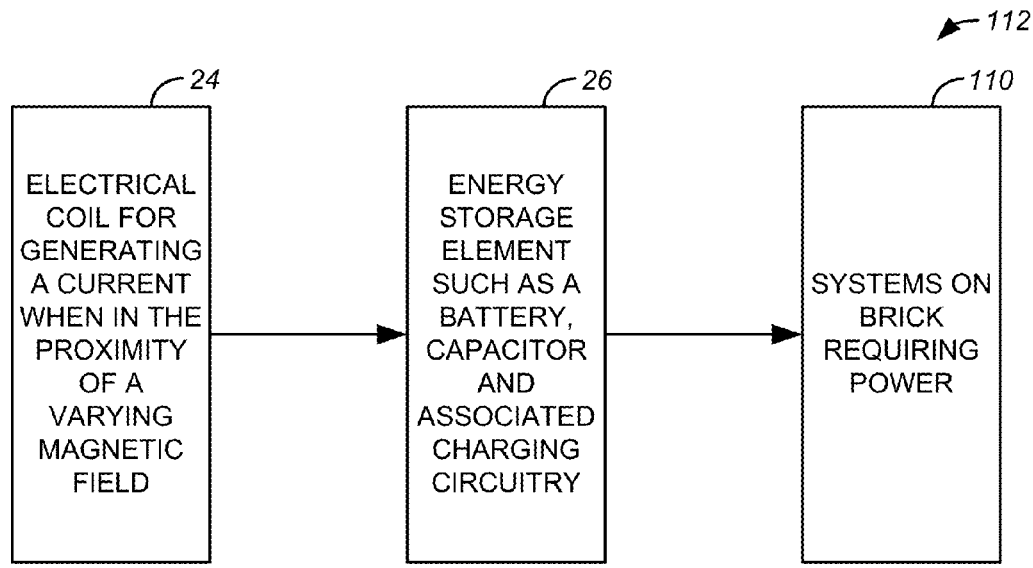

FIG. 31 is a simplified block diagram illustrating an example of a toy brick inductively coupled recharging system 112 including an inductive charging device 24, typically in the form of an electrical coil, which supplies electrical energy to energy storage element 26, typically in the form of a battery or capacitor plus associated charging circuitry. As with the example of FIG. 28, energy storage element is then used to provide power to various systems 110.

Figures 32, 33:
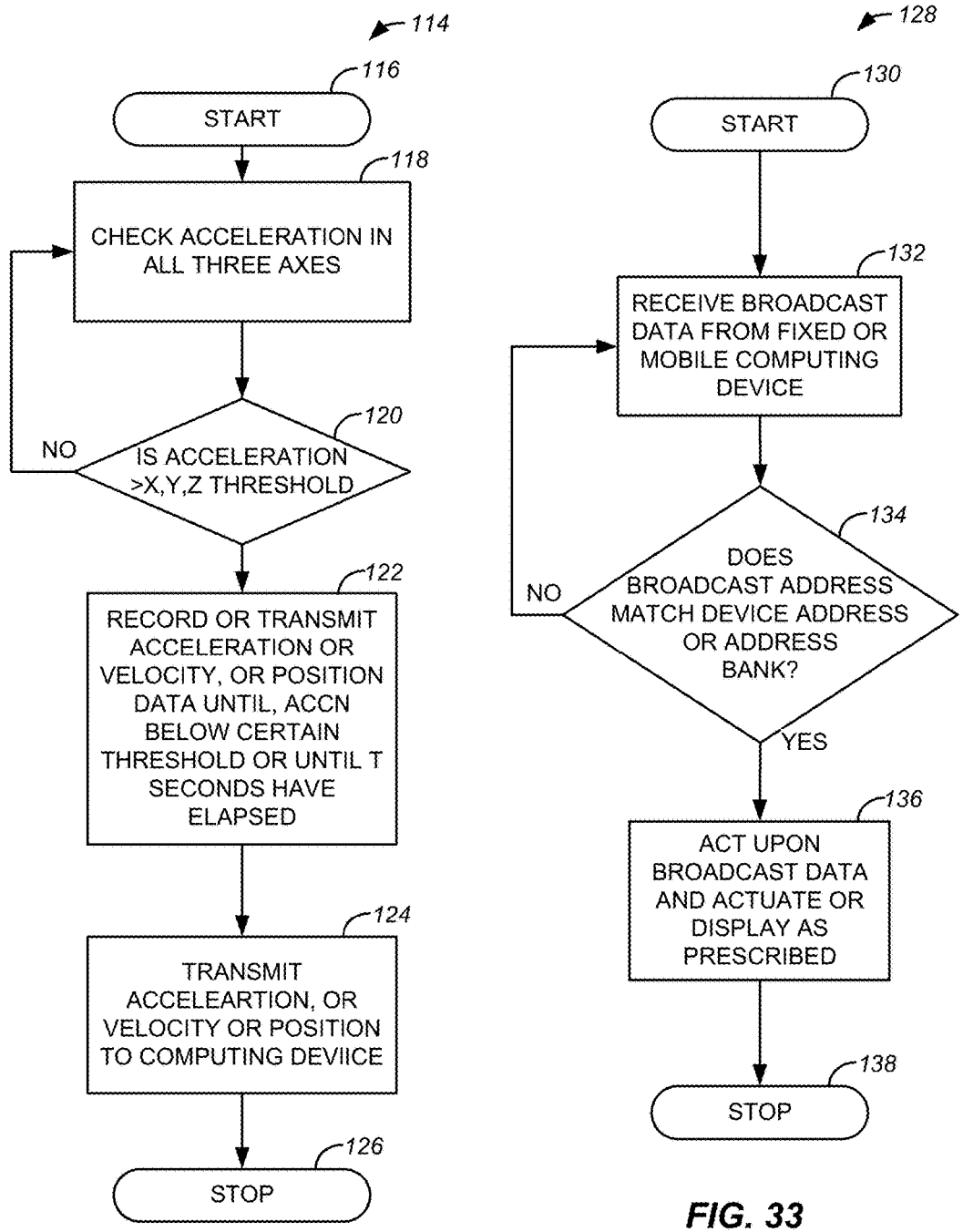

FIG. 32 is a flow diagram illustrating an example of a crash test recording algorithm 114. After start at step 116, acceleration in all three axes is checked at step 118. If acceleration is not greater than a threshold along any of the X, Y or Z axes as determined at step 120, control is returned to step 118; otherwise control is transferred to step 122. At step 122 one or more of acceleration, velocity and position data is recorded and/or transmitted until acceleration is below a threshold value or until a threshold time period has elapsed. Thereafter control is passed to step 124 at which one or more of acceleration, velocity and position data is transmitted to computing control element 32. After that the algorithm terminates at step 126.

FIG. 33 is a flow diagram illustrating an example of an addressable device communication algorithm 128. After start step 130, broadcast data is received from a fixed or mobile computing device at step 132. Thereafter, at step 134, an inquiry is made whether or not the broadcast address matches a device address or an address in an address bank. If no, control returns to step 132. If yes, control passes to step 136. At that step the broadcast data is acted upon to, in this example, actuate a device or display an image as prescribed. By way of example, assume use of binary 8 Bit addressing with a possibility of 256 uniquely addressable light emitting toy bricks 10, such as that shown in FIG. 17. The toy bricks 10 may be assigned arbitrarily to banks, such that bricks 1, 56 and 233 will be in bank "A" and bricks 2, 45 and 123 are in bank "B". A signal may be sent to all bricks in bank "A" to turn on and display red, and all bricks in bank "B" to turn on and emit green light. Thereafter control passes to stop step 138.

Figures 34, 35:
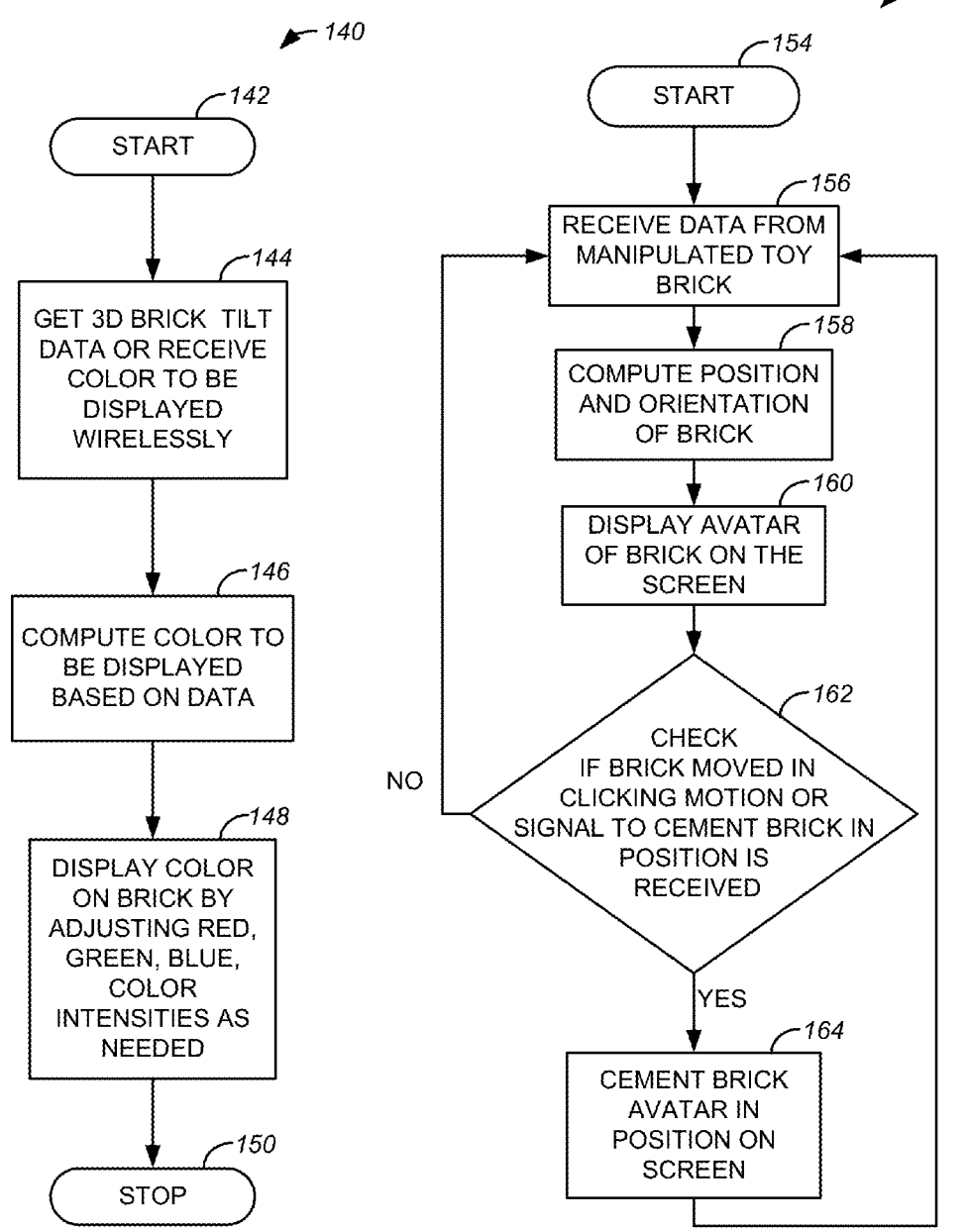

FIG. 34 is a flow diagram illustrating a color change brick algorithm 140. After start step 142, either three-dimensional brick tilt data is obtained from a 3 dimensional tilt sensor 46 or information on the color to be displayed is received from a mobile or fixed computing device via an RF transceiver 44 at step 144. Next, at step 146, the color to be displayed based on the data received from the sensor is computed. At step 148 the color is displayed on the toy brick 10 by adjusting red, green and blue intensities as needed. Thereafter control is passed to the stop step 150.

The final algorithm to be discussed is the algorithm for avatar manipulation 152 shown in the flow diagram of FIG. 35. This algorithm is run on the fixed or mobile computing device, not illustrated, receiving data from the brick being manipulated. After start step 154 data is received from a manipulated toy brick at step 156, by way of example, from sensors such as orientation sensor 46 and position sensor 50, and communicated via transceiver 44. Next, at step 158, the position and orientation of toy brick 10 is computed. Next, the avatar of the toy brick 10 is displayed on a display screen, such as found on a smart phone, a fixed computer or a tablet computer, at step 160. Following that, at step 162 the program checks to see if toy brick 10 has moved in a clicking motion, signifying the toy brick is to be cemented in that position, or some other signal signifying that the toy brick is to be cemented in position is received. If no, control is returned to step 156. If yes, control passes to step 164 at which the brick avatar is cemented in position on the screen, followed by return of control to step 156.

In some examples, computing control element 32 is a user reprogrammable computer control element in contrast with a computer control element that cannot be reprogrammed during normal use, but typically only in a manufacturing-type environment. Such reprogramming can take place in the manners discussed above with regard to the communication algorithm of FIG. 33, the color change algorithm of FIG. 34, and the avatar manipulation algorithm of FIG. 35. That is, the reprogramming of computer control element 32 can be accomplished by either specifically reprogramming the software or as a function of how the toy brick 10 is used.

In some examples, toy brick 10 can generate an output based upon a currently sensed input value and a previously sensed input value. This is opposed to a decision based on a current input only, such as single push of a button. This aspect is based in part on things that happened prior to an event, e.g., two buttons pushed one second apart. In digital computing terms current and previous means more than one clock apart, which in the current generation of computers running at say 4 GHz is $1/(4\times10^9)=0.25$ nanoseconds. A computer's ability to define NOW and BEFORE is defined by its clock speed, since it can only sense things once per clock cycle. However it is possible to have an analog computer do a continuous time integral, for example, the time integral of acceleration yields velocity, and you could have a trigger that triggers when the velocity, as computed by a continuous integral of acceleration, exceeds a certain velocity. In another example, toy brick 10 may be provided an input in the form of a signal received by RF transceiver 44 telling toy brick to await further instruction in the form of an oral command received by microphone 40.

In some examples, toy brick 10 can generate an output(s) or time course of output(s) based on a time course an input(s), wherein the current output(s) or time course of output(s), is determined by mathematical computations based on previous input(s) as well as the current input(s). An example of this is a force or acceleration sensor(s) the signals from which can be integrated to find velocity and integrated again to compute position. Integration is the area under the curve, which is a function of the past history of the signal amplitude over time. In other examples, the mathematical function described can be altered in the field via wired or wireless download of new algorithms. An example of this is a brick which can emit green light when shaken, or can be, for example, reprogrammed via Bluetooth connection to emit red light when shaken. In a further example, each input has more than two possible states (with on and off being two states). Instead, each input may have a continuum of gradually changing values, such as would exist with the input from an accelerometer, the brick may be programmed to continuously change through all the colors of the rainbow as it is tilted in various orientations.

In other examples, toy brick 10 can perform one way or two way communication with an external device wirelessly. The messaging between the devices being more complicated than the detection and/or generation of an instantaneous presence or absence of signal, and is a decoding of the time course of such a signal, said time course carrying an embedded message. An example of this type of toy brick is one which responds to the complex on/off time course of pulsations of light carrying a message from, for example, an infrared remote control.

It can be seen to a person skilled in the art that such a self-contained brick with power, sensing, actuation and control elements within it, sacrifices little of the complex functions possible with the multi-brick prior art. Instead it allows a simple user experience for a small child, and removes the burden of programming the function to the factory, a parent, a teacher, or an older child. The intelligent toy brick provides a much different, much more accessible user experience than the multi-brick intelligent systems described in prior art.

Description of Baseplate Assemblies

Figure 36:
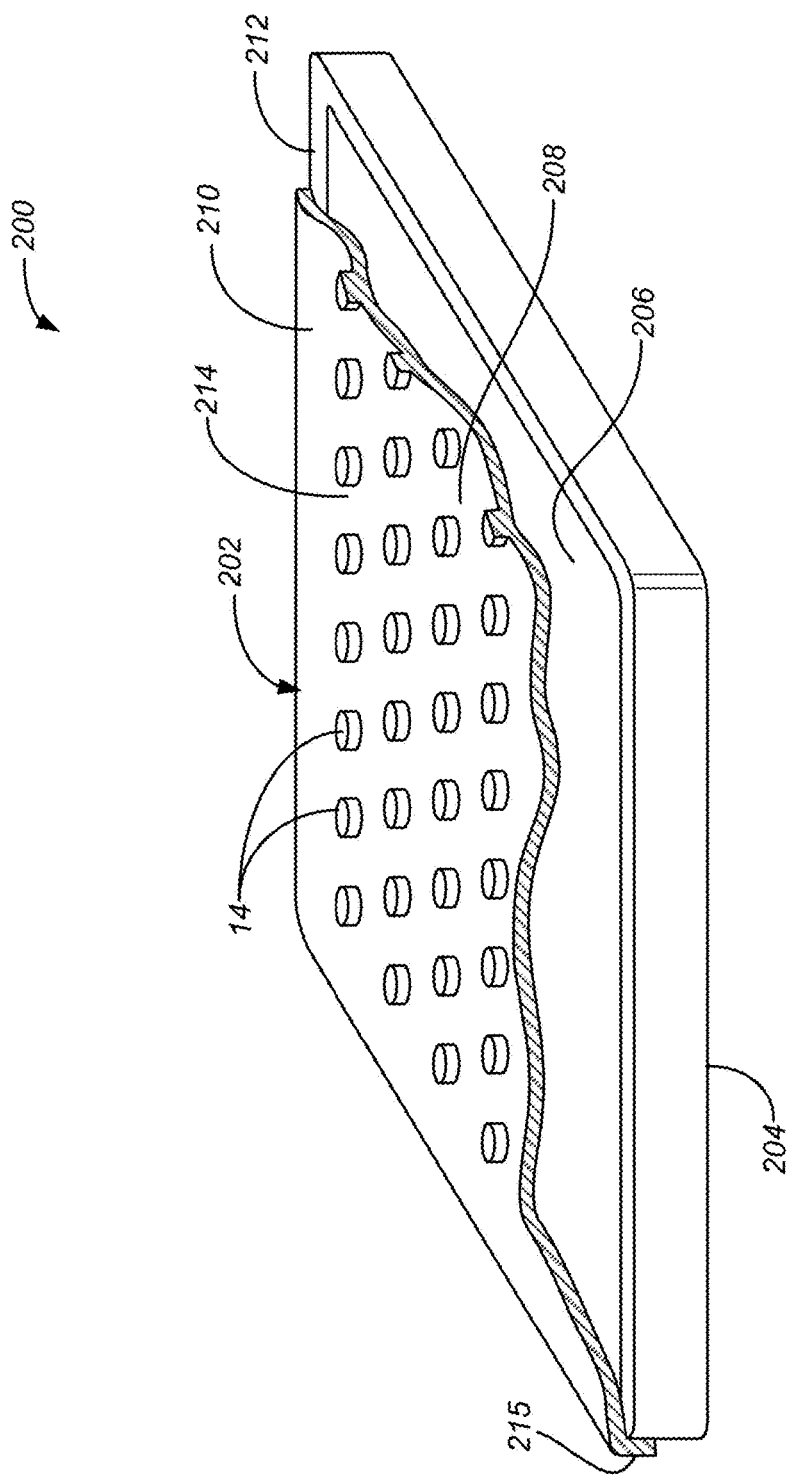
FIG. 36 is an overall view of a baseplate assembly with a portion of the baseplate removed to disclose the display region of the image generating device.

FIG. 36 is an overall view of a baseplate assembly 200 including broadly a baseplate 202 removably mounted to an image generating device 204. Device 204 is typically a pad computer, such as an iPad® computer made by Apple Computer, having a large display screen 206. Image generating device 204 is often referred to as computer 204. In some examples, baseplate 202 and image generating device 204 can be an integral, one-piece device. A portion of baseplate 202 in FIG. 36 is removed to disclose display screen 206 of image generating device 204. The portion of baseplate 202 covering display screen 206, commonly referred to as display region 208, is preferably made of an essentially colorless, transparent material so that images generated by computer 204 at the display screen 206 are transmitted through baseplate 202 for viewing by a user, as well as other uses discussed below, at the display region. Display region 208 is surrounded by an outer region 210 which overlies the outer edge 212 of computer 204. Baseplate 202 has coupling elements 14 extending from its upper surface 214 to permit toy blocks 10 to be removably mounted to the baseplate. In addition to being viewable by a user, images transmitted through display region 208 of baseplate 202 can also be used for interaction with toy blocks 10, also discussed in more detail below. Baseplate 202 includes mounting structure 215 by which the baseplate can be removably mounted to the image generating device 204 so that display region 208 is positioned adjacent to and opposite display screen 206. In this example mounting structure 215 in the form of a lip. Other types of mounting structures 215, including clips and releasable adhesives, may also be used.

Figure 37:
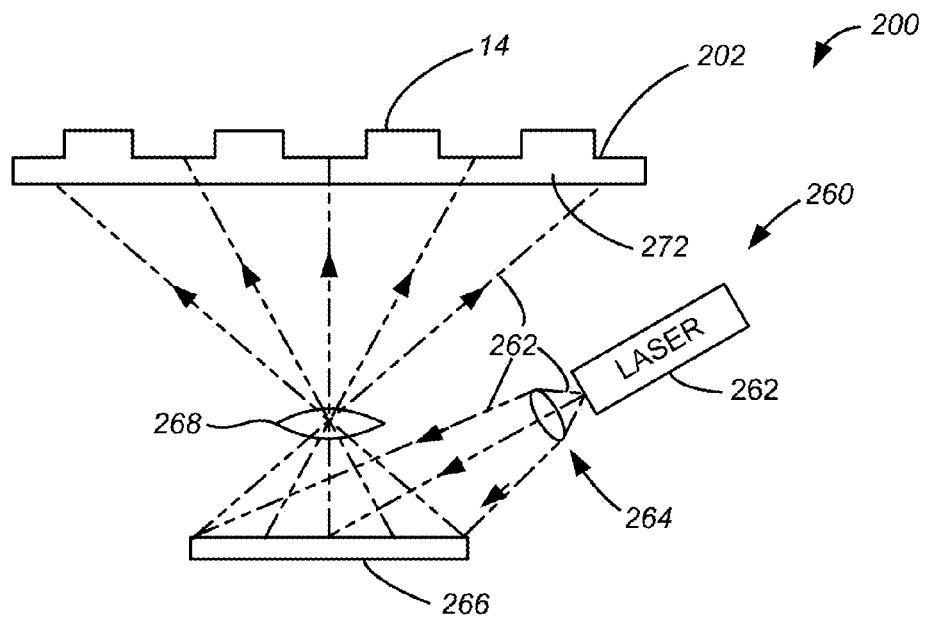
FIG. 37 shows a first example where the image is generated remotely for transmission to baseplate 202 using a DLP projection system.
Figure 38:
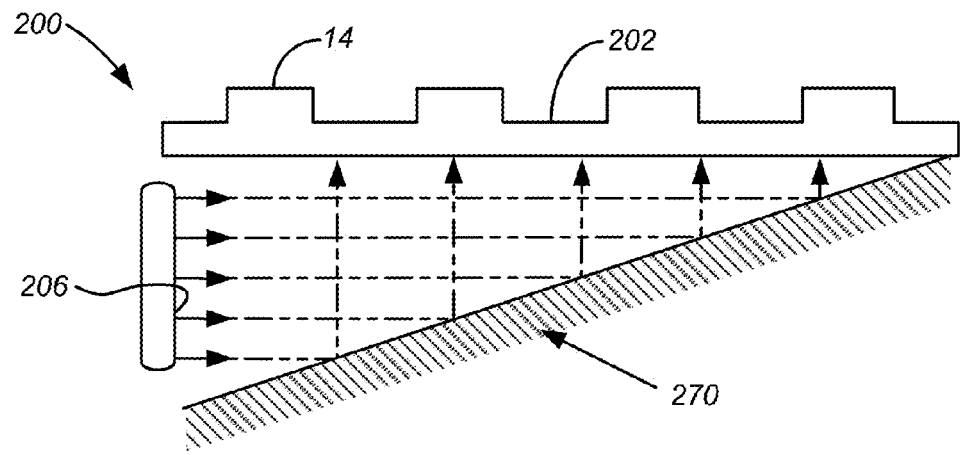
FIG. 38 shows a second example where the image is generated remotely using a mirror to direct the image from the display screen onto the baseplate.

Display screen 206 may be a flat panel display where the light generating pixels are directly visible, such as with the screens of tablet computers. Other examples may be a different implementation where the image is generated remotely and transmitted to baseplate 202; one example of this is shown in FIG. 37. In this example, a DLP projection system 260, such as available from Texas Instruments, may be used. System 260 typically includes a light source 262, which, in some examples of the laser light source, which generates a light beam 262 which passes through a first optical element 264 and then onto the surface of a DLP mirror 266. DLP mirror 266 can include over 1 million hinge mounted microscopic mirrors which project the light beam 262 containing the image through a second optical element 268 to baseplate 202. Another alternative to the pad computer example is shown in FIG. 38. In this example, a display screen 206 is positioned at an angle to a mirror 270 to direct the image from display screen 206 onto baseplate 202. The technology for generating the image is can be such as but not limited to LCD, plasma, organic LED, lamp with color wheel and DLP chip.

Figure 39:
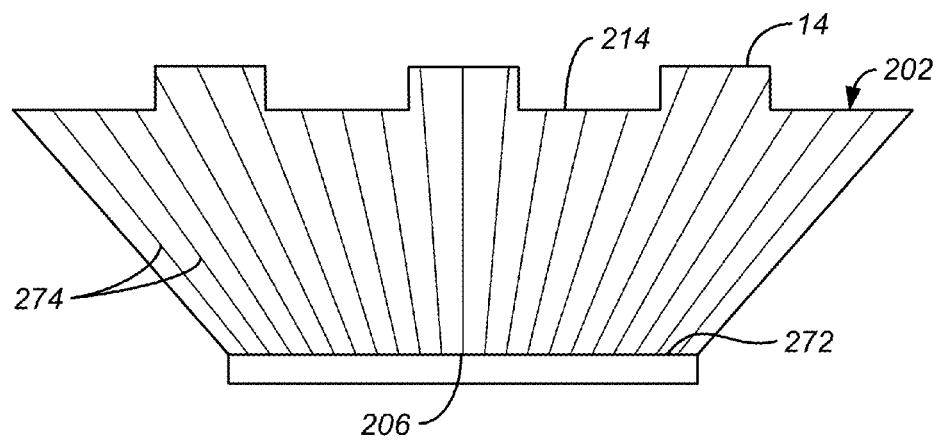
FIGS. 39 and 40 illustrate two examples for transmitting the image to the upper surface of the baseplate using optical fibers.
Figure 40:
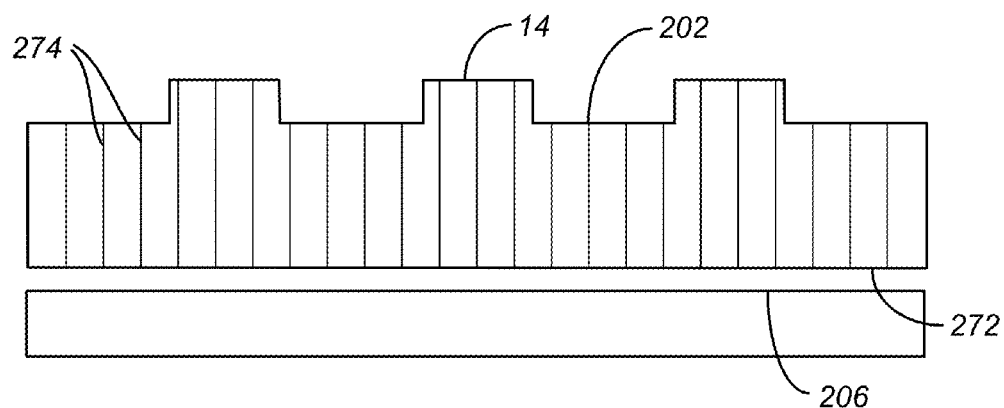

The image can also be transferred to the upper surface 214 of the baseplate 202 in other manners. Two such examples are shown in in FIGS. 39 and 40. In these examples, baseplate 202 is made up of numerous optical fibers 274 extending from the lower surface 272 to the upper surface 214 with lower surface 272 being positioned opposite display screen 206 or other image generating surface such as DLP mirror 266. The image created at upper surface 214 can be the same size or different size as the image created at the display screen 206. In FIG. 40 the image created at upper surface 214 is larger than shown at display screen 206 while in FIG. 40 the images are the same size.

Figure 41:
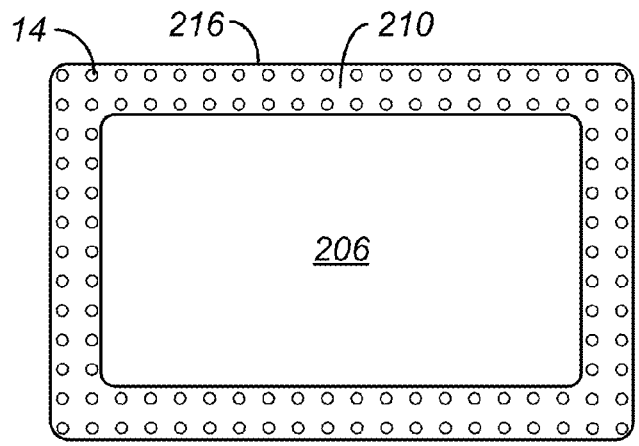
FIGS. 41, 42 and 43 top plan views of a baseplate assembly in which the baseplate includes a first portion offset from and surrounding the display screen.
Figure 42:
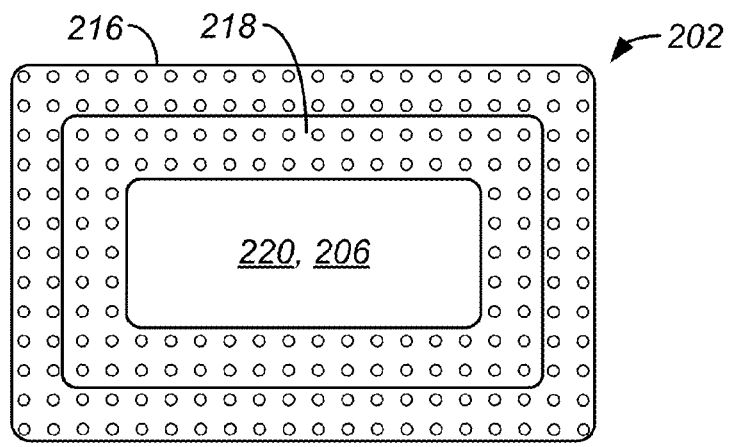
Figure 43:
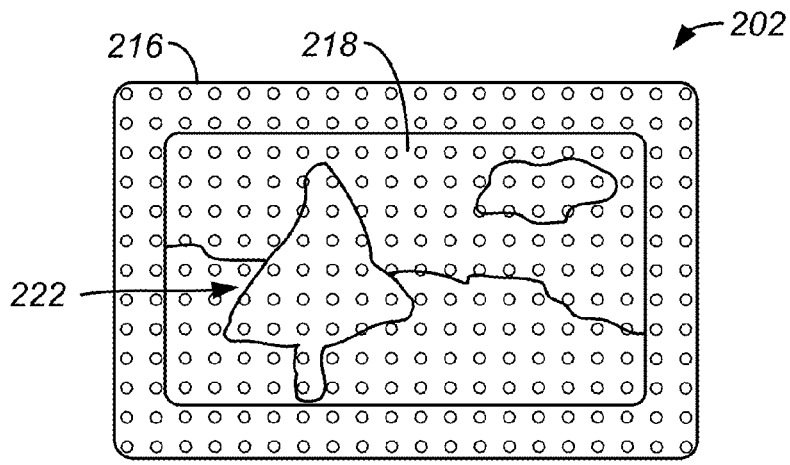

FIGS. 41 and 42 are top plan views of a baseplate assembly in which the baseplate includes a first portion 216, generally consisting of outer region 210, which generally overlies outer edge 212 of computer 204, and a second portion 218 sized to fit within the interior of first portion 216 and overlie a portion of a display screen 206. Second portion 218 defines an open region 220 which provides direct visual access to a part of display screen 206. FIG. 43 shows the structure of FIG. 41 with an alternative second portion 218 of baseplate 202 occupying the entire interior of first portion 216 of baseplate 202 thereby completely covering display screen 206. First portion 216 may be transparent, translucent or opaque while it is preferred that second portion 218 be made of an essentially colorless, transparent material to permit visual images to be transmitted therethrough.

FIG. 43 also illustrates an image 222 projected from display screen 206 onto display region 208 of baseplate 202. While image 222 is typically a two-dimensional image, computer 204 can be of the type which generates an image viewable as a three-dimensional image, typically with the use of specialized glasses. Examples of technologies that can generate an image suitable for 3 dimensional viewing include the following. Stimulation of 3D can be achieved by generating two slightly different stereoscopic images on a flat screen, as would be seen by the left and the right eye. These images can be selectively directed to the left or the right eye by a variety of means. One method of selectively directing the image to one eye only, is to make one image of one color and the other image of a different color. The user then wears eye glasses with filters that only transmit one or the other color on the left and right eye, such that each eye receives a different image, as would be seen when viewing a physical 3 dimensional object. Another method of selectively directing the image to one eye only is by way of polarization. The two images can be projected by 2 separate sources of light of orthogonal polarization onto a single screen, and the screen viewed with eye glasses with orthogonal polarization filters for each eye. The images can also be projected or created by a single source that changes the image and the polarization of a filter in front of the single source at a speed adequately fast that the eye will see the presence of two images simultaneously.

Another type of three-dimensional imaging can be through the use of holographic projection. Holographic projection can be created by projecting a laser through a film that contains a prerecorded interference pattern of light from a solid object. A moving hologram can be created by replacing the film with a "Spatial Light Modulator" which can be an array of small movable mirrors as in a DLP chip. The mirrors can generate a varying interference pattern as would be created by a moving object, thus creating a moving hologram.

Figure 44:
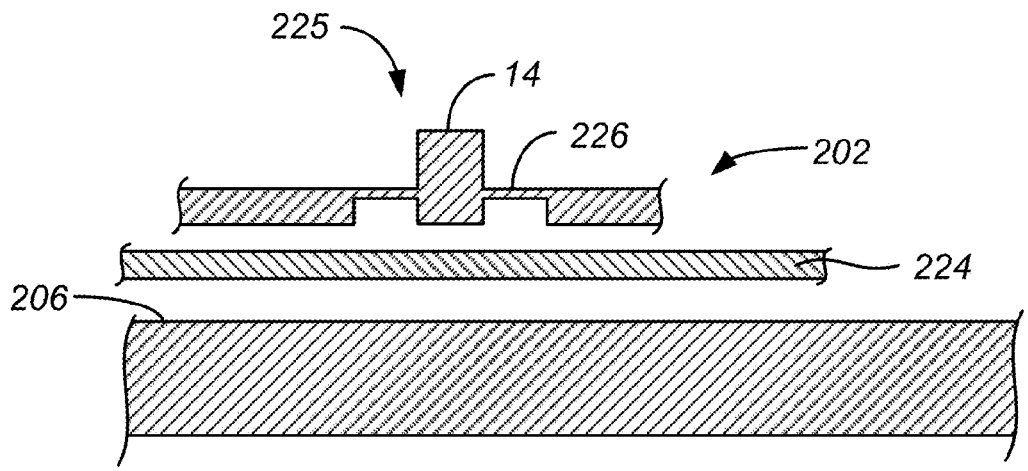
FIG. 44 is a simplified partial cross-sectional view of an example of the baseplate assembly of FIG. 36 in which the image generating device includes a touch sensitive membrane situated directly above the display screen, portions of the baseplate that surround the coupling elements being flexible elements permitting the coupling elements to be deflected by a user from the spaced apart position shown in FIG. 44 to a position contacting the touch sensitive membrane.

In some situations computer 204 includes a touch sensitive membrane 224 as a part of display screen 206 as shown in FIG. 44. Pad computers typically include touch sensitive membranes as part of their display screens. Touch sensitive technologies can be broadly grouped into two technologies, single-touch and multi-touch. The single touch systems typically have four or fewer conductors and the multi-touch have a grid of X and Y conductors which are scanned. The conductors are typically in the form of two transparent sheets with transparent electrodes which are spaced apart by a resistive or dielectric medium, depending on if the touch is sensed by resistance change or capacitance change. When the sheets are pushed together or touched the magnitude of the resistance or capacitance change can be used together with the knowledge of the electrodes most affected by the change to compute the position of the touch.

FIG. 44 is a simplified partial cross-sectional view of an example of baseplate assembly 200 of FIG. 36 in which the image generating device 204 includes touch sensitive membrane 224 situated directly above the display screen 206. Touch sensitive membrane 224 and display screen 206 are shown spaced apart from one another for purposes of illustration. Access regions 225 are provided at positions on baseplate 202 to permit access to membrane 224. In one example shown in FIG. 44, access regions 225 are provided at coupling elements 14 at which portions of baseplate 202 surrounding coupling elements 14 are thinned, flexible elements 226. This permits coupling elements 14 to be deflected by a user from the spaced apart position shown in FIG. 44 to a position, not shown, contacting touch sensitive membrane 224 to allow input to computer 204.

Figure 45:
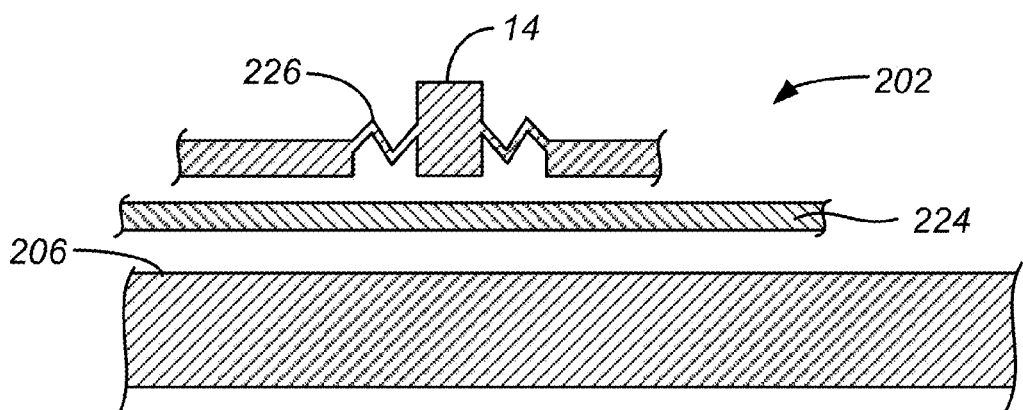
FIGS. 45 and 46 show alternative examples of the structure of FIG. 44 in which the flexible elements are zigzag thin flexible elements in FIG. 45 and are spaced apart elements created by cutouts in the baseplate in the example of FIG. 46.
Figure 46:
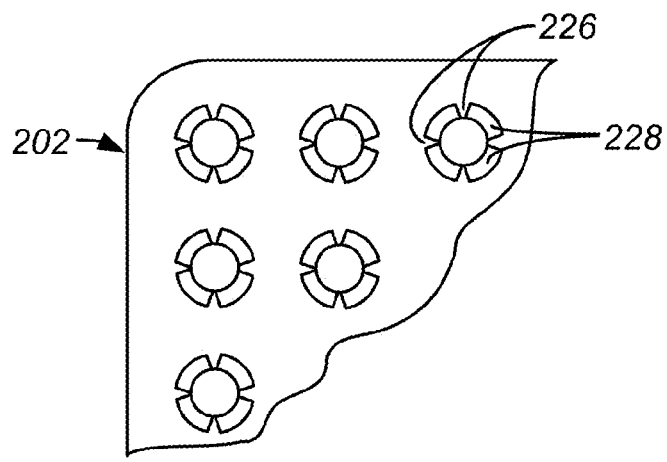

FIGS. 45 and 46 show alternative examples of the structure of FIG. 44 in which the flexible elements 226 are thin, zigzag flexible elements 226 in the example of FIG. 45, and are spaced apart flexible elements 226 created by cutouts 228 in baseplate 202 in the example of FIG. 46.

Figure 47:
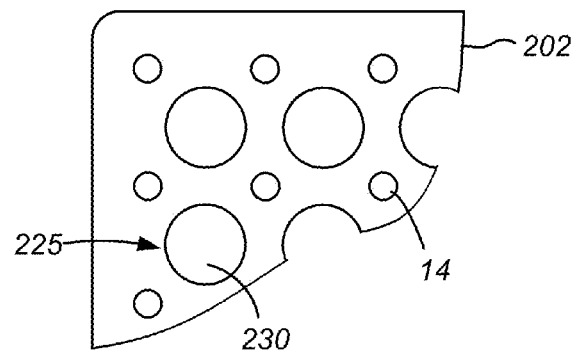
FIG. 47 is a further alternative example of the structure of FIG. 44 in which the access regions are created by holes formed in the baseplate at positions offset from the coupling elements.

FIG. 47 is a further alternative example of the structure of FIG. 44 in which access regions 225 are created by holes 230 formed in baseplate 202 at positions offset from the coupling elements. In this example, the user touches the touch sensitive membrane 224 directly with, for example, a stylus or the tip of the user's finger.

Figure 48:
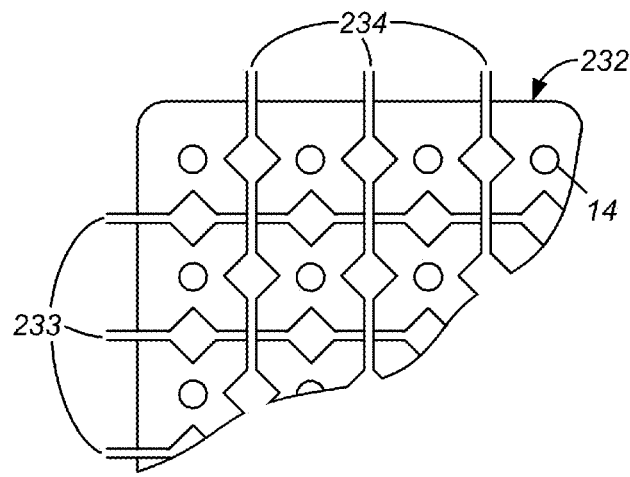
FIG. 48 is a simplified partial top view of a baseplate including a grid of first and second sets of spaced apart, parallel electrodes oriented transversely to one another used to determine where on the baseplate the user is touching the baseplate directly or through a toy brick.
Figure 49:
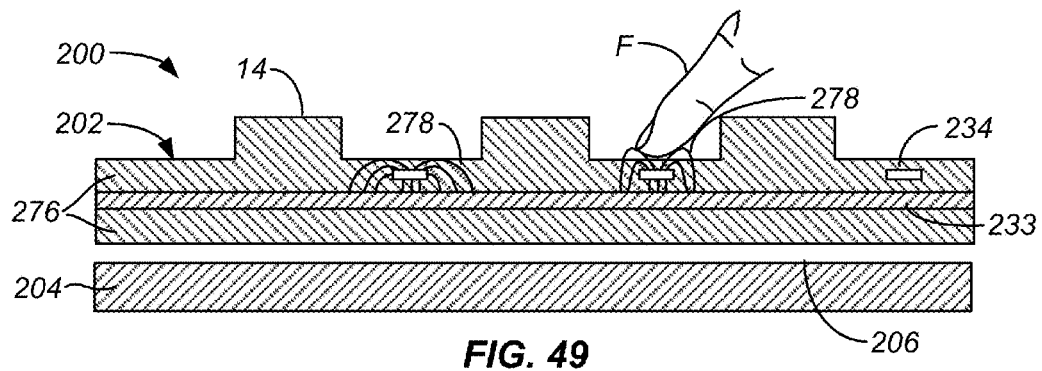
FIG. 49 is a simplified cross-sectional view illustrating an example of a baseplate including capacitive touch electrodes.

FIG. 48 is a simplified partial top view of a baseplate 202 including a grid 232 of a set of parallel, spaced apart first electrodes 233 and a set of parallel, spaced apart second electrodes 234. First and second electrodes 233, 234 are oriented perpendicular to one another. Electrodes 233, 234 are electrically coupled to computer 204 to provide an indication of where on baseplate 202 the user is touching the baseplate. This technique is conventional and can be based upon resistance change or capacitance change depending on whether the material separating the electrodes is a resistive medium or a dielectric medium. Capacitive touch electrodes as shown in FIGS. 48 and 49 are generally designed so that the field that exists between the electrodes travels to the surface of the dielectric so as to be affected by touch. Electrodes 233, 234 are preferably essentially transparent so not to interfere with transmission of the image from computer 204. In capacitive touch sensing, two electrodes as seen in FIGS. 48 and 49 are separated by a dielectric medium such as the material 276 of baseplate 202. As shown in FIG. 49, the electric field lines 278 between the conductors 233, 234 can be changed by the presence of another dielectric or conductive medium such as a finger F or a stylus. The change in the electric field lines 278 causes a change in the capacitance between the conductors 233, 234, which can be measured by electronic circuits to ascertain the position of touch. A good explanation of such technology is given in the Microchip TB3064 Document, and in application note AN3863 from Freescale semiconductor.

FIGS. 50-70 relate to the interaction between various playing pieces, including toys, tokens, game playing pieces and the toy bricks 10 discussed above, and a baseplate assembly 200. To simplify the description of the following figures, in the discussion below the specific playing pieces will typically be referred to as toy bricks 10. However, playing pieces other than toy bricks 10 may typically also be used.

Figures 50, 51:
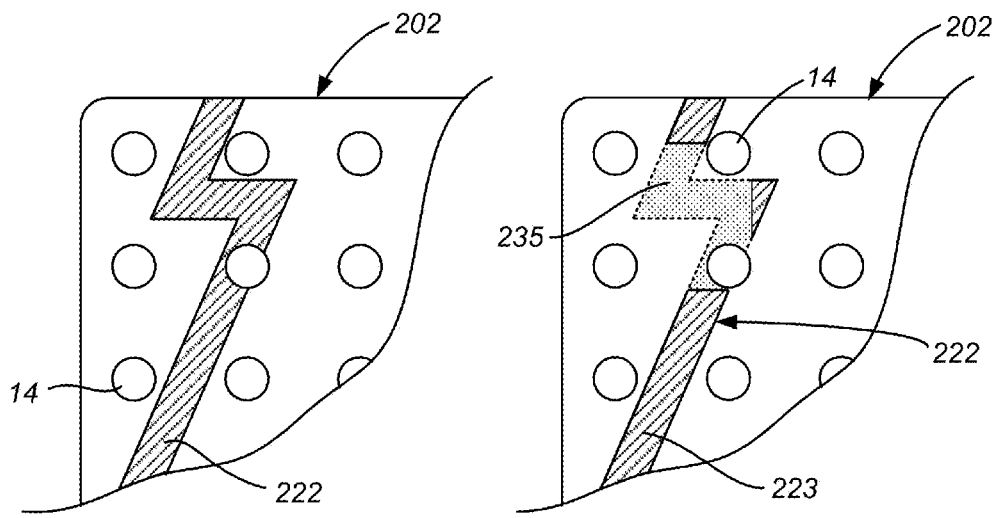
FIG. 50 is a simplified top view of a portion of the baseplate assembly of FIG. 36 showing an image projected onto the display region of the baseplate. Based upon the location of a toy brick on the baseplate, information, such as a message or signal, can be provided the toy brick by the image.
FIG. 51 is a view similar to that of FIG. 50 but in which a portion of the image is dimmed to convey information to the toy brick as an optical encoded message image.

FIG. 50 is a simplified top view of baseplate assembly 200 of FIG. 36 showing an image 222 projected onto display region 208 of baseplate 202. Based upon the location of a toy brick 10, or other playing piece, on the baseplate, information, such as a message or signal, can be provided the toy brick by the image.

FIG. 51 is a view similar to that of FIG. 50 but in which a portion of the image 222 generated by display screen 206 is dimmed to convey information to toy brick 10 by way of a first signal 235. Generally speaking, using intensity variations of all or part of image 222 creates an integrated visual image 222 including visual images 223 and optically encoded message images 235, sometimes referred to as first signals 235, to permit information to be transmitted to toy bricks 10.

Figure 52:
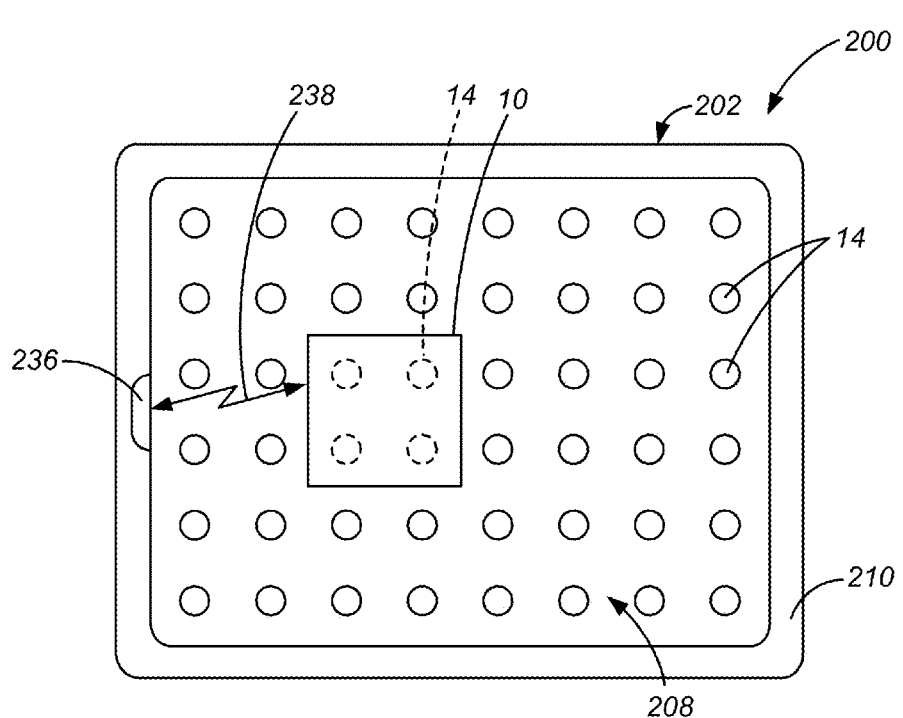
FIG. 52 is a top plan view of a baseplate assembly including a receptor which can receive a signal from a toy brick mounted to the display region of the baseplate, the signal can be generated in response to the optical encoded message image projected onto the display region of the baseplate. The signal generated by the toy brick can include information such as the location of the toy brick and the type of toy brick.
Figure 59:
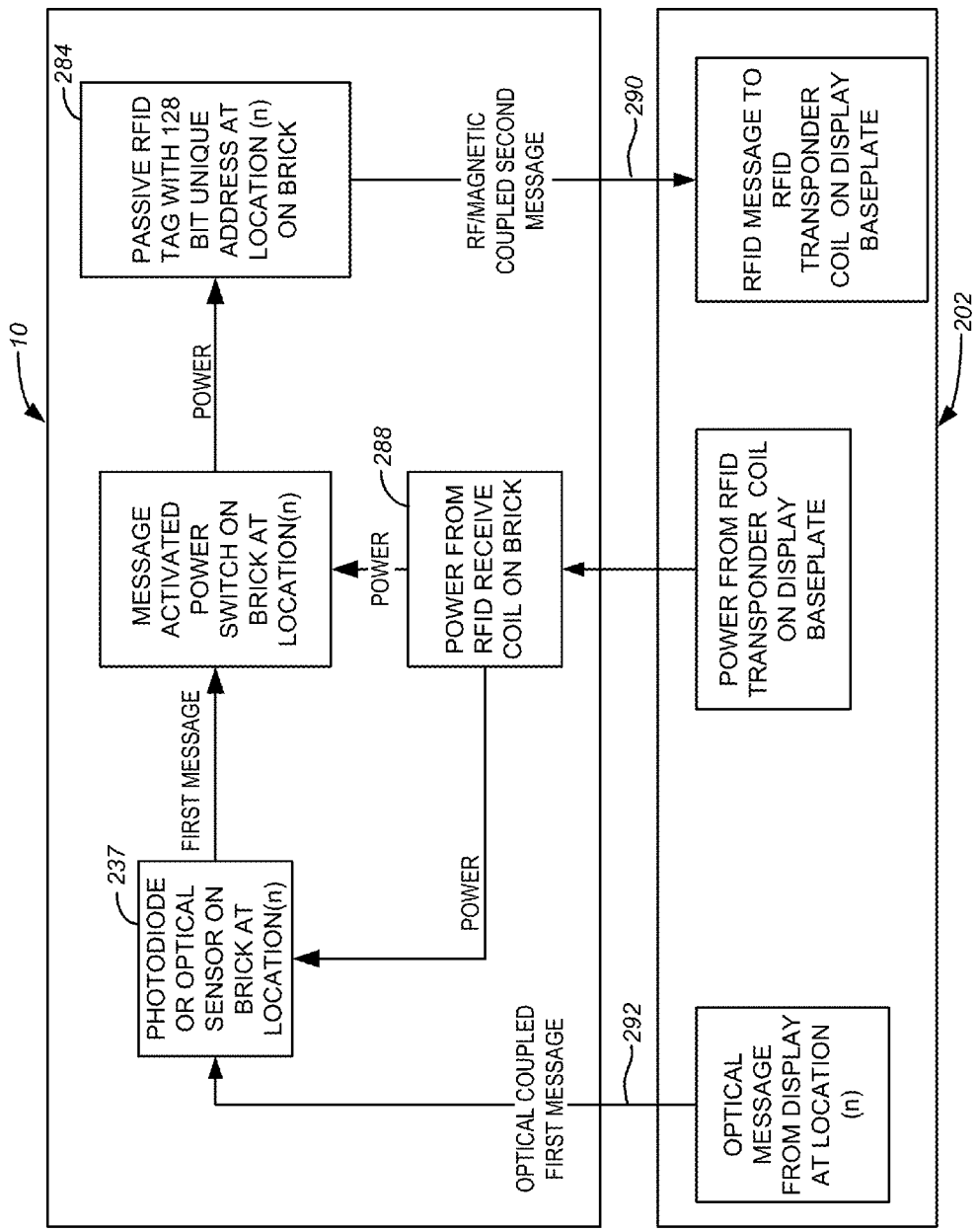
FIG. 59 is a block diagram showing interaction between the baseplate and a toy brick or other playing piece where and RFID tags are used, such as in the example of FIG. 58.

In some examples, computer 204 will send an optically coded message as a series of intensity variations in time. These intensity variations will be received by toy bricks 10, capable of receiving and responding to the optically coded message, that have been placed onto baseplate 202. An example of what is sometimes referred to as an intelligent toy brick 10 including a light detector 42 is shown in FIGS. 2, 4, 59 and 64. The intensity variations can be localized to a patch of pixels in display region 208 under/adjacent to each coupling element 14 as shown in FIGS. 50 and 51. After a message is sent in the form of intensity variations at one coupling element 14, a similar action would performed at the next coupling element 14, so as to scan the entire baseplate 202. The intelligent toy bricks 10 placed upon the baseplate 202 will respond via, for example, optical/RF/sound encoded second signal 238, as shown in FIG. 59, discussed below with reference to FIGS. 64-67, to one or more receptors 236 on the baseplate 202 as shown in FIG. 52. Preferably only one coupling element 14 and one toy brick 10 will be stimulated with a message at any one time, and only one toy brick 10 will send a second signal 238 to the receptor 236 of the computer 204. The message sent from the toy brick 10 may contain information as to the type of toy brick placed upon the baseplate 202. The computer 204 will then know the position of the toy brick 10 that is communicating its properties, since the computer knows the position of the patch of pixels that is sending the encoded message. In this manner, the computer 204 may command the intelligent toy bricks 10 placed upon it to perform functions, or even change the image 222 displayed on display region 208 interactively to perform a gaming function wherein the baseplate assembly 200 responds to the toy brick 10 placed upon it. A single layer of toy bricks 10 placed upon the baseplate 202 can be interrogated in this manner.

In some examples, it is possible to simultaneously stimulate more than one position with different optically encoded messages, since each patch of pixels, at each coupling element 14, may simultaneously have different encoded intensity variations, the message encoding the position being stimulated. It is possible for one or more toy bricks 10 to simultaneously communicate with one or more receptors 236, as is done by way of example in CDMA (code division multiple access) cell phones or as done in Anti Collision NFC Tags. Each toy brick 10 mounted to baseplate 202 will send the message it receives from the display screen 206 in addition to information about the properties of the toy brick, thereby enabling the image generating device 204 to compute the position and type of toy bricks placed upon it.

It can be seen by a person skilled in the art that the intensity variations encoding the message sent by the image generating device 204 can be at a level imperceptible to a user viewing the entire display region 208, but is detectible by sensitive electronics on the toy brick 10 as placed upon the display region 208. The encoding can be of adequate complexity so as to even be detectable over the intensity variations of a moving image. By way of example, the encoded message may be encoded on a carrier of a known frequency, as for example IR remote controls encode the message on a carrier at 40 KHz or so. An example of a miniature optical receiver is the SFH506 IR receiver/demodulator device made by Siemens, which is a fully integrated device capable of delivering a digital data stream from a modulated light signal. Such encoding allowing signals resulting from varying of an image to be distinguished from the encoded message, in much the same manner as one radio station can be heard even though many radio stations and sources of radio frequency noise are present in the ether simultaneously.

The communication from the image generating device 204 to the toy brick 10 includes one or more of information requests and information sent, such as but not limited to send brick type information, send avatar image, send gaming powers of/weapons possessed, receives new avatar image, receive new gaming powers/weapons, and enable RFID/RF transponder for X seconds.

The communication from the toy brick 10 back to the display computer 204 through receptor 236 can be by way of example but not limited to:

1) An audible or inaudible sound sent from the toy brick 10 received by one or more microphones, acting as receptors 236, attached to the baseplate assembly 200, by way of example implemented as an audio modem with an audio codec chip such as the ADAU1772 chip from Analog Devices.
2) A visible or invisible light encoded message sent to one or more light receptors 236 through air or through light guides in the baseplate 202, by way of example implemented with a miniature optical receiver such as the SFH506 from Siemens.
3) RF encoded signal, such as but not limited to, Bluetooth implemented with a module such as the SPBT2532C2.AT from STMicroelectronics, ZigBee implemented with an integrated circuit such as the CC2520 from Texas Instruments, or RFID implemented with an integrated circuit such as the Texas Instruments TRF7970A.

The communications from the toy brick 10 to the baseplate assembly 200 contain information such as but not limited to:

1) Shape and size of the toy brick 10 placed upon baseplate 202,
2) Information from sensors located inside the toy brick 10,
3) Gaming or characteristics or special powers weapons or appearance of an Avatar of the toy brick 10.
4) A serial number, which can be for example an address into a lookup table on the computing device attached to the display or on the internet to provide the information in (1) or (3) above.

FIG. 52 is a top plan view of a baseplate assembly 200 including a receptor 236 which can receive a second signal 238 from a toy brick 10 mounted to the display region 208 of the baseplate 202. The second signal 238 is generated in response to the information provided by the first signal 235 of image 222 projected onto the display region 208 of the baseplate 202. The signal generated by the toy brick 10 can include information such as the type of toy brick and additional information such as a part of the message that was received from the baseplate which contains data encoding position information.

Figure 53:
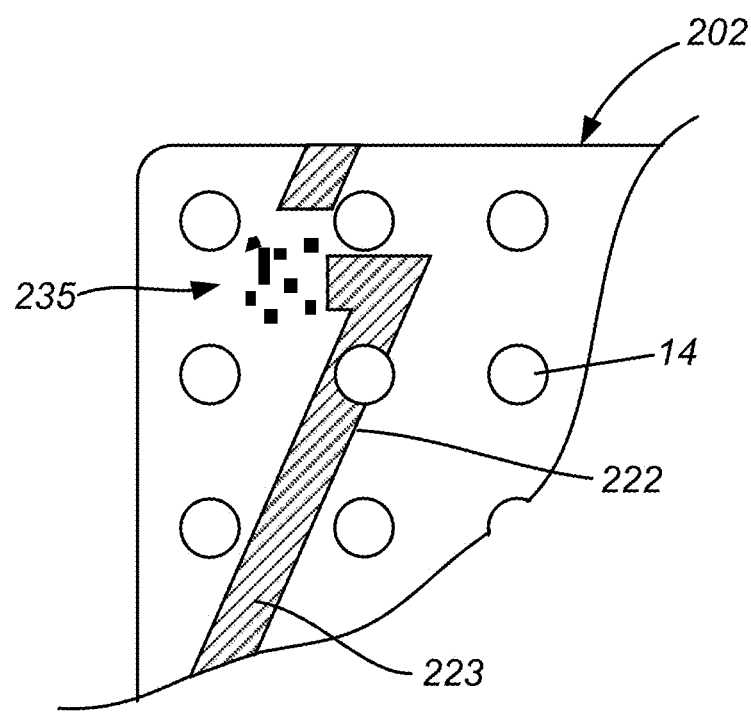
FIG. 53 illustrate an example in which a portion of the image, that is the optical encoded message image, is in the form of a two dimensional barcode which can be scanned or imaged by the toy brick placed on the display region of the baseplate.

The message from the display can be encoded in space rather than time, such as a one-dimensional or two-dimensional barcode. FIG. 53 illustrate an example in which a portion of the image acting as first signal 235 is in the form of a two dimensional barcode 253 which can be scanned or imaged by a toy brick 10 placed on the display region 208 of the baseplate 202. Toy brick 10 would then send a message to computer 204 with its characteristics and the barcode seen, enabling computer 204 to compute the position and type of the toy bricks 10 placed upon baseplate 202.

Figure 54:
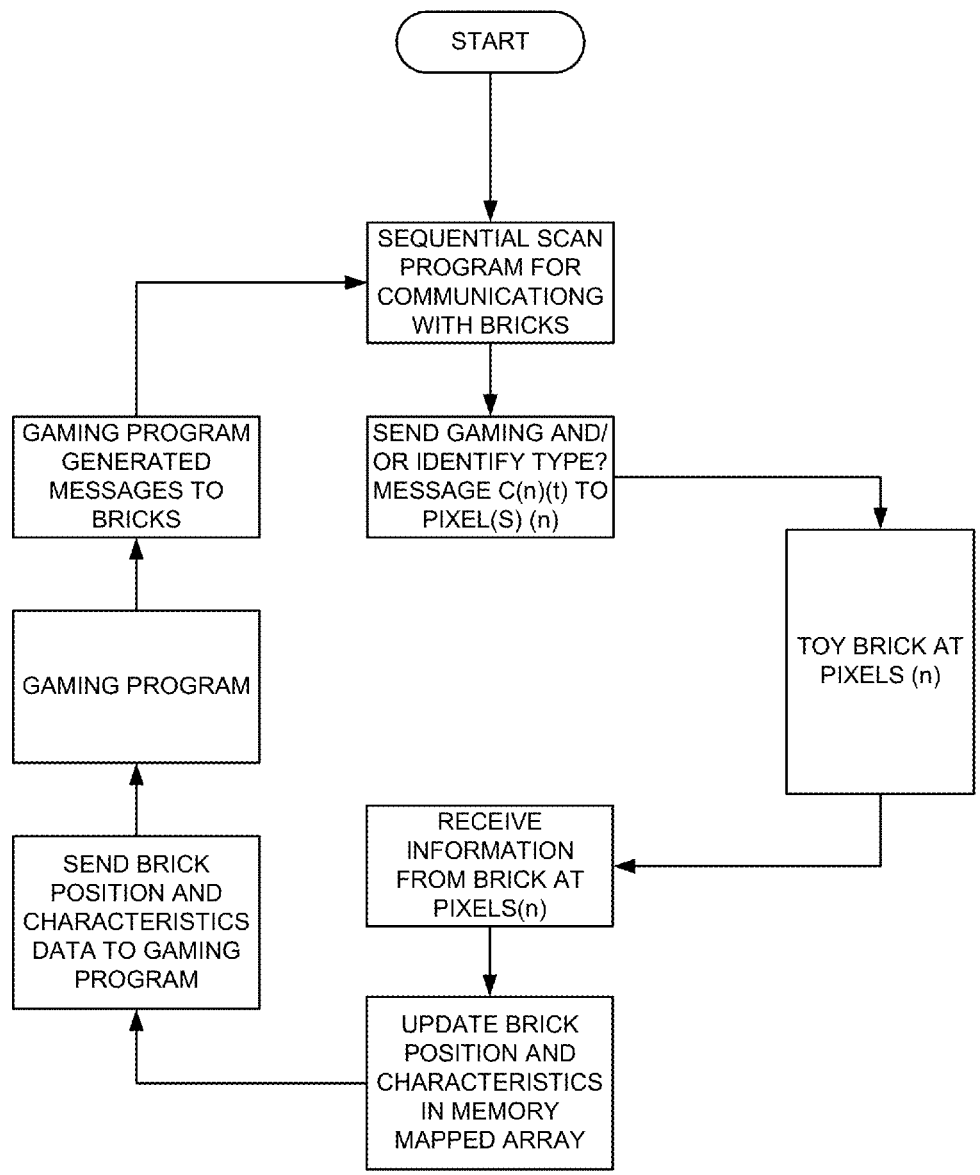
FIG. 54 is a flow diagram of an example of software implementation of a scanning routine.
Figure 55:
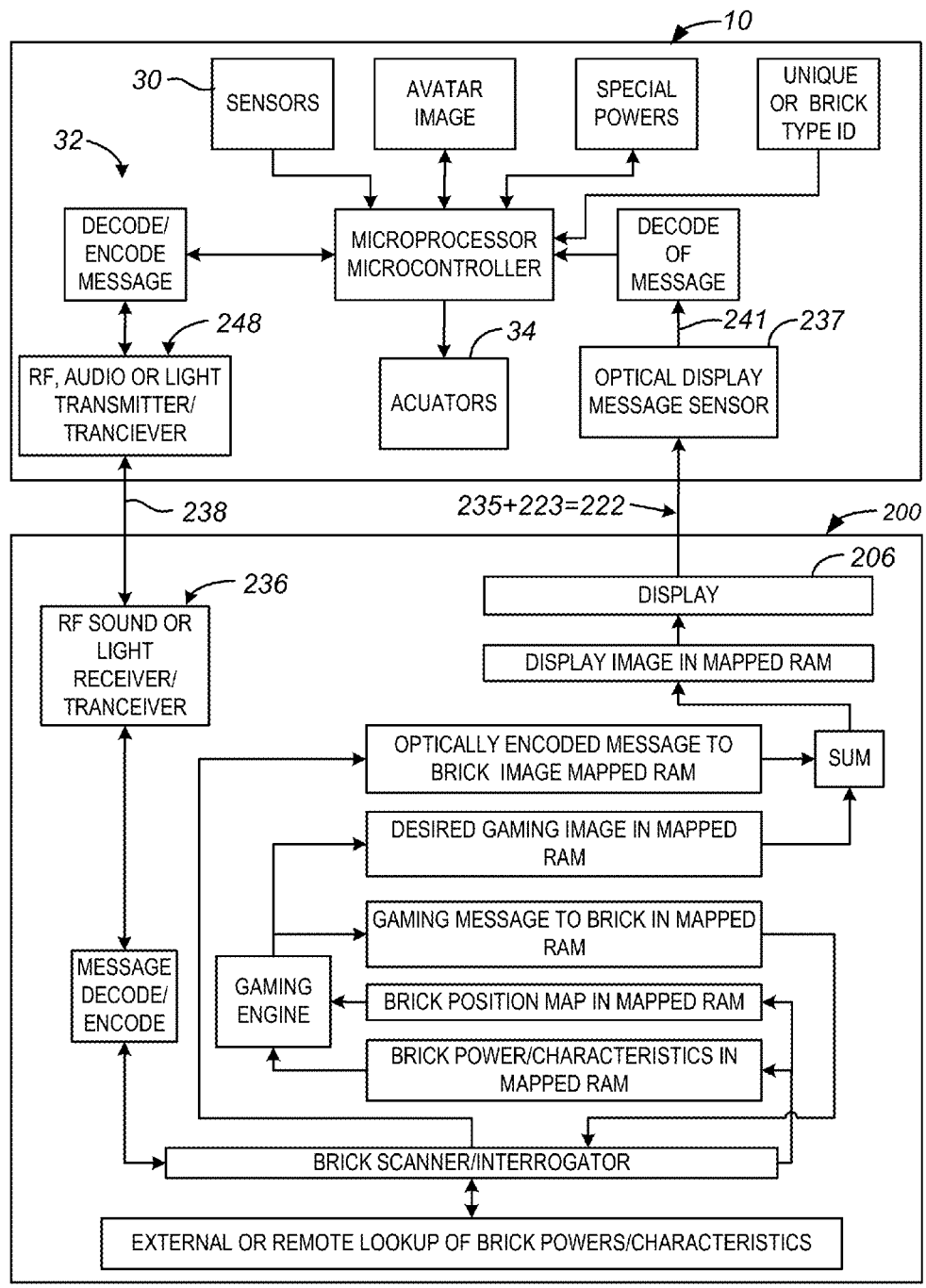
FIG. 55 is a schematic representation of the components of an example of a baseplate assembly and a toy brick or other playing piece, and interactions between and among the components.
Figure 56:
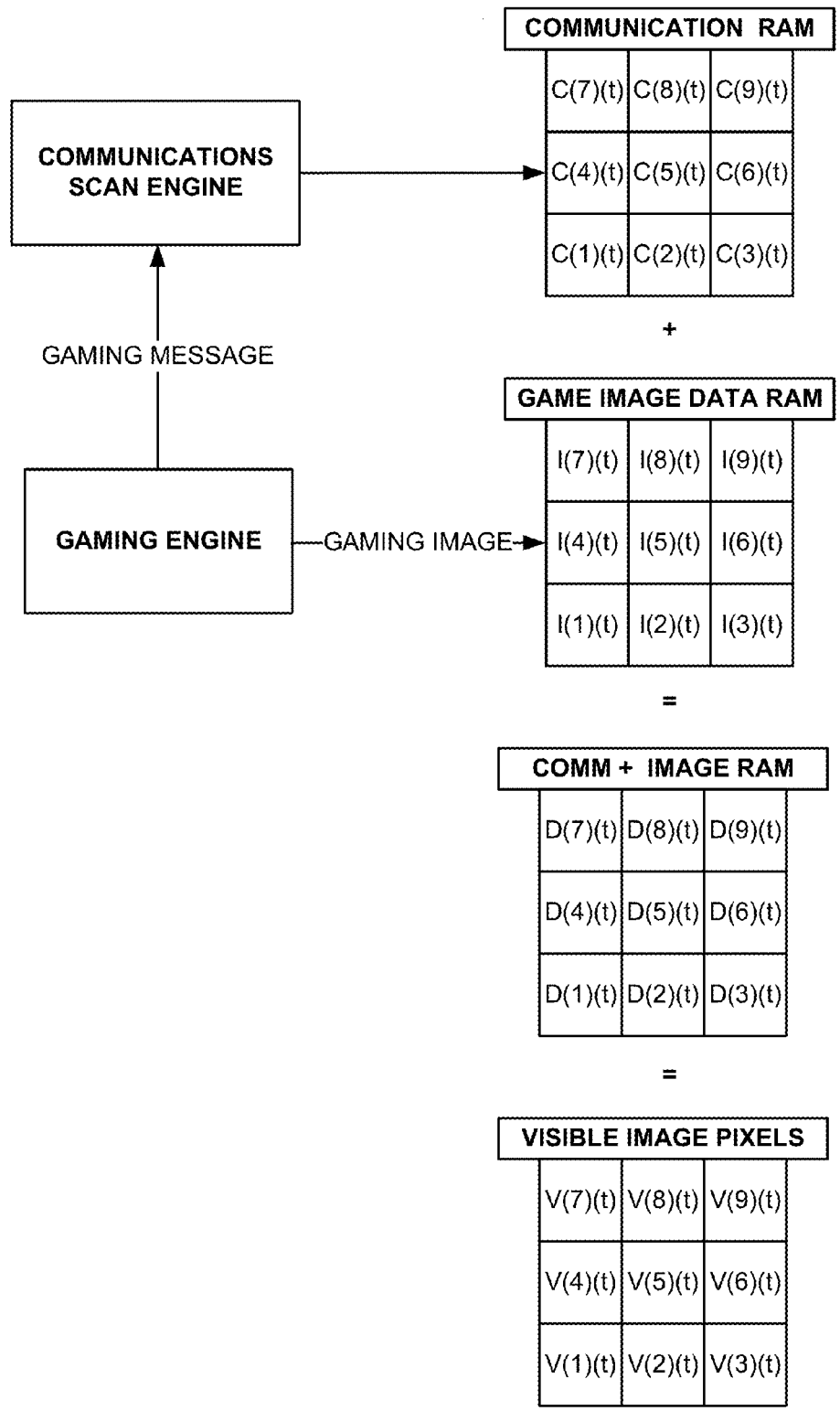
FIG. 56 is a schematic representation of the manner in which a memory mapped, time varying, communication image and memory mapped, time varying, gaming image are combined to create the memory mapped, time varying, displayed image.

An example of a formal software implementation of a scanning routine, is as shown in FIG. 54, sends messages to bricks 10 via the image generating device 204. The exemplary method implemented is best understood by realizing that the image 222 on the display screen 206 is stored in a memory (display RAM) as shown in FIG. 55. By way of example, but not limited to a 1024×768 Display which has a memory array that is 1024×768 and each location of that memory array is capable of storing three RGB (red, green, blue) values, each value typically being 8 bits or 16 bits wide, allowing a number from 0-255 or 0-65535 respectively to express the color intensity. The intensity at each of these locations can be defined as $D(n)$ as shown in FIG. 56, where (n) is the spatial location. In the case of 1024×768=786432 gives (n) a range from 1 to 786432. The "intensity" can be a simple sum of the RGB values, and the intensity can be changed without changing the color by multiplying all three RGB values by the same number. Other variations such as a slight color change can also be utilized in order to encode a message.

Figure 57:
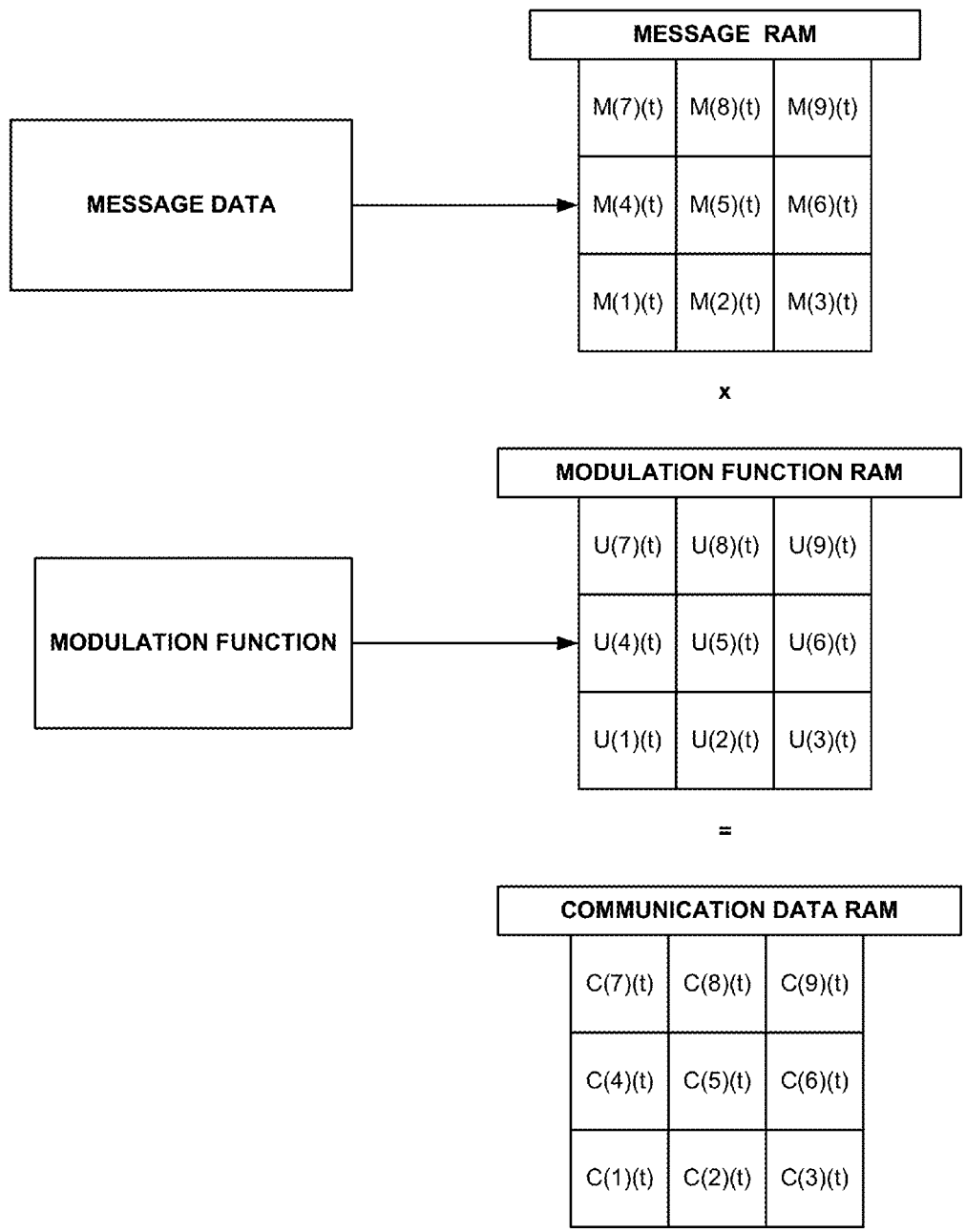
FIG. 57 is a schematic representation of the manner in which a memory mapped, time varying, message data is modified by a memory mapped time varying, modulation function in order to obtain memory mapped, time varying, communication data.

Similarly, as shown in FIGS. 55-57, other memory arrays of 1024×768 can be defined for other data with a correspondence between the data at a point (n) in those arrays and the corresponding point (n) of the image: I(n) can be the Image that is desired to be displayed, which is typically created independently by the gaming software running concurrently to the scanning software. C(n) is the communications data to be added on top of the image data, such that D(n)=I(n)+C(n) as shown in FIG. 56. It can be seen that while (n) describes the spatial variation of the image, the equation is also a function of time (t) such that D(n)(t)=I(n)(t)+C(n)(t) which allows both the image and the communication data to vary in time and space. Such a temporal variation allows serial communication data on top of a moving image generated by the gaming routines. The addition (+) shown is by way of example and can be another mathematical function instead. In another embodiment, the message C(n)(t) may also be directed to an LCD backlight, which by way of example can be an array of individually addressable white LEDs.

Further, as shown in FIG. 57, the communication data C(n)(t) to be added to the Image data is created by way of example but not limited to the message M(n)(t) multiplied or convolved with a modulation function U(n)(t), which yields C(n)(t)=M(n)(t)×U(n)(t). In this example, C(n)(t) need not vary for each display pixel (n), and may be the same message for a patch of pixels.

The modulation function U(n)(t) can be simple amplitude modulation of a carrier such as ASin(wt), or a more complex scheme like CDMA which allows many devices to talk at once.

The contents of the data received from a stimulated brick can then be stored in another 1024×768 RAM. In this manner information, such as the positions, gaming powers/weapons or Avatar images, of all toy bricks placed on the display baseplate is made available to any concurrently running gaming software, as a "map". By way of example, a block diagram of the data path for such a scheme is as shown in FIG. 55.

Figure 58:
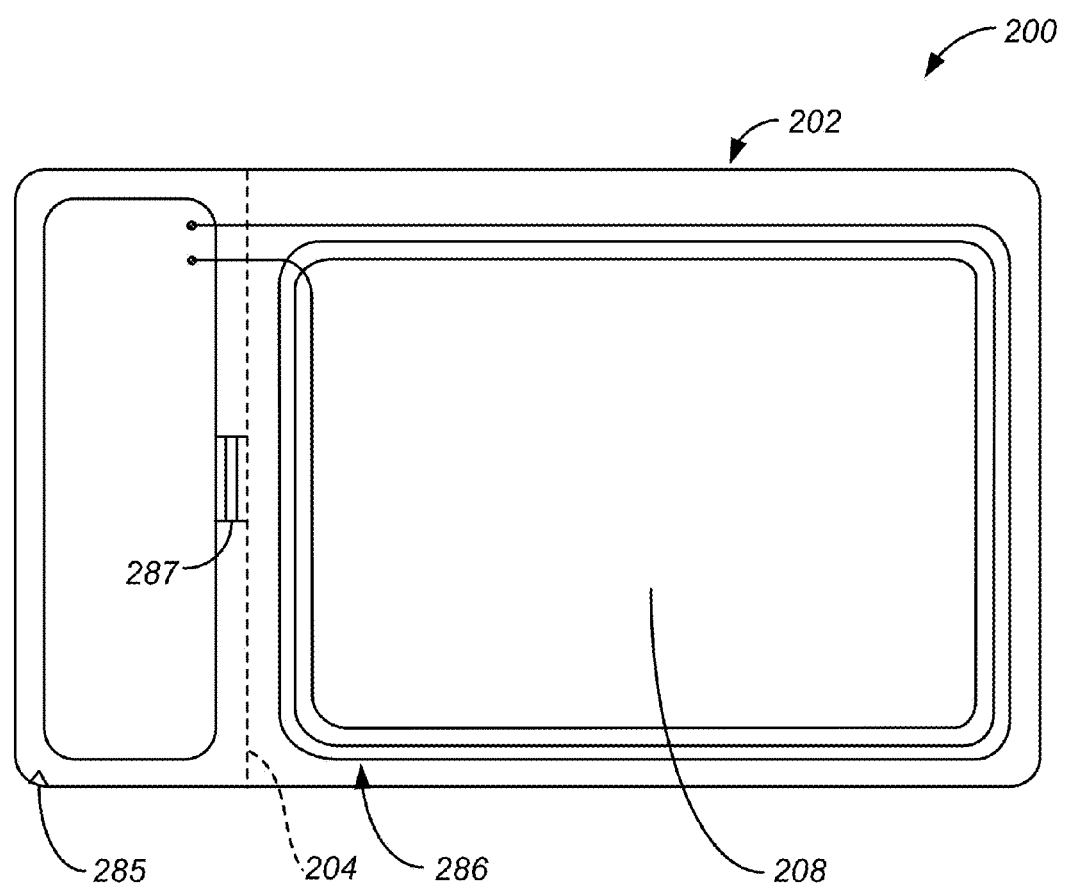
FIG. 58 shows an example of an implementation including a baseplate assembly and a near field communication (NFC) reader and the use of RFID tags.

FIG. 58 is a possible implementation of a baseplate 202 with triangulation capability. In this implementation toy bricks 10 with passive or active RFID tags 284 embedded in them as shown in FIG. 59, are interrogated by an NFC (near field communication) reader 285 with an interrogation antenna coil 286 which is wound around the perimeter of the display region 208 of baseplate 202. The reader 285 sends any data obtained from interrogation of NFC transponders within its vicinity to the computing device attached to the display 208 by means of device 287, which may be a wired connection such as but not limited to USB, flash lightning port or a wireless transponder such as, but not limited to, Bluetooth, WiFi or ZigBee. In the case of a passive RFID tag 284 in the toy brick 10, the coil 286 would power the tags from via near field magnetic coupling with the RFID receive coil 288 as well as read the data from the tag. Since RFID Tags 284 normally transmit when interrogated by the coil 286, triangulation is achieved by having a further circuit, as shown in FIG. 59, in the toy brick, which only enables the tag to transmit data 290 (second locating signal) when an optical "transmit" message 292 (first locating signal) is also received simultaneously or previously from the display baseplate. The baseplate 202 will typically scan patches of pixels in sequence on a square grid, with the "transmit" message 292, each patch of pixels typically being, but not limited to, a square of dimensions equal to the spacing between two adjacent releasable couplings of the toy brick. In this manner the positions and types of bricks on the baseplate can be ascertained by the baseplate assembly 200, that is baseplate 202 and associated image generating device 204. Most inexpensive passive RFID tags are "read only" and contain a unique 128 bit address. In the event of the use of a read only tag, a further database or look-up table containing the brick characteristics can be kept on the baseplate assembly 200 or even at a remote location accessible via the internet; such a database would be read and written to, allowing update and modification of the toy bricks virtual characteristics even though the tag is read only. Tags such as the TRPGR30TGC, which is a fully encapsulated tag currently used for pet identification, and the TRF7970A integrated circuit, both from Texas Instruments, and the MCRF355/360 from Microchip Technology, are examples of existing devices which may be slightly modified to achieve this function. The circuits required for the reader are given by way of example in the MCRF45X reference design and application notes AN759 and AN760 from Microchip Technology. Other more complex protocols such as but not limited to the use of "Anti Collision Tags", which can have several tags being enabled to transmit at once, can also be used.

Figure 60:
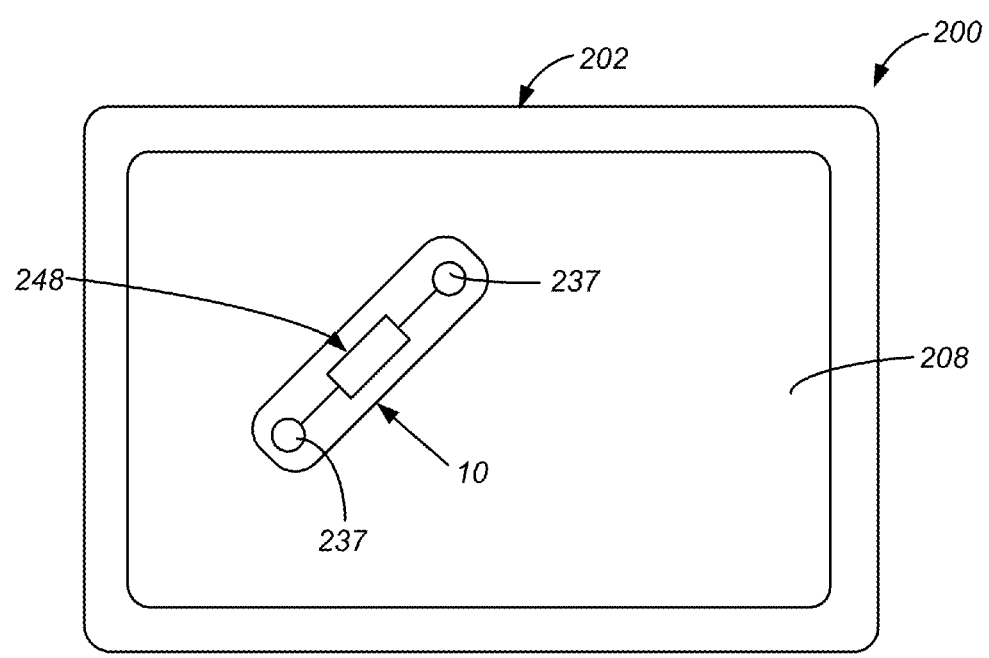
FIG. 60 is a simplified view of an example of a baseplate assembly in which the toy brick or other playing piece has more than one optical receptor.

A playing piece 10 which can interact with a baseplate assembly 200 capable of triangulating its position in a manner as shown in FIG. 59 is also possible. By way of example, a Hot-Wheels® Toy car equipped in a similar manner as shown in FIG. 59, may be rolled over a triangulating baseplate 202, such as shown in FIG. 58 or 60, and an image of a racetrack may appear on display region 208 of baseplate 202 with the car in the middle of the racetrack. In another example, a Small Barbie Doll® with such a transponder as in FIG. 59 may when placed on a display region 208, cause the display screen 206 of computer 204, and thus display region 208 of baseplate 202, to show a Tea Party and emit relevant sounds. Indeed a Barbie doll equipped with a speaker may be recognized at a certain position on display region 208 of baseplate 202 and sent speech (via the display messaging system as described in FIG. 55) to recite and to interact with a "Ken" Doll placed at a different position on the display region, who may be sent different speech (via the display messaging system) to recite. A gaming token type of playing piece equipped with flashing lights may be sent a message to flash lights if it was recognized as being placed at the correct position on the display to win.

A tablet computer and smart phones with embedded NFC readers, such as the Google Nexus 10, typically have smaller interrogation coils which do not encircle the entire display screen 206 as shown in FIG. 58, are currently available for the purpose of NFC Credit card transactions and for sending photos and data between such devices when they are held together and "tapped". Such a device would need to be modified to implement a scheme as described in FIG. 55 in order to triangulate the position of an object placed upon it.

It is also possible to have a toy brick or other playing piece 10 as shown in FIGS. 59 and 60 with two optical receptors 237 placed at different points on it. Each optical receptor enabling the NFC transponder 248 only when the optical "turn on" message is received by that particular receptor when the display below it stimulates it with a message. In this manner the position of two points on the toy, relative to the display, may be ascertained. This information allows the orientation of the toy with respect to the display to be determined. By way of example, a toy piece shaped as a flashlight may, when placed on the display assembly, be recognized as a flashlight and create a virtual beam on the display. The orientation and origin of the beam may be computed by knowledge of the position and orientation of the playing piece. The beam may even cast virtual shadows for other playing pieces placed on the surface of the display, or even illuminate and cast shadows for virtual objects that are displayed on the display.

Coupling elements 14 may be loose fitting bumps or pockets on the baseplate so as to constrain the bricks in the plane of the display but allow them to be easily removed when lifted up from the plane of the display. As suggested in FIG. 60, in some examples, display region 208 can be made without any coupling elements 14, particularly when the playing piece 10 is not a toy brick 10 or other playing piece having structure which allows it to be secured to upper surface 214 by coupling elements 14.

Figure 61:
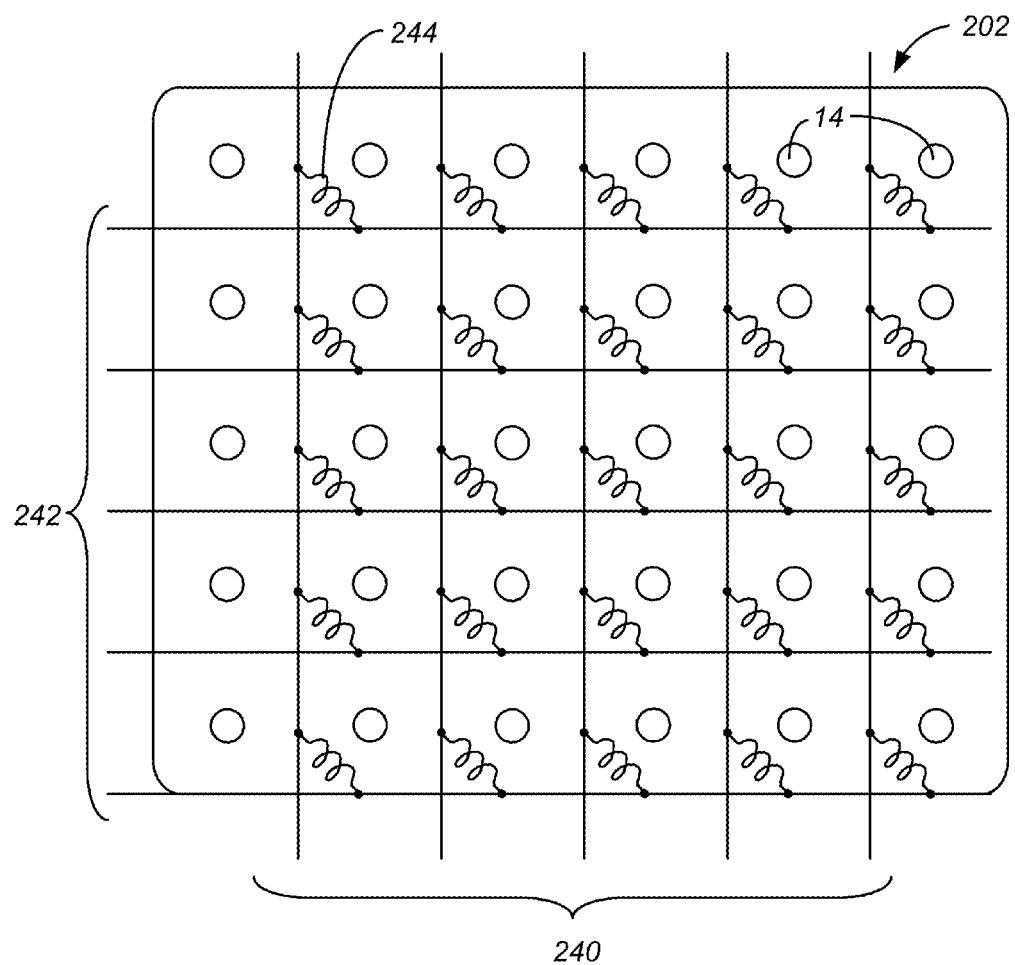
FIG. 61 is a schematic representation of a baseplate including column scan lines extending in one direction and row scan lines extending in a transverse direction, the scan lines bounding the coupling elements. Electrical coils are connected to the row and column scan lines at their intersections for communication with toy bricks, typically positioned directly above the coils.

FIG. 61 is a schematic representation of a baseplate 202 including column scan lines 240 extending in one direction and row scan lines 242 extending in a transverse direction, the scan lines bounding the coupling elements 14. Electrical coils 244 are connected to the row and column scan lines 240, 242 at their intersections for communication with toy bricks 10, typically positioned directly above the coils. Column and row scan lines 240, 242 and coils 244 can communicate with or provide inductively coupled power to the bricks, or both, placed directly above them by RF, electrical field or magnetic field. The number of connections required to communicate with the coils can be reduced by means of the XY scanned grid of column and row scan lines 240, 242. Such a baseplate 202 would preferably have some electronics such as a microcontroller or keyboard scanner circuit to scan the XY lines and communicate with a computing device via protocols such as but not limited to USB, Lightning Port or Bluetooth.

Figure 62:
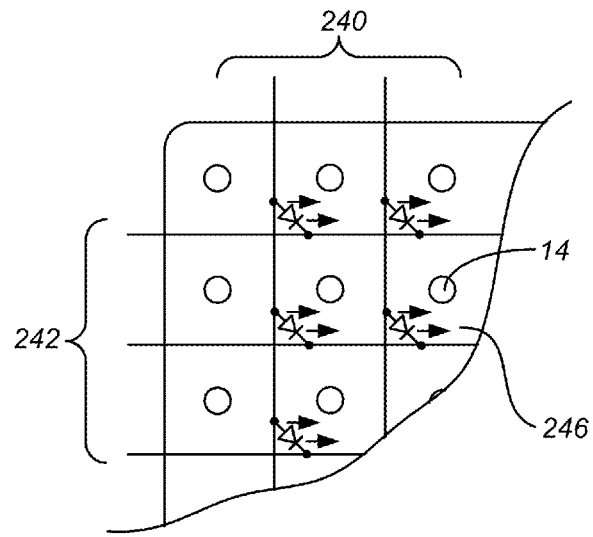
FIG. 62 shows structure similar to that of FIG. 61 but having a light emitting device, such as an LED, at each intersecting row and column line and adjacent to coupling elements.
Figure 64:
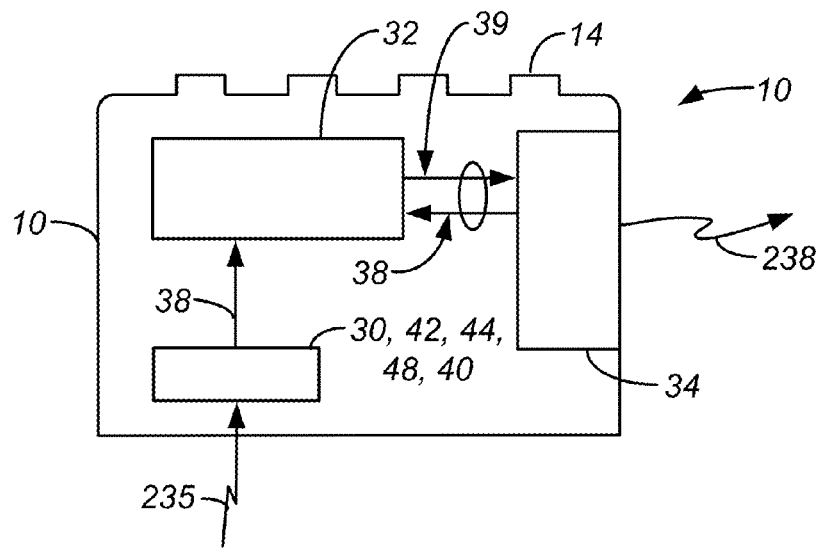
FIGS. 64, 65, 66 and 67 show different modes of communication by the toy brick or other playing piece.
Figure 65:
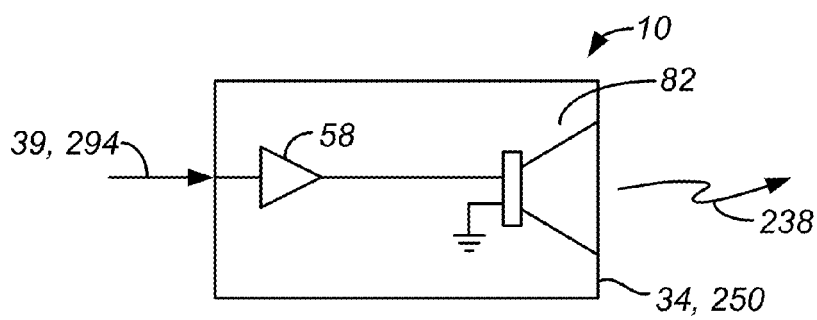
Figure 66:
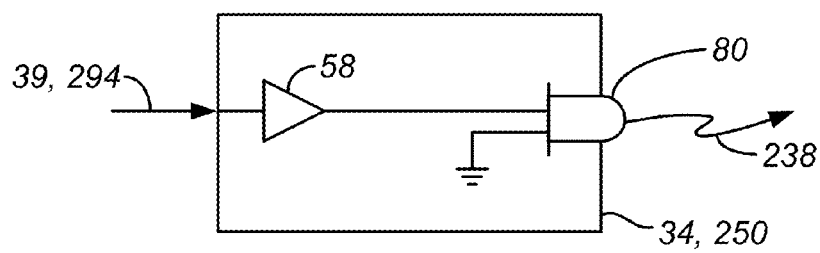
Figure 67:
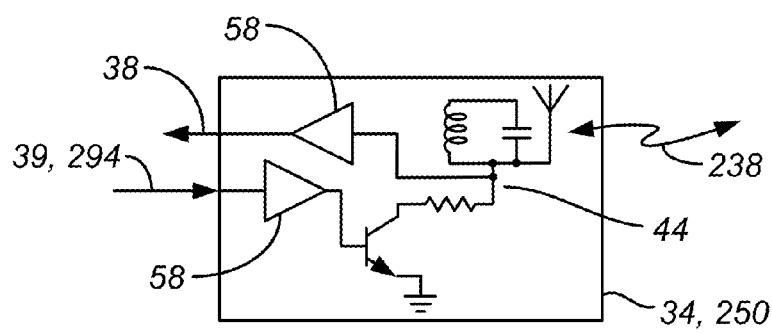

FIG. 62 show structure similar to that of FIG. 61 but having a light emitting device 246, such as an LED, at each intersecting column and row scan lines 240, 242 and adjacent to coupling elements 14. LEDS 246 can send messages or provide power in the form of light, or both, to appropriately configured toy bricks 10 placed directly above them by blinking visibly or invisibly. The toy bricks can then communicate back to baseplate assembly 200 through one or more receptors 236 using, for example, RF, visible or invisible light, or sound as shown in FIGS. 64-67. In the example of FIG. 64, first signal 235 is received by an appropriate sensing element 30, such as microphone 40, light detector 42, RF transceiver 44 or camera 48, of toy brick 10. A signal 238 is then provided to computing control element 32 which communicates with actuator 34 through lines 39 to create second signal 238 for receipt by one or more receptors 236 of computer 204. Types of actuators 34 are given by way of example but not limited to in FIGS. 65-67. Where an electrical message 294 from the computing and control element 32 is received by amplifier 58 which sends the signal to either a sound emitter 82, or a light emitter 80 or an RF or NFC Transceiver 44 in order to communicate the second signal to the Baseplate. The actuators as shown in but not limited to FIGS. 65-67 may also be used by the baseplate.

A higher density of LEDs, or other light emitters 246, per releasable coupling element 14 in structure such as shown in FIG. 62 can be the basis of a toy brick baseplate 202 which is capable of graphical display, but with less detail than would be possible with a conventional LCD. Such a baseplate would preferably have some electronics to scan the XY lines and communicate with a computing device via protocols such as but not limited to USB, Lightning Port or Bluetooth.

Figure 63:
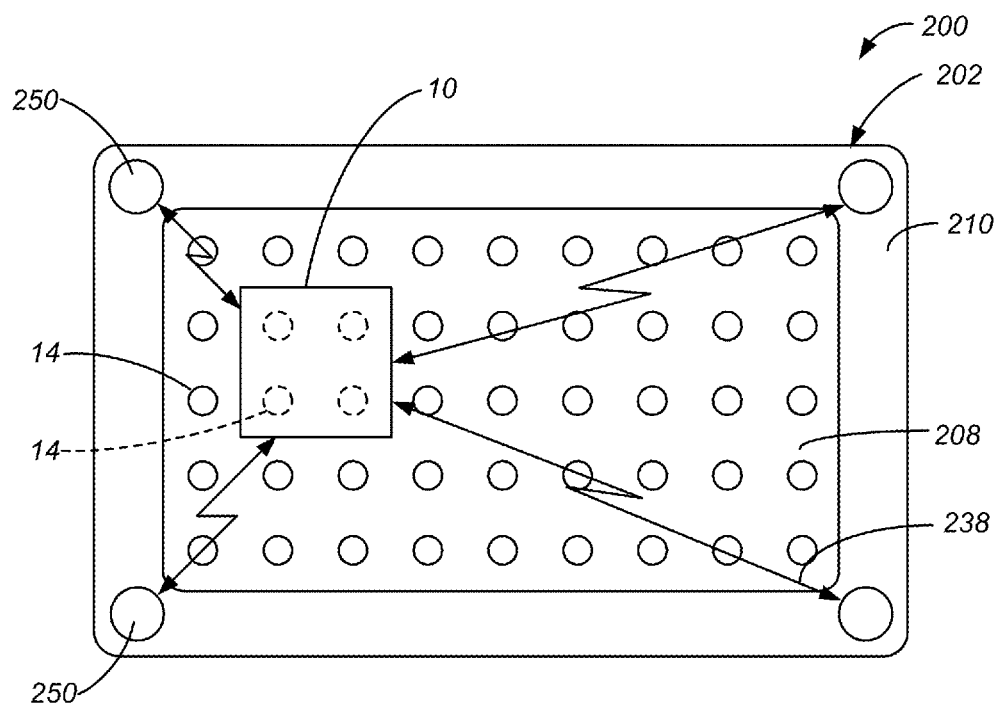
FIG. 63 shows a baseplate assembly including triangulating transmitters/receptors at the four corners of the baseplate to permit the position of the toy brick on the baseplate to be determined.
Figure 68:
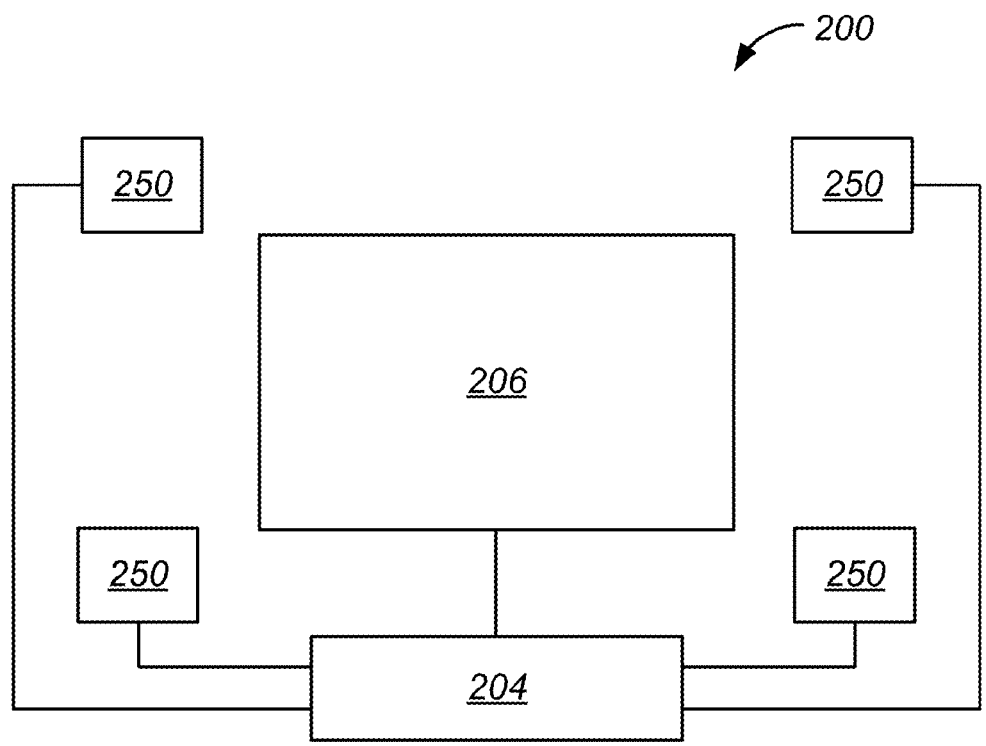
FIG. 68 is a simplified schematic diagram showing a baseplate and triangulating transmitters/receptors at the corners.

FIG. 63 and FIG. 68 show a baseplate assembly 200 including triangulating transmitters/receptors 250 at the four corners of baseplate 202 to permit the position of the toy brick 10 on the baseplate to be determined. Baseplate assembly 200 can use 3 or more RF/NFC/sound/light transmitters/receptors 250 at different positions on baseplate assembly 200. Each of these transmitters/receptors 250 can emit a specific signal, preferably simultaneously, and each toy brick 10 would measure the time delay between the pulses received from each of the devices 250. Each toy brick 10 can then compute its position by trigonometric methods and transmit the type of brick and its position back to baseplate assembly 200 through transmitters/receptors 250 by means of, for example, RF, light or sound transmissions. The reverse is also possible and equivalent, where the toy brick 10 emits a signal and the time difference of the signals being received by the transmitters/receptors 250 on the baseplate assembly 200 indicates the position of the toy brick.

Examples of baseplate assembly 200 have the ability to ascertain the position, orientation and characteristics of a toy brick 10 placed upon it, by passive means such as a camera and optical recognition, or by active means such but not limited to RFID or radio frequency triangulation. The toy bricks 10 placed upon baseplate 202 may in addition have sensors on them to transmit their orientation and motion. By way of example, a toy brick figure when manipulated in a waddling or walking manner may cause the scenery displayed on the baseplate to advance as if the toy brick figure were walking through the environment.

The manipulation of smaller toy bricks 10 across upper surface 214 of baseplate 202 may also cause avatars in 2D or 3D to appear on display screen 206 and interact with other features of the displayed image. The virtual characteristics of a toy brick or toy brick figure may be stored in nonvolatile memory on the baseplate assembly 200 or even nonvolatile memory on the toy brick 10 being manipulated. Further, the virtual characteristics of the toy brick being manipulated may change due to interaction with the environment on upper surface 214 of baseplate 202. The changed characteristics may be retained in the physical toy brick 10, or elsewhere, such as at a remote location on the internet, such that the toy brick when taken to a different baseplate assembly 200, the current baseplate assembly 200 may recall the exact environment on the display screen 206 of the prior baseplate assembly 200 and also the characteristics of the avatar from the previous interactive experience with the prior baseplate assembly.

The interaction between the baseplate assembly 200 and the toy brick 10 placed upon it may be two-way. By way of example, a toy brick 10 that is equipped with a similar but smaller display device may receive images to be displayed on its surface, dependent on its position on the baseplate. By way of example, a figural toy brick 10 may change its displayed image to a beach garment when moved onto a beach scene on the baseplate 202. By way of another example, a toy brick could make a splashing noise when placed on a part of a display region 208 which has a water feature; the display screen 206 may in addition show the resulting water splash.

A baseplate assembly 200 with triangulation capability may also be used as a virtual building environment. A toy brick 10 that is moved over upper surface 214 can cause an avatar of the same toy brick 10 to appear on display screen 206, and then by a clicking/cementing motion/gesture, the avatar associated with that toy brick may be cemented to a virtual structure, and the procedure repeated. The avatar need not be of the same shape as the physical toy brick, and selection of the shape of the avatar may be by menu structure displayed on display screen 206 or even by some physical manipulation of the toy brick or other triangulatable object.

In another example, the display screen 206 may show schematic instructions, for example, for the building a toy brick structure or even an electrical circuit with circuit elements made of releasable couplings such as in Snap-Circuits® sold by Elenco Electronics, Inc., of Wheeling Ill. The exact life size image of the building block or circuit element may be displayed on the display screen 206 under the releasable coupling elements 14 where it is to be snapped in, so that a child may create the assembly with ease.

It should be noted that an image generating device 204 may have all the features that by way of example an iPad, or similar computing device, can have. By way of example, one or more the following may be possible: reaction of the image to touch, rechargeable power supply, programmable response to motion or time course of motion, or orientation, integral camera, Bluetooth connection, WiFi connection, NFC reader, ability to play movies, ability to display a touch sensitive interactive game, ability to send and receive audible signals or optically encoded transmission and the like.

In another embodiment, baseplate assembly 200 may form a board game such a Monopoly board game. The Monopoly figures, houses, and hotels, may all be toy brick pieces, and their motion and position may be automatically sensed as discussed above. By way of another example, a game of Scrabble® may be played with toy bricks with letters on them being placed on upper surface 214 displaying a Scrabble game board, the score even may be automatically computed and displayed by automatic identification of the position and type of toy bricks 10, acting as letter tiles, placed on baseplate 202.

In another embodiment, players of a game may interact with a baseplate assembly 200 by means of smaller computing devices such as smart phones. Each player may affect the main displayed image on display screen 206 by means of software on the baseplate assembly 200 and which communicates with software on smaller computing devices. The smaller computing devices may in addition have clear baseplates attached, and placement of toy bricks on the baseplate on the smaller devices may affect a displayed image or game in the larger baseplate assembly 200, or even on a display screen 206 with no baseplate 202. Several smaller devices may simultaneously or sequentially communicate with, and affect the environment of the larger baseplate assembly 200. The environment may be fully interactive, such that by way of example, Monopoly money may be taken from one player and given to another player, and the amounts displayed on the main baseplate assembly 200, or even transferred between the smaller computing devices, depending by way of example on movement of toy brick figures on the main baseplate assembly 200.

Figure 69:
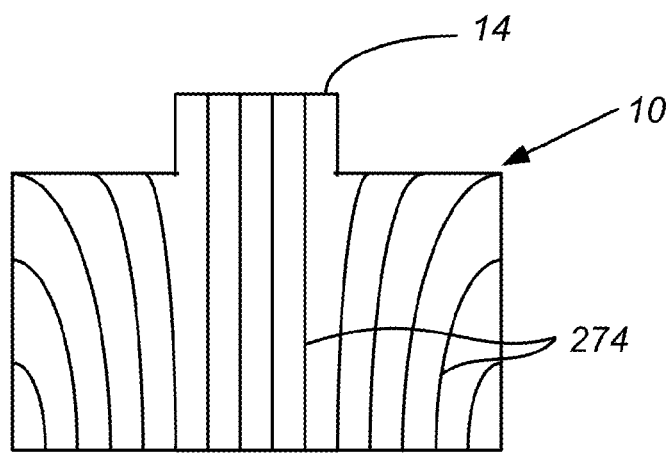
FIG. 69 is a simplified side cross-sectional view of a toy brick with a combination of straight, parallel optical fibers and curved optical fibers two direct the image to more than one surface of the toy brick.

In another embodiment, is also possible to extend and route the display image and messaging in a $3^{rd}$ dimension away from the plane of the display with the use of opaque, translucent or clear toy bricks 10 with optical fibers 274 or other light guides embedded in them as shown in FIG. 69. In this manner, by way of example a toy brick Christmas tree with twinkling lights or an Ice Castle complete with twinkling lights on the turrets can be made. A toy brick shaped as a Christmas tree with light guides may be recognized by the baseplate assembly 200 and automatically illuminated by the display with a twinkling light pattern. Note that this embodiment differs from other embodiments in which toy brick 10 is clear or transparent because the image is not visible through the brick instead appears on the surface of the brick. In FIG. 69 a combination of straight, parallel optical fibers 274 and curved optical fibers 274 are used to direct the image to more than one surface of the toy brick. In other examples, the optical fibers 274 could all be of one type.

Description of Image Generating and Playing-Piece-Interacting Assemblies

Figure 70:
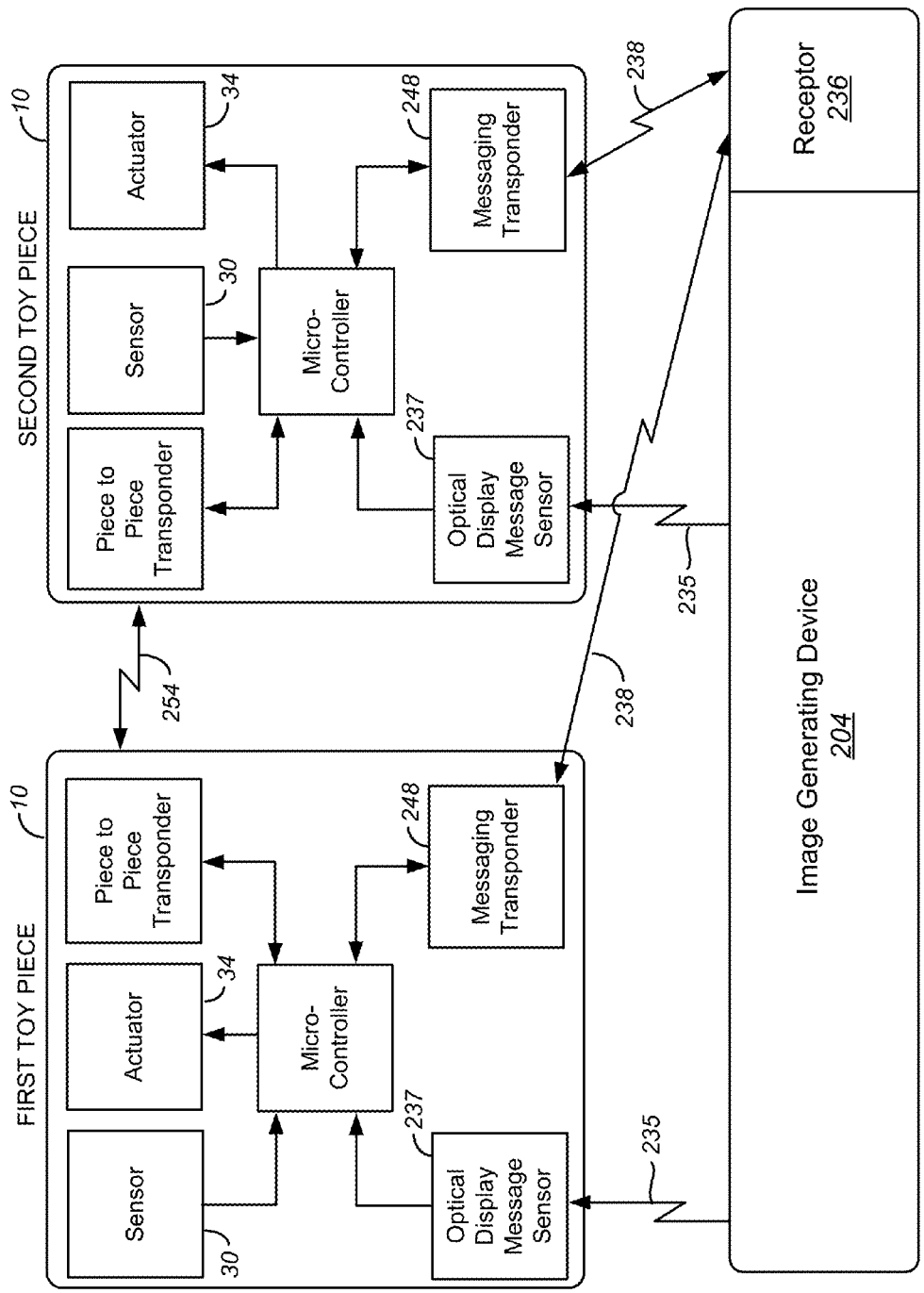
FIG. 70 is somewhat similar to that of FIG. 55 but showing the interaction among two playing pieces and one image generating device, the image generating device including a receptor as shown in FIG. 52.

An example of an image generating and playing-piece-interacting assembly 296 is shown in FIGS. 55 and 70. In this example, image 222 includes visual image 223 and optically encoded message image 235, sometimes referred to as first signal 235, to permit information to be transmitted to toy bricks 10 or other play pieces 10. Assembly 296 is shown in FIG. 70 as a simplified schematic representation of components and devices constituting assembly 296 and suggesting their interaction. It should be noted that in some examples associated with FIG. 70, a baseplate 202 is not used but rather receptor 236 is operably coupled to an image generating device 204, typically a tablet computer. In such examples, toy bricks 10, or other playing pieces 10, can be positioned directly on display screen 206 of image generating device 204. In other examples, a baseplate 202 can be used with receptor 236 typically mounted to baseplate 202. In either event receptor 236 is operably coupled to the image generating device 204, typically through a wired connection. Initially, some definitions and explanations are in order.

The optically encoded message image 235, is a one way signal from the display screen 206 of image generating device 204, and sometimes through display region 208, to the optical display message sensor 237 of playing piece 10. Optical display message sensor 237 generates a first signal 241 based at least in part on the optically encoded message image 235 and is a distinct component from any other sensor on the playing piece 10.

The second signal 238 is a one-way, or a two-way, transaction between the messaging transponder 248 of the playing piece 10 and the receptor 236. This messaging transponder 248 on the playing piece 10 is distinct from any other actuator on the playing piece. The messaging transponder 248 can be by way of example but not limited to, NFC, WiFi, Zigbee, Bluetooth, or infrared signal.

Sensors 30 are distinct from the optical display message sensor 237 which receives the first signal 235. Sensors 30 may include components such as but not limited to temperature sensors, touch sensors, force sensors. In some examples, toy piece 10 does not include any sensors 30.

Actuators 34 are distinct from the messaging transponder 248 on the playing piece 10 which creates and transmits the second signal 238. Actuators 34 may be, but are not limited to, light emitters or sound emitters or another transponder on the playing piece 10. As with sensor 30, in some examples, toy piece 10 does not include any actuators 34.

Receptor 236 communicates with the messaging transponder 248 on the playing piece 10. The receptor 236 may be a one way or two way transponder. The following are examples of methods of triangulation of toy pieces 10 using optically encoded message images 235 thereby determining the physical location of a playing piece 10, typically relative to the display screen 206.

In a first example, the same optically encoded image message 235 being scanned across the display screen 206 is scanned sequentially across patches of pixels. In this example, the message is essentially "turn on messaging transponder 248". The receipt of the first optically encoded message image by the optical display message sensor 237 turns on the messaging transponder 248, described as a transmitter/transceiver in FIG. 55, on the playing piece 10 above the currently stimulated patch of pixels, for a certain period of time. This starts a one or two way, second message interaction with the image generating device 204 through the receptor 236, described as a receiver/transceiver in FIG. 55. Receptor 236 may be by way of example an RF transponder. The position of the playing piece 10 is revealed to the image generating device 204 because the position of the optically encoded message image 235 is known at the time when the second message is received.

In another example, a different first optically encoded message image 235 is sent at different physical locations of the display screen 206. These different message images 235 can be sent simultaneously at all locations or scanned one patch of pixels at a time. The differences between the message images can be, by way of example but not limited to, determined by encoding the X,Y coordinates of the location which is being stimulated. The playing piece 10 receives this message via the optical display message sensor 237 and can, when communicating with the receptor 236 at a subsequent time, by way of the messaging transponder 248, not necessarily coincident with the time of receipt of the first optically encoded message image 235, send the contents of first optically encoded message image 235 received in addition to data about the playing piece 10 itself. The image generating device 204 then knows the position of the playing piece 10 and the type of playing piece 10.

Messaging can also be in addition to or instead of triangulation. For example, optically encoded message image 235 can contain data for actuators 34 on the playing piece 10. For example, the data for an actuator 34 can be to turn the playing piece 10 to a blue color. This optically encoded message image 235 may be sent coincident with a visual image 223 showing water, such that any playing piece 10 placed on the visual image of water will turn blue. It should be noted that this does not require generation of a second signal 238 to receptor 236, nor does it require triangulation of the position of the playing piece 10.

In another example, second signal 238 sent by the messaging transponder 248 on the playing piece 10 to the receptor 236 may contain additional data from sensors 30 on the playing piece 10 in addition to other data. For example, the temperature of the playing piece 10 may be sent to receptor 236, or the push of a button on the playing piece 10 can send a "shoot" signal to the receptor.

The message interaction involving second signal 238 between the messaging transponder 248 on the playing piece 10 and the receptor 236, may be a two way communication, which can send data for actuators 34 on the playing piece 10. For example, speech can be sent to a speaker type of actuator on the playing piece 10 by way of the second message interaction.

Two or more playing pieces 10 on the display screen 206, or on the display region 208 of a baseplate 202 when used, may interact with each other through the display screen based first signal 235 and subsequent second signal 238 to the receptor 236. Examples include but are not limited to the following.

Two playing pieces 10 may be placed and oriented to face each other and a shoot button type of sensor 30 on each toy piece pushed, the progress of the bullet or other projectile is shown on the display screen 206, either directly on the display screen or as viewed on the display region 208 when a baseplate 202 is used. This could be followed by the playing piece 10 turning red if hit. Such an interaction using the first and second signals 235, 238 to compute position, in addition to the second signal 238 encoding the shoot button being pushed, in addition the one way optically encoded message image or the second signal which is a two way transaction in this example, sending a command to the playing piece 10 being hit to turn red.

Two or more playing pieces 10 on the display screen 206, or baseplate 202 when used, may interact with each other directly without using the display transponder 248 through piece-to-piece signal 254. For example, the playing pieces 10 may compute their positions with the information in the first display message image 235. Then the playing pieces 10 may communicate directly with other playing pieces 10 using the messaging transponder 248 or another separate transponder; receptor 236 is not involved in the transaction.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, images may be transmitted to display region 208 using a fiber optic array extending between image generating device 204 and the display region of the baseplate 202 as shown in FIGS. 39 and 40. Such a fiber optic array may or may not extend from a display screen 206 on image generating device 204.

Any and all patents, patent applications and printed publications referred to above are incorporated by reference.

The invention claimed is:

1. An image generating and playing-piece-interacting assembly comprising:
    an image generating device having a display screen on which generated images can be displayed;
    the generated images comprising integrated visual images, and optically encoded message images;
    the display screen comprising a backlight, the backlight comprising emitting elements;
    a plurality of the optically encoded message images being simultaneously directed to, and simultaneously emitted by, the emitting elements of the backlight;
    the display screen comprising visual image generating pixels;
    the digital images being directed to the visual image generating pixels to create the visual image; a touch sensitive membrane operably coupled to the image generating device to allow a user to provide touch input;
    a receptor operably coupled to the image generating device;
    a first playing piece at a first location relative to the display screen, the first playing piece comprising:
        an optical display message sensor configured to receive the integrated visual and optically encoded message image and to generate a first signal at least partially based upon the optically encoded message image;
        a messaging transponder coupled to the optical display message sensor for receipt of at least the first signal from the optical display message sensor; and the messaging transponder coupled to the receptor for generating and sending to the receptor a second signal at least partially based upon the first signal.

2. The assembly according to claim 1, where in the receptor is at least one of a sound receptor, an electromagnetic radiation receptor, and a magnetic field receptor, and the second signal comprises a corresponding one of a sound second signal, an electromagnetic radiation field second signal, and a magnetic field second signal.

3. The assembly according to claim 1, further comprising a baseplate mountable on the display screen, the baseplate comprising a display region, the display region comprising coupling elements, by which playing pieces can be releasably mounted to the display region.

4. The assembly according to claim 1, wherein the optically encoded message image is visually imperceptible to a user.

5. The assembly according to claim 1, wherein the optically encoded message image contains information encoded as being addressed to a specific playing piece.

6. The assembly according to claim 1, wherein the second signal comprises one or more of the following (1) graphic representation for the first playing piece, (2) other information for the first playing piece, and (3) an address into at least one of a local database, a remote database, a look-up table; which contains information for the first playing piece.

7. The assembly according to claim 1, wherein the optically encoded message image changes according to the physical position of the optically encoded message image on the display screen.

8. The assembly according to claim 7, wherein the optically encoded message image contains information regarding at least one of (1) coordinates for the physical position, and (2) information regarding the visual image portion of the generated image at the physical position, (3) gaming data for the playing piece, (4) data for an actuator on the playing piece.

9. The assembly according to claim 1, wherein the optically encoded message image is generated at a plurality of physical positions on the display screen, and wherein a second playing piece is at a second location relative to the display screen.

10. The assembly according to claim 1, further comprising:
a second said image generating device;
a second said playing piece at a second location relative to the display screen of the second image generating device;
the first and second image generating devices being operably coupled; and
an optically encoded message image transmitted to the second playing piece from the second said image generating device at least partially based upon the second signal from the first playing piece.

11. The assembly according to claim 1, further comprising a second said playing piece at a second location relative to the display screen, and an optically encoded message image to the second playing piece at least partially based upon the second signal from the first playing piece.

12. The assembly according to claim 11, wherein each of the first playing piece and the second playing piece comprises a playing-piece-to-playing-piece communication device to permit transfer of messages therebetween.

13. The assembly according to claim 1, wherein the first playing piece comprises a second optical display message sensor operably coupled to the messaging transponder.

14. The assembly according to claim 1, wherein the second signal provides information to the image generating device as to where to display optically encoded messages for the first playing piece.

15. The assembly according to claim 1, wherein the second signal generated by the first playing piece is automatically generated without further user interaction following receipt of the optically encoded message image by the optical display message sensor.

16. The assembly according to claim 1, wherein the first playing piece comprises a sensor coupled to the messaging transponder to provide sensor data to the messaging transponder, so that the second signal can be generated at least in part based on the sensor data.

17. The assembly according to claim 1, wherein:
the first playing piece comprises at least one of (1) an actuator operably coupled to receive a message from the optical display message sensor, and (2) an actuator operably coupled to receive a message from the messaging transponder;
the message comprising data for actuation of the actuator.

18. The assembly according to claim 17, wherein the data for actuation of the actuator causes the actuator to do at least one of the following: generate a colored light, generate an image, generate a sound, cause movement.

19. The assembly according to claim 1, further comprising an energy-transmitting near field communication (NFC) antenna and the playing piece comprises an energy-receiving antenna, whereby the NFC antenna can provide magnetically coupled power transfer to the first playing piece.

20. The assembly according to claim 1, wherein:
the first playing piece capable of generating a message; and wherein:
at least one of the first playing piece and the image generating device includes computer program instructions stored on a non-transient storage medium that, when executed on a processor, cause the processor to perform actions comprising flow or branching dependent upon the message.

* * * * *